United States Patent
Abaitancei et al.

(10) Patent No.: US 11,742,663 B2
(45) Date of Patent: Aug. 29, 2023

(54) INTEGRATED ENERGY CONVERSION, TRANSFER AND STORAGE SYSTEM

(71) Applicant: A & A International, LLC, Chicago, IL (US)

(72) Inventors: Horia Abaitancei, Brasov (RO); Cornel Mihai, Satu Mare (RO); Stefan Ioana, Germantown, MD (US)

(73) Assignee: A & A International, LLC, Chicago, IL (US)

( * ) Notice: Subject to any disclaimer, the term of this patent is extended or adjusted under 35 U.S.C. 154(b) by 0 days.

(21) Appl. No.: 17/459,023

(22) Filed: Aug. 27, 2021

(65) Prior Publication Data
US 2022/0060022 A1 Feb. 24, 2022

Related U.S. Application Data

(62) Division of application No. 16/333,543, filed as application No. PCT/US2017/068018 on Dec. 21, 2017, now Pat. No. 11,128,136.
(Continued)

(30) Foreign Application Priority Data
Dec. 20, 2017 (RO) .............................. a 2017 01143

(51) Int. Cl.
*H02J 3/28* (2006.01)
*B60T 1/10* (2006.01)
(Continued)

(52) U.S. Cl.
CPC ................. *H02J 3/28* (2013.01); *B60T 1/10* (2013.01); *F15B 1/024* (2013.01); *F15B 1/027* (2013.01);
(Continued)

(58) Field of Classification Search
CPC .. F15B 1/024; F15B 1/027; F15B 1/04; F15B 21/14; F16D 31/02; F16D 61/00; B60T 1/10
See application file for complete search history.

(56) References Cited

U.S. PATENT DOCUMENTS 3,666,038 A 5/1972 Hudspeth et al.
3,677,142 A * 7/1972 Roth .................... F15B 15/1447
92/92
(Continued)

FOREIGN PATENT DOCUMENTS

CN 101855447 A 10/2010
CN 102449303 A 5/2012
(Continued)

OTHER PUBLICATIONS

"Waste heat recovery unit," Wikipedia, retrieved from https://en.wikipedia.org/wiki/waste_heat_recovery_unit, retrieved on Nov. 17, 2020, 4 pages.
(Continued)

*Primary Examiner* — Shafiq Mian

(57) ABSTRACT

An integrated hybrid energy recovery and storage system for recovering and storing energy from multiple energy sources is disclosed. The system includes an accumulator unit having a high pressure accumulator and a low pressure accumulator. At least one piston is mounted for reciprocation in the high pressure accumulator. The accumulator unit is configured to receive, store, and transfer energy from the hydraulic fluid to the energy storage media. The system further includes two or more rotational directional control valves, in which at least one rotational directional control valve is positioned on each side of the accumulator unit. Each rotational directional control valve includes multiple ports. The system also includes two or more variable displacement hydraulic rotational units. At least one variable
(Continued)

displacement hydraulic rotational unit is positioned adjacent each of the rotational directional control valves.

20 Claims, 69 Drawing Sheets

Related U.S. Application Data

(60) Provisional application No. 62/580,360, filed on Nov. 1, 2017, provisional application No. 62/577,630, filed on Oct. 26, 2017, provisional application No. 62/606,511, filed on Sep. 26, 2017, provisional application No. 62/498,348, filed on Dec. 21, 2016, provisional application No. 62/498,347, filed on Dec. 21, 2016.

(51) Int. Cl.
| | |
|---|---|
| F15B 1/027 | (2006.01) |
| F15B 1/04 | (2006.01) |
| F16D 31/02 | (2006.01) |
| F15B 1/02 | (2006.01) |
| F15B 21/14 | (2006.01) |
| F16D 61/00 | (2006.01) |
| F15B 1/26 | (2006.01) |

(52) U.S. Cl.
CPC ............... *F15B 1/04* (2013.01); *F15B 21/14* (2013.01); *F16D 31/02* (2013.01); *F16D 61/00* (2013.01); *F15B 1/265* (2013.01); *F15B 2211/20546* (2013.01); *F15B 2211/20569* (2013.01); *F15B 2211/212* (2013.01); *F15B 2211/625* (2013.01); *F15B 2211/88* (2013.01)

(56) References Cited

U.S. PATENT DOCUMENTS

| | | | |
|---|---|---|---|
| 3,736,753 A | 6/1973 | Roth | |
| 3,945,207 A | 3/1976 | Hyatt | |
| 3,958,637 A * | 5/1976 | Cobbs | E21D 5/12 166/287 |
| 4,204,405 A | 5/1980 | Basham | |
| 4,888,949 A | 12/1989 | Rogers | |
| 5,101,925 A | 4/1992 | Walker | |
| 5,165,245 A | 11/1992 | Agrawal et al. | |
| 5,540,052 A | 7/1996 | Sieke et al. | |
| 5,630,447 A * | 5/1997 | Jensen | F24T 10/13 138/117 |
| 5,634,779 A | 6/1997 | Eysymontt | |
| 5,899,067 A | 5/1999 | Hageman | |
| 6,290,184 B1 | 9/2001 | Paterro | |
| 7,549,499 B2 | 6/2009 | Delaney | |
| 8,225,606 B2 | 7/2012 | Mcbride et al. | |
| 8,616,323 B1 | 12/2013 | Gurin | |
| 9,109,614 B1 | 8/2015 | Fong et al. | |
| 9,234,532 B2 | 1/2016 | Vanderlaan et al. | |
| 9,670,943 B2 | 6/2017 | Gomm et al. | |
| 10,794,370 B2 | 10/2020 | Abaitancei et al. | |
| 2002/0036019 A1* | 3/2002 | Woelfel | F16L 11/22 138/116 |
| 2002/0060500 A1 | 5/2002 | Lafferty | |
| 2006/0054016 A1* | 3/2006 | Davies | F15B 15/1466 92/109 |
| 2007/0227801 A1 | 10/2007 | Loeffler | |
| 2008/0223471 A1* | 9/2008 | Guo | F16L 9/19 138/113 |
| 2008/0276606 A1 | 11/2008 | Petre | |
| 2008/0276608 A1 | 11/2008 | Anderson et al. | |
| 2008/0289795 A1* | 11/2008 | Hardin | F24T 10/15 165/45 |
| 2009/0000053 A1* | 1/2009 | Anno | F16L 11/20 15/250.351 |
| 2009/0008171 A1 | 1/2009 | Hall et al. | |
| 2009/0205892 A1 | 8/2009 | Jensen et al. | |
| 2009/0236906 A1 | 9/2009 | Walker | |
| 2010/0032959 A1 | 2/2010 | Nies | |
| 2010/0061873 A1 | 3/2010 | Ikemura | |
| 2010/0205960 A1 | 8/2010 | Mcbride et al. | |
| 2011/0030361 A1 | 2/2011 | Gopalswamy et al. | |
| 2011/0056368 A1 | 3/2011 | Mcbride et al. | |
| 2011/0308248 A1 | 12/2011 | Stroganov et al. | |
| 2012/0117958 A1 | 5/2012 | Caldwell et al. | |
| 2012/0324891 A1 | 12/2012 | Raab et al. | |
| 2013/0025385 A1 | 1/2013 | Renz et al. | |
| 2013/0061589 A1 | 3/2013 | Bauer et al. | |
| 2013/0068056 A1 | 3/2013 | Van et al. | |
| 2013/0068333 A1 | 3/2013 | Dorr et al. | |
| 2014/0261288 A1 | 9/2014 | Coney et al. | |
| 2017/0072935 A1 | 3/2017 | Ornella et al. | |
| 2017/0292539 A1 | 10/2017 | Bauer et al. | |
| 2018/0291895 A1 | 10/2018 | Afshari | |
| 2019/0211809 A1 | 7/2019 | Abaitancei et al. | |

FOREIGN PATENT DOCUMENTS

| | | |
|---|---|---|
| CN | 202326031 U | 7/2012 |
| CN | 103003576 A | 3/2013 |
| CN | 103465897 A | 12/2013 |
| WO | 2010094118 | 8/2010 |
| WO | 2018081651 | 5/2018 |

OTHER PUBLICATIONS

Abaitancei et al., "Axial Piston Variable Displacement Hydraulic Rotational Unit With Integrated Propulsion Shaft," U.S. Appl. No. 15/731,383, filed Jun. 5, 2017, 69 pages.

Abaitancei et al., "Brake Energy Active Recovery System for Vehicles," U.S. Appl. No. 62/606,522, filed Sep. 26, 2017, 59 pages.

Abaitancei et al., "Fluid Thermal Unit," U.S. Appl. No. 62/580,360, filed Nov. 1, 2017, 29 pages.

Abaitancei et al., "Gearbox With Integrated Brake Energy Recovery System," U.S. Appl. No. 62/584,650, filed Nov. 10, 2017, 30 pages.

Abaitancei et al., "Hybrid Kinematic Hydraulic Transmission for Use With an Integrated Brake Energy Recovery System," U.S. Appl. No. 62/605,283, filed Aug. 7, 2017, 6 pages.

Abaitancei et al., "Hydraulic Accumulator," U.S. Appl. No. 62/577,630, filed Oct. 26, 2017, 48 pages.

Abaitancei et al., "Integrated Hybrid Energy Conversion and Storage System," U.S. Appl. No. 62/606,511, filed Sep. 26, 2017, 70 pages.

Abaitancei et al., "Integrated Renewable Energy and Waste Heat Harvesting System," U.S. Appl. No. 62/606,521, filed Sep. 26, 2017, 12 pages.

Abaitancei et al., "Offset Radial Piston-Actuated Torque Transfer Device," U.S. Appl. No. 62/598,366, filed Dec. 13, 2017, 64 pages.

Abaitancei et al., "Radial Hydraulic Piston Actuated Torque Transfer Device," U.S. Appl. No. 15/731,271, filed May 15, 2017, 19 pages.

Abaitancei et al., "Radial Hydraulic Piston-Actuated Torque lransfer Device," U.S. Appl. No. 62/598,364, filed Dec. 13, 2017, 51 pages.

Abaitancei et al., "Radial Offset Hydraulic Piston Torque Transfer System," U.S. Appl. No. 62/605,291, filed Aug. 7, 2017, 7 pages.

Abaitancei et al., "Solar Power Aided Pumping System and Wave Generator," U.S. Appl. No. 62/787,028, filed Dec. 31, 2018, 64 pages.

Abaitancei et al., "Thermo-Hydraulic Gravitational Energy Conversion System," U.S. Appl. No. 62/644,138, filed Mar. 16, 2018, 7 pages.

Abaitancei, "Continuous Convection Heat Exchanger," U.S. Appl. No. 62/498,347, filed Dec. 21, 2016, 4 pages.

Abaitancei, "Fluid Power Pressure Wave Pump/Motor (FPPWPM)," U.S. Appl. No. 62/498,337, filed Dec. 21, 2016, 3 pages.

Abaitancei, "Hybrid Energy Recovery System for Vehicle Applications," U.S. Appl. No. 62/498,348, filed Dec. 21, 2016, 2 pages.

Abaitancei, "Hydraulic-Actuated Piston Clutch," U.S. Appl. No. 62/498,349, filed Dec. 21, 2016, 5 pages.

(56) References Cited

OTHER PUBLICATIONS

Abaitancei, "Pressure Wave Based Fluid Power Propulsion System," U.S. Appl. No. 62/496,784, filed Oct. 28, 2016, 3 pages.
Abaitancei, "Thermo-Hydraulic Propulsion System," U.S. Appl. No. 62/498,338, filed Dec. 21, 2016, 1 page.
Abaitancei, "Variable Sonic Resonator for Fluid Power Applications," U.S. Appl. No. 62/498,336, filed Dec. 21, 2016, 2 pages.
Abaitencei et al., "Integrated Brake and Thermal Energy Recovery System," U.S. Appl. No. 15/731,267, filed May 15, 2017, 67 pages.
Abaitencei et al., "Thermo-Hydraulic Pressure Wave Based Propulsion System," U.S. Appl. No. 15/731,360, filed Jun. 1, 2017, 51 pages.

* cited by examiner

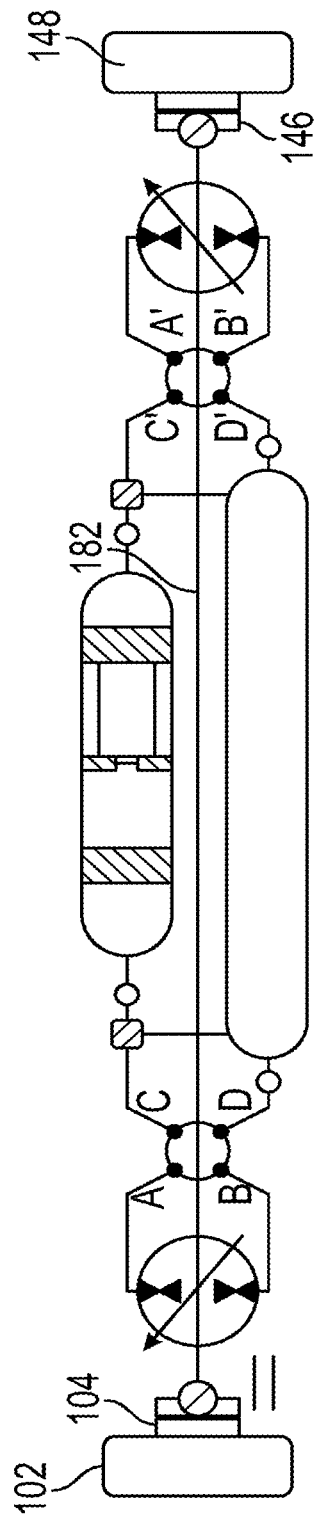
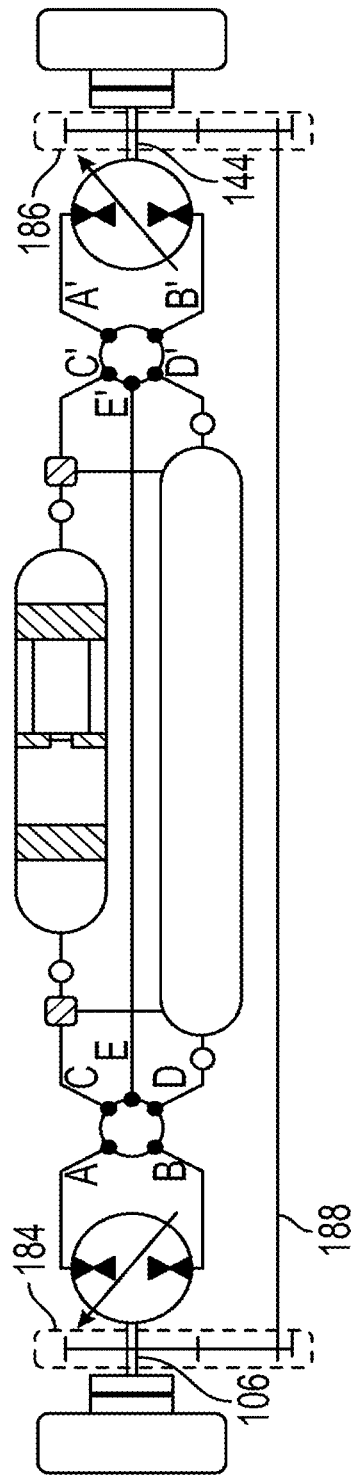
FIG. 4A
FIG. 4B

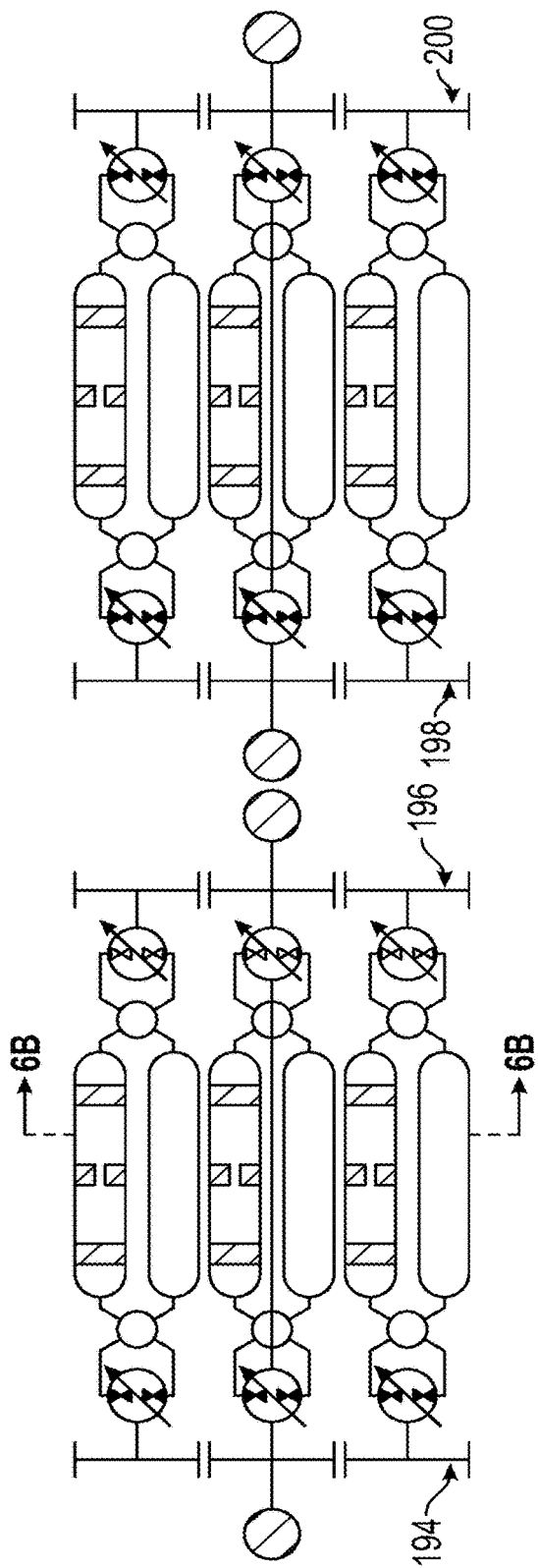
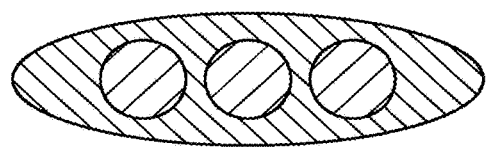
FIG. 6A
FIG. 6B

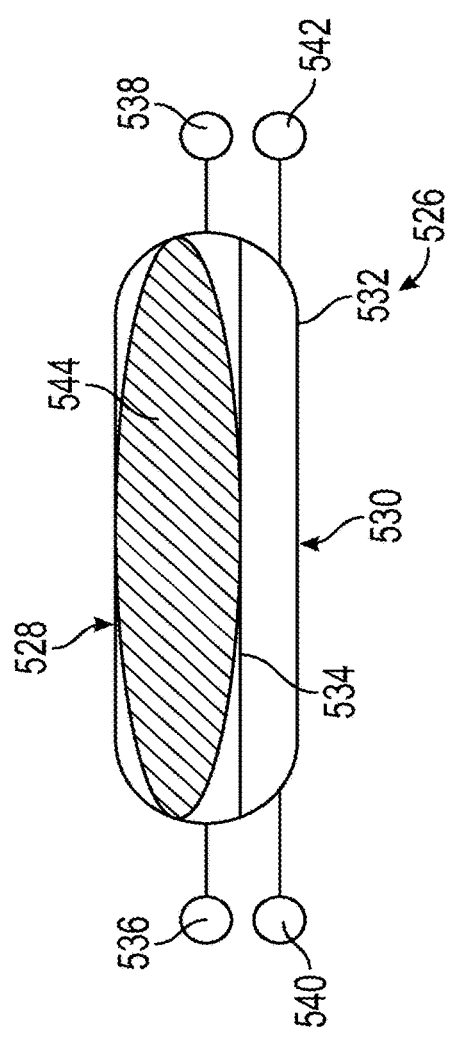
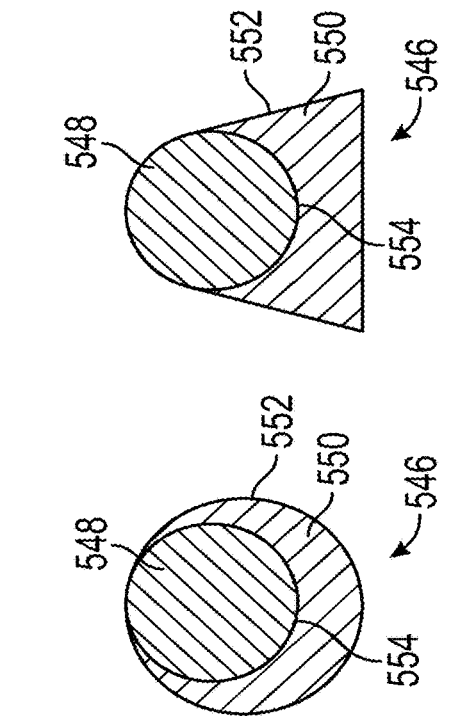
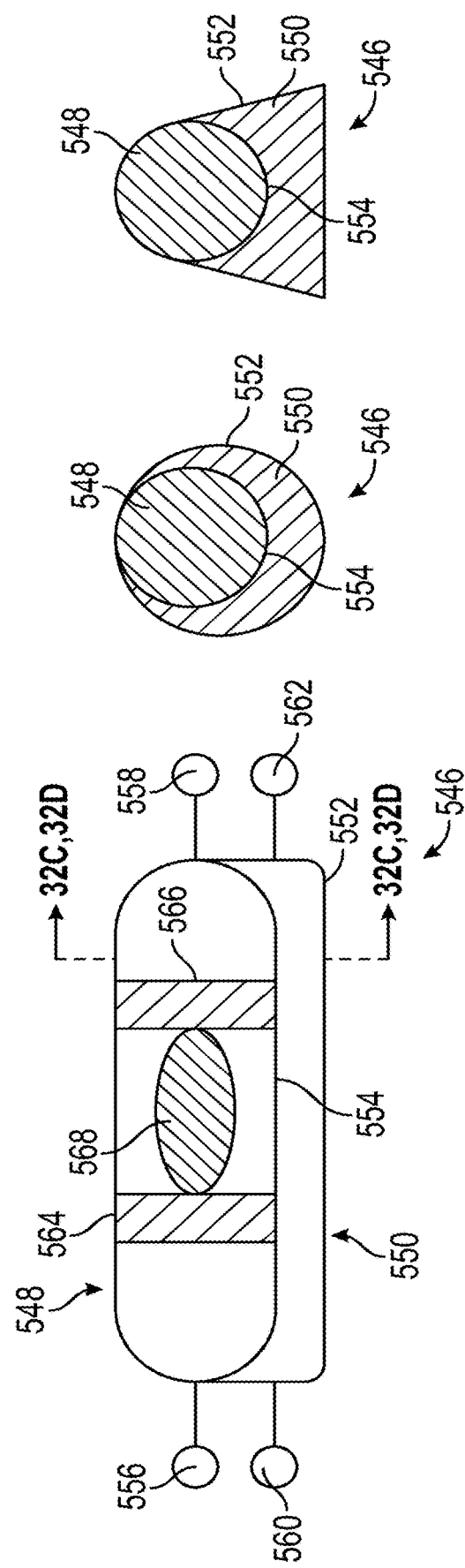

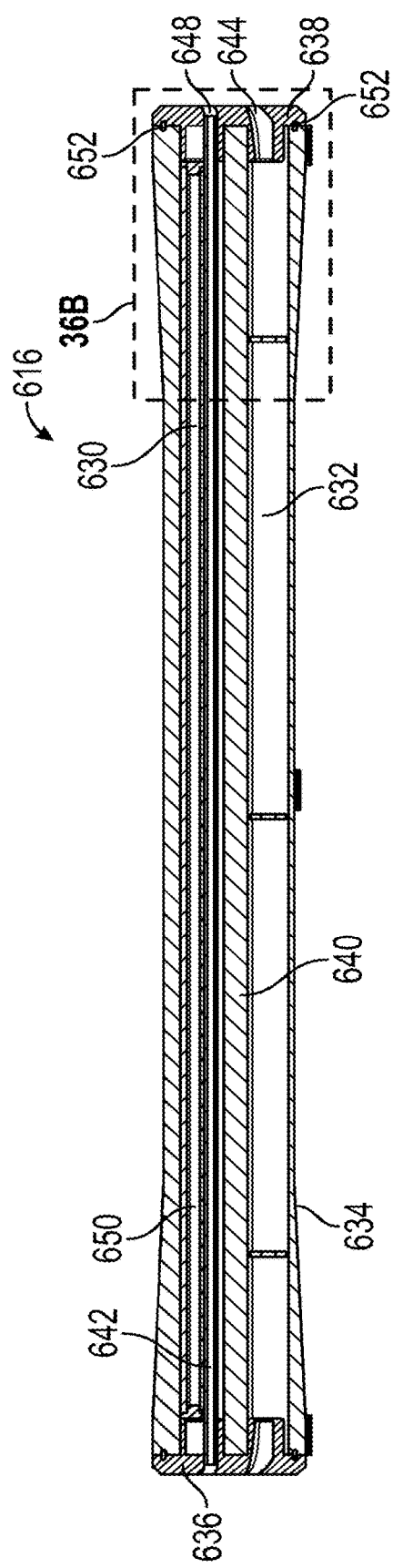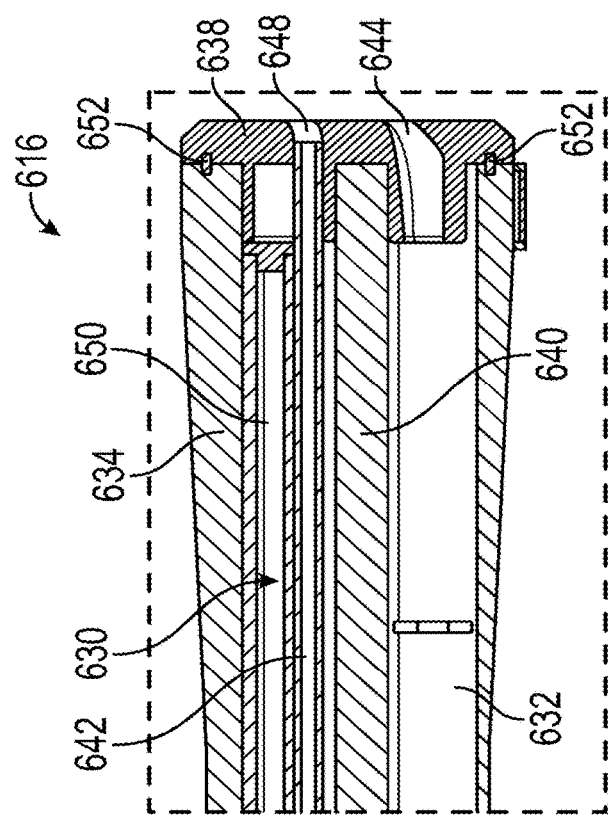
FIG. 36A
FIG. 36B

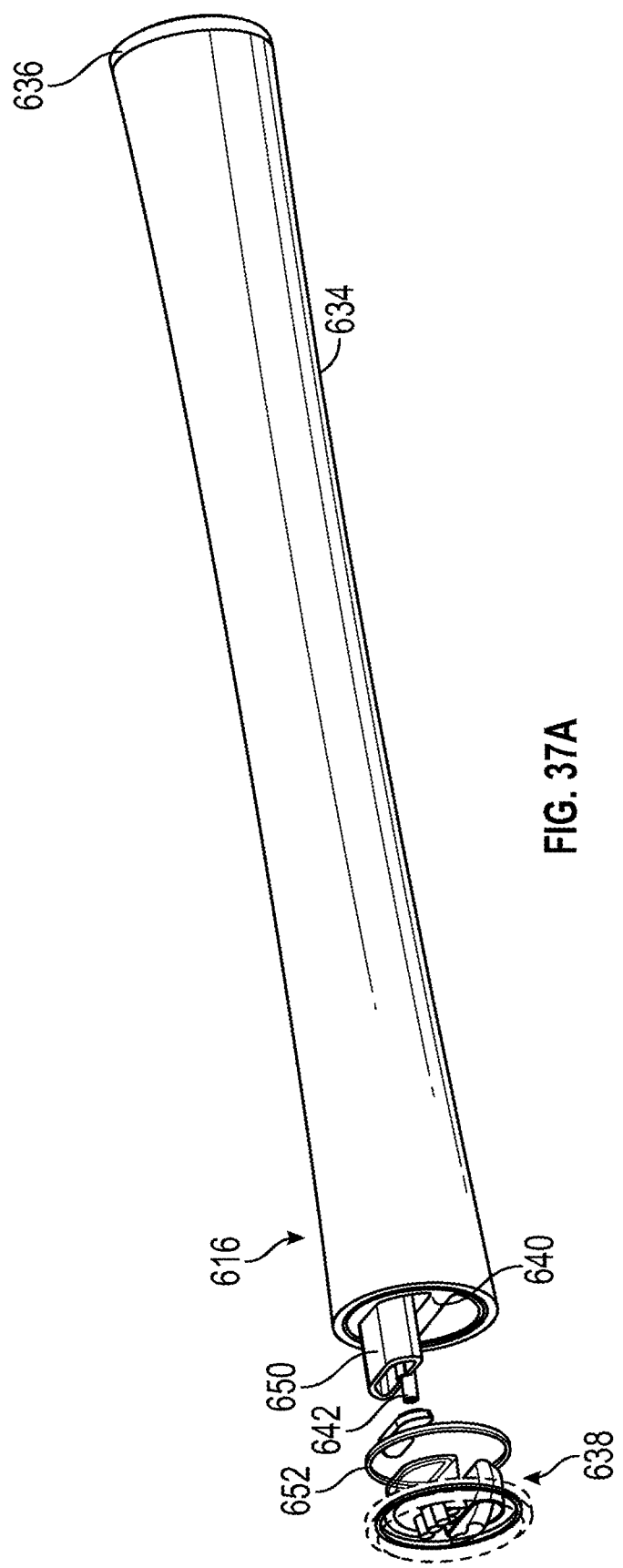

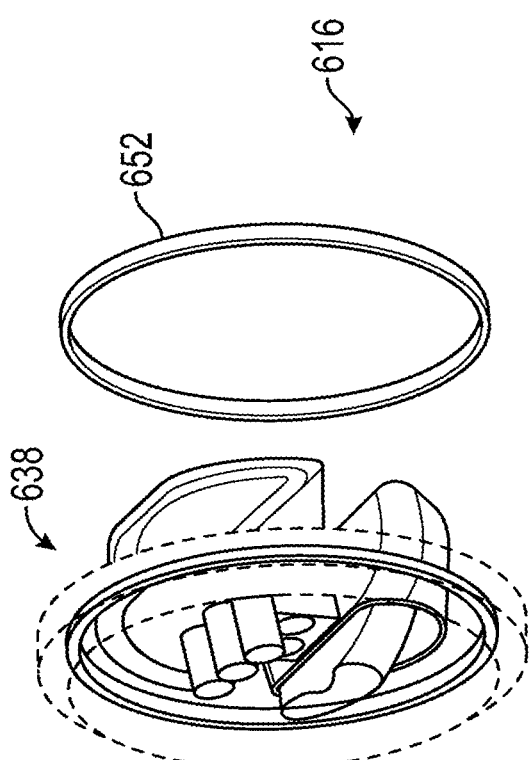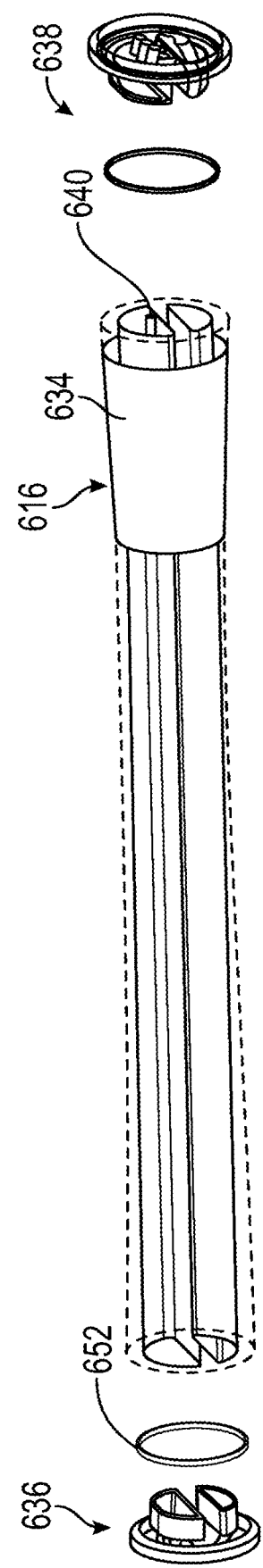
FIG. 37D
FIG. 37E

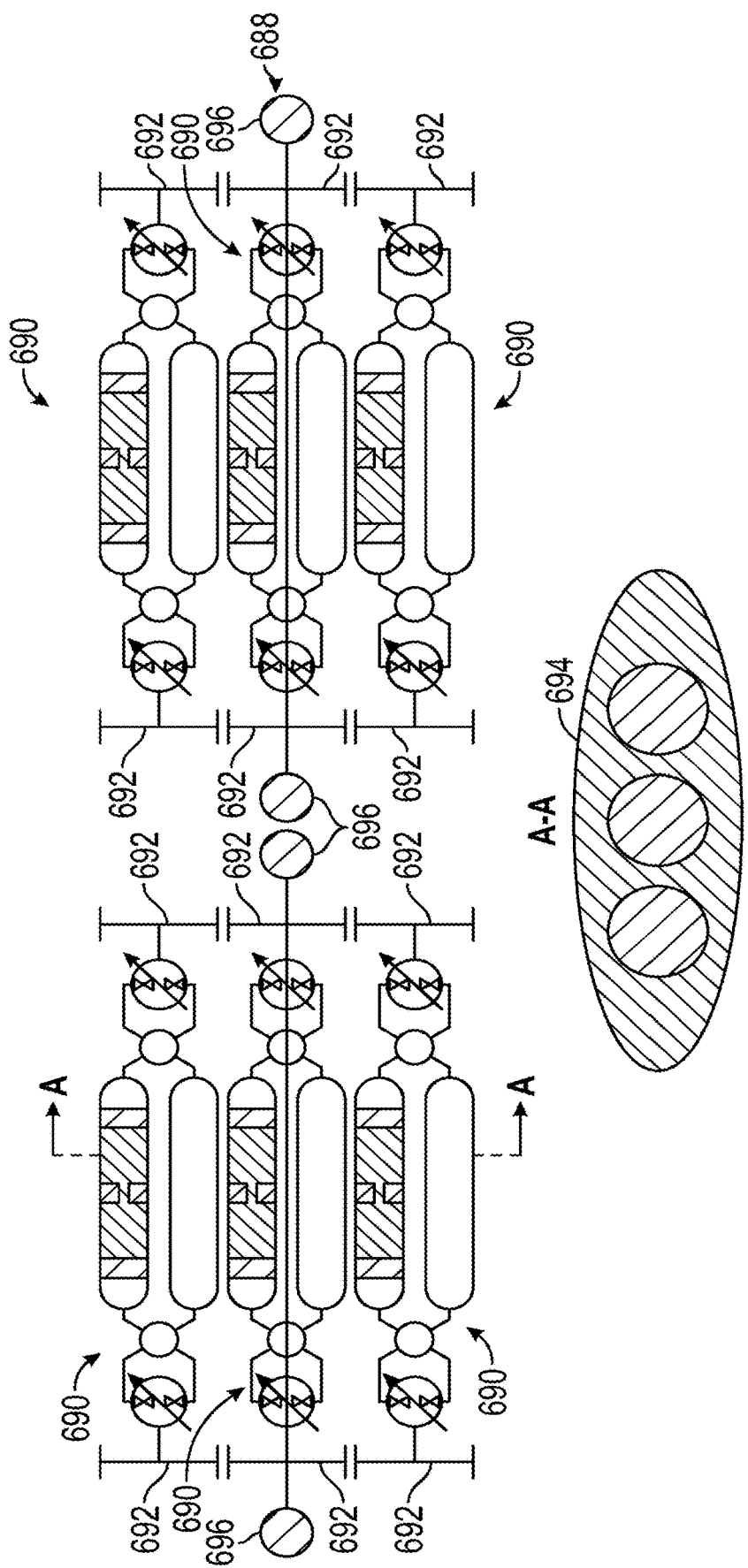

| Emission Reduction Principle | Technical Solution | Details | Comments |
|---|---|---|---|
| Systems at Emission Generation Stage | Radiative Burner | Lower Gas Temperature Burner = Lower $NO_x$ | Applied Successfully in Stationary Applications. Provide by Tier 1(2) Suppliers |
| | Turbulence Generator | Secondary Air for Local Air Cooling = Lower $NO_x$ | Applied Successfully in Gas Turbines |
| | Injection of Water/Steam | Lower Gas Temperature Burner = Lower $NO_x$ | Applicable Due Less Restrictive Material Conditions than Turbines |
| | Injection of Urea | Chemical Reaction = Lower $NO_x$ | Applied Successful to Vehicles Comprising of Components Delivered by Tier 1(2) Suppliers |
| Systems for Zero Emission Vehicles (ZEV) | Combustion of Hydrogen/Oxygen Resulting from on Board Electrolysis | Short Term ZEV for City Driving. Even Lower Overall Efficiency then Pure Electrical Drive, does not Need Additional Electrical Power System | Performance has to be Proven. |
| | Electrical Radiative Heater Power by Electrical Energy Generated on Board | Short Term ZEV for City Driving. Even Lower Overall Efficiency then Pure Electrical Drive, does not Need Additional Electrical Power System | Applied in Domestic Heating. |
| | Electrical Resistive Heating | | Applied in Domestic Electrical Water Boilers |
| After-Treatment Systems | Conventional Catalytic Systems | | Applied in Actual Vehicles Components Delivered by Tier 1 (2) Suppliers |
| | Conventional Particle Filter | Size Reduced Due to Lower Consumption and Lower Generation Rate Due to External Combustion. | Applied in Actual Vehicles Components Delivered by Tier 1 (2) Suppliers |
| | Gas Trap | Small Capacity Zero Tailpipe Gas | Applicability Still to be Proven |

FIG. 50

INTEGRATED ENERGY CONVERSION, TRANSFER AND STORAGE SYSTEM

CROSS-REFERENCE TO RELATED APPLICATIONS

This application is a divisional of U.S. application Ser. No. 16/333,543 (now allowed), filed Mar. 14, 2019 as a national stage application under 35 U.S.C. § 371 of International Application PCT/US17/68018, filed Dec. 21, 2017, which claims the benefit of Romanian Application No. A/2017/01143, filed Dec. 20, 2017; U.S. Provisional Application No. 62/580,360 (now expired), filed Nov. 1, 2017; U.S. Provisional Application No. 62/577,630 (now expired), filed Oct. 26, 2017; U.S. Provisional Application No. 62/606,511 (now expired), filed Sep. 26, 2017; U.S. Provisional Application No. 62/498,347 (now expired), filed Dec. 21, 2016; and U.S. Provisional Application No. 62/498,348 (now expired), filed Dec. 21, 2016. The disclosures of each application are hereby incorporated by reference herein in their entireties.

BACKGROUND

Technical Field

The present disclosure relates to an energy conversion, transfer, and storage system that is able to capture, store, and release energy according to the variable inputs outputs.

Description of the Related Art

Current energy conversion systems rely on combustion processes, primarily internal combustion engines for mobile or stationary applications, or electrical motors powered by batteries or connected to an electrical network.

These systems operate under variable conditions based on energy need and power generation requirements. Internal combustion engines for mobile applications must operate under a wide range of power conditions, which results in increased consumption and emissions due to transient operating conditions. Conventional brake energy recovery systems do not solve the efficiency problem due to additional mass and limited usage. The operation of an engine at a constant speed under different output conditions is a significant improvement, but requires an efficient intermediate energy storage device. Such a device could also improve the efficiency of the device that converts the chemical energy of the fuel into thermal energy and then into mechanical energy.

Conventional stationary energy sources rely on the constant speed of internal combustion engines or gas/steam turbines at electrical generation plants. These systems rely on the fuel combustion associated with harmful and greenhouse gas emissions. Renewable energy sources like wind, wave, and solar are characterized by large fluctuations in availability, increasing the need for flexibility, integrated complementarity among them, and also for intermediate storage.

Conventional vehicles and industrial processes generate large amounts of waste heat. The recovery of this energy needs reliable cost effective technical solutions able to convert the waste heat into mechanical or electrical energy.

The current systems, however, have disadvantages in their operation due to efficiency, usability, flexibility, cost, applicability, weight, packaging, manufacturability, temperature range, recyclability and durability.

Accordingly, it is an object of this disclosure to overcome these shortcomings of conventional systems, and more specifically, to overcome efficiency, packaging, weight, range of applicability, and manufacturing limitations.

Relatively simple hydraulic systems have been used for thousands of years and throughout the history of civilization, such as for irrigation and the provision of mechanical power using, for example, water wheels. In modern times, hydraulic systems have become increasingly sophisticated, and are used in a wide variety of industries for a wide variety of purposes. In general, hydraulic systems use liquids, and particularly pressurized liquids, to generate, control, and transmit mechanical power.

Various industrial, mechanical, and other systems, including many of those powered by renewable energy sources, rely on transient or intermittent energy or power generation. Thus, various systems for the temporary storage of energy have been developed to collect energy when generation exceeds demand and to release energy when demand exceeds generation.

Further, regenerative braking systems have been developed for use in vehicles such as automobiles, to recover and store a portion of the kinetic energy lost by the vehicle during deceleration. In such systems, energy that is otherwise typically dissipated by the vehicle's brakes is directed by a power transmission system to an energy store during deceleration. Such stored energy is held until required again by the vehicle, at which point it is converted back into kinetic energy of the vehicle and is used to accelerate the vehicle. The magnitude of the portion of the kinetic energy lost during deceleration that is stored in such systems depends on the type of storage and on drive train efficiency.

Such systems have been widely used in electrified railways by inverting the electric motors of trains and using them as generators while the train is braking. For internal combustion engine vehicles, however, it has been more difficult to implement regenerative braking systems because the energy conversion processes of internal combustion engines are difficult to reverse.

In some implementations, batteries can be used as energy storage systems, such as in regenerative braking systems, for use in automobiles. Drive motors of electric vehicles can be made to operate as generators supplying a braking torque to the wheels. In regenerative braking, the electric vehicle motor operates as a generator to charge a battery. The process is often less efficient at low speeds due to fixed mechanical losses, such that regeneration is often replaced or supplemented by mechanical braking at low speeds. At present, however, batteries are relatively expensive and have various drawbacks impeding their widespread adoption.

In some implementations, hydraulic accumulators can be used as energy storage systems, such as in regenerative braking systems, for use in automobiles. Hydraulic accumulators can operate by compressing a working gas such as a nitrogen gas, or by raising a weight, or compressing or extending a mechanical spring or other elastomeric component. Hydraulic accumulators are appealing due to their quiet operation, reliability, and durability. Compressed gas-based hydraulic accumulators are particularly practical, in part because they are generally light, compact, and inexpensive. As with electric vehicles and batteries, however, these systems also tend to be inefficient at low speeds.

In some implementations, flywheels can be used as energy storage systems, such as in regenerative braking systems, for use in automobiles. Flywheels are appealing due to their relatively high energy densities and their capacity to provide high energy transfer rates. Flywheels have various drawbacks, however, including that practical energy densities are significantly lower than the theoretical values due to losses arising from the weight of the associated bearings, motor/generator, shaft, and containment vessel. Various components of flywheels, their bearings, and their associated motors/generators also often use cooling systems to prevent overheating, adding complexity and cost. Further, safety is a concern because of a variety of potential accidental but catastrophic events.

In some implementations, elastomeric energy storage can be used as an energy storage system, such as in regenerative braking systems, for use in automobiles. Elastomeric energy storage systems are promising because of their simplicity—in one implementation, the vehicle's driveline is merely connected to an elastomer such that vehicle motion stresses the elastomer. Elastomeric energy storage systems have various drawbacks, however, including hysteresis or energy losses associated with cycling of the elastomeric material. Hysteresis and cycling deteriorate and heat the elastomer material, thereby reducing the achievable efficiency and reliability.

In some implementations, supercapacitors can be used as an energy storage system, such as in regenerative braking systems, for use in automobiles. Supercapacitors, also known as ultracapacitors or Goldcap, are high-capacity capacitors with capacitance values much higher than other capacitors, and bridge a gap between electrolytic capacitors and rechargeable batteries. Supercapacitors typically store many times more energy per unit volume or mass than electrolytic capacitors, can accept and deliver energy more quickly than batteries, and tolerate more charge-discharge cycles than rechargeable batteries. Supercapacitors also have various drawbacks, however, including smaller energy capacity per unit of weight relative to batteries, and complex electronic control and switching equipment.

In some implementations, recovery and conversion of heat into electric energy, such as by the Rankine cycle, can be used as an energy storage system, such as in regenerative braking systems, for use in automobiles. In other implementations, thermo-electrical generator systems can be used as an energy storage system, such as in regenerative braking systems, for use in automobiles. In other implementations, recovery of heat energy by the Rankine cycle and thermo-electrical generators are used in combination as an energy storage system, such as in regenerative braking systems, for use in automobiles.

Since control of hydraulic systems is based on energy dissipation, hydraulic fluid tends to heat up and need cooling in order to maintain a temperature for proper performance of the hydraulic oil. Thus, heating a hydraulic fluid is generally considered to be detrimental. Hydraulic fluid cooling devices typically have a tubular structure, and employ one or more coils to contain the hydraulic fluid proximate to the cooling fluid, according to a cross-flow principle for fluid, liquids, or air. State-of-the-art heat exchangers for hydraulic oil rely on one or more of the three heat transfer mechanisms: convection, conduction, and radiation.

For cold running conditions, hydraulic heaters are used in which an electrical resistor is immersed in the fluid reservoir. Constant running conditions for fuel burners are used to heat buildings using liquid or gaseous fuels. In order to reduce nitrogen emissions, radiative burners are currently under study in order to assure a low temperature flame and, consequently, low nitrogen emissions.

Current systems have, however, lacked in their operation due to efficiency, usability, flexibility, cost, applicability, weight, packaging, manufacturability, temperature range, recyclability, and durability. Accordingly, it is the intent of this disclosure to overcome these shortcomings of the prior art, and more specifically, to overcome efficiency, packaging, weight, range of applicability and manufacturability limitations.

There is a continuing need in the art for improved energy storage and regenerative braking systems, such as for use in automobiles, to overcome limitations that have been traditionally associated with such existing systems.

BRIEF SUMMARY

An Integrated Energy Conversion, Transfer, and Storage System is provided to improve the efficiency of energy generation and consumption for systems that rely on variable energy generation or energy consumption. The Integrated Energy Conversion, Transfer, and Storage System includes double-sided hydraulic units integrated with double-sided hydro-mechanical accumulator units and double-sided directional control valves to capture, store and release energy according to availability and power needs. The system integrates mechanical, hydraulic and thermal energy sources, releasing energy for multiple mechanical sources at different mechanical parameters and connections than input and also releasing energy for electrical storage and consumption.

Considering that energy systems have to adapt to large power ranges in order to cover applicability needs and that renewable energy is characterized by numerous fluctuations, the Integrated Energy Conversion, Transfer, and Storage System, in accordance with the exemplary embodiments of the present disclosure, is provided. In an integrated manner, the Integrated Energy Conversion, Transfer, and Storage System includes double-sided hydraulic devices acting as variable displacement hydraulic pumps or motors coupled with directional control valves and double-sided accumulator units. The core structure is extendable for multiple hydraulic inputs and hydraulic actuated mechanical outputs coupled in series and parallel based on the particular application.

Electrical output generation is also integrated. In addition to mechanical hydraulic energy generation, thermal energy is also converted into hydraulic energy and then into electrical or mechanical energy, according to the particular application. The embodiments are related to improving the efficiency of energy systems like vehicles, renewable energy sources allow them to run at higher efficiencies than current applications due to the intermediate storage capacity and flexible power conversion capabilities given by fluid power. Relying on intermediate energy storage allows applications of alternative conversion systems that might run at constant running conditions and consequently at higher efficiencies.

An integrated hybrid energy recovery and storage system for recovering and storing energy from multiple energy sources may be summarized as including an accumulator unit that includes a high pressure accumulator and a low pressure accumulator, the accumulator unit having a first side and a second side; at least one piston mounted for reciprocation in the high pressure accumulator, the accumulator unit configured to receive, store, and transfer energy from the hydraulic fluid to energy storage media; two or more rotational directional control valves, wherein at least one rotational directional control valve is positioned on each side of the accumulator unit, each rotational directional control valve includes multiple ports; the high pressure accumulator is connected to a port of the rotational directional control valve on the first side and a port of the rotational directional control valve on the second side, the low pressure accumulator is connected to a port of the rotational directional control valve on the first side and a port of the rotational directional control valve on the second side; and two or more variable displacement hydraulic rotational units, wherein at least one variable displacement hydraulic rotational unit is positioned adjacent each of the rotational directional control valves, each variable displacement hydraulic rotational unit connected to a rotational directional control valve via a port of the rotational directional control valve and a hydraulic pipe.

The system may further include a first mechanical transmission with a mechanical input coupling connected via a first mechanical shaft to one of the variable displacement hydraulic rotational units of the two or more variable displacement hydraulic rotational units.

The system may further include a second mechanical transmission with a mechanical output coupling connected via a second mechanical shaft to another of the variable displacement hydraulic rotational units of the two or more variable displacement hydraulic rotational units.

The system may further include a hydraulic connector that links the high pressure accumulator with a hydraulic circuit.

The system may further include a hydraulic connector that links the low pressure accumulator with the hydraulic circuit.

The system may further include a pressure valve that enables hydraulic fluid to be released if peak loads occur to the low pressure accumulator, by way of a connection pipe.

The system may further include a hydraulic pipe that is used as a bypass connection to the high pressure accumulator. The energy storage media may be an elastic component.

The system may further include a controller that regulates transfer of the recovered energy in the accumulator. The controller may direct pressurized hydraulic fluid to a variable displacement hydraulic rotational unit via a rotational directional control valve. The variable displacement hydraulic rotational unit may act as a motor driven by pressurized fluid. The system may be configured to recover, store, and release energy in a controlled manner based on availability and power requirements. The energy source may be radiative, electrical, vehicular, wind, wave, solar, or waste heat. The variable displacement hydraulic rotational unit may be able to act as a hydraulic pump, and alternatively the variable displacement hydraulic rotational unit may be able to act as motor.

The system may further include an energy recovery component that recovers energy from multiple energy sources.

The system may further include a thermal unit from which energy is recovered by the system.

A hydraulic accumulator system may be summarized as including an outer housing; a first open chamber within the outer housing; a second open chamber within the outer housing; an inner dividing wall that separates the first open chamber from the second open chamber; and a conduit that extends through the inner dividing wall along a length of the hydraulic accumulator system.

The hydraulic accumulator system may further include a hydraulic flow control valve coupled to the first open chamber and to the second open chamber; and a hydraulic motor coupled to the hydraulic flow control valve.

The hydraulic accumulator system may further include a wheel coupled to the hydraulic motor.

The hydraulic accumulator system may further include an axle extending through the conduit, the wheel coupled to an end of the axle. The outer housing may have a circular cross-sectional shape. The outer housing may have a elliptic cross-sectional shape. The inner dividing wall may be elastomeric and deformable, and the inner dividing wall may store energy by deforming when a first pressure within the first open chamber differs from a second pressure within the second open chamber. The first open chamber may include a high-pressure accumulator and the second open chamber may include a low-pressure accumulator.

The hydraulic accumulator system may further include an elastic element positioned within the first open chamber.

The hydraulic accumulator system may further include a first piston that seals the elastic element within the first open chamber.

The hydraulic accumulator system may further include a second piston that seals the elastic element within the first open chamber. The elastic element may be a mechanical helical spring. The elastic element may be a mechanical disc spring. The elastic element may be an elastomeric hose. The elastic element may be a compressed gas.

The hydraulic accumulator system may further include two elastic elements positioned within the first open chamber. The two elastic elements may have different elasticities.

The hydraulic accumulator system may further include three elastic elements positioned within the first open chamber.

The hydraulic accumulator system may further include a first port allowing hydraulic access to the first open chamber; and a second port allowing hydraulic access to the second open chamber.

The hydraulic accumulator system may further include a third port allowing hydraulic access to the first open chamber; and a fourth port allowing hydraulic access to the second open chamber.

A heat exchanger may be summarized as including a combustion chamber having an inlet port and an exhaust outlet port that define a combustion gas flow path between the inlet port and the exhaust outlet port; and a fluid conduit oriented transverse to the combustion gas flow path, the fluid conduit directing the fluid through the combustion chamber, the fluid conduit including thermally conductive elements from which the fluid absorbs heat of combustion from within the combustion chamber.

The heat exchanger may further include a second inlet port, the first and second inlet ports permitting two different fuel types to enter and mix within the combustion chamber.

A heat exchanger may be summarized as including a combustion chamber having an inlet port and an exhaust outlet port that define a combustion gas flow path between the inlet port and the exhaust outlet port; and a fluid conduit coiled within the combustion chamber, the fluid conduit arranged in a circular path through the combustion chamber, the fluid conduit including thermally conductive elements from which a fluid within the fluid conduit absorbs heat of combustion from within the combustion chamber.

A heat exchanger may be summarized as including a plurality of radiative burners having a common inlet port, and a common exhaust outlet port, the radiative burners configured to transfer heat of combustion by radiation; and a plurality of fluid panels substantially aligned with one another and interdigitated with the radiative burners, the fluid panels arranged to direct fluid in close proximity to the radiative burners so as to absorb the heat of combustion.

A hybrid heat exchanger may be summarized as including a cylindrical combustion chamber having an inlet port and an exhaust outlet port; a cylindrical fluid chamber coaxial with, and internal to, the cylindrical combustion chamber;

and an electric heater having a resistive heating element that is coaxial with, and internal to, the cylindrical fluid chamber, the cylindrical fluid chamber thus arranged to absorb either heat of combustion from the combustion chamber, or heat radiated by the electric resistive heater, or both radiated heat and heat of combustion at the same time.

A heat exchanger may be summarized as including an elongated heat source; and a U-shaped fluid conduit that circulates fluid proximate to the elongated heat source so as to absorb heat from the elongated heat source, the U-shaped fluid conduit being made of a thermally conductive material. The elongated heat source may be a hot surface. The elongated heat source may be a waste heat carrying fluid pipe.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been selected solely for ease of recognition in the drawings.

FIGS. 4A and 4B are schematic views of an Integrated Energy Conversion, Transfer, and Storage System with double action functionality showing structures having an integrated direct mechanical transmission.

FIGS. 6A and 6B are schematic views of an Integrated Energy Conversion, Transfer, and Storage System with double action functionality showing a multiple hydraulic unit structure.

FIG. 32A is a schematic diagram of a side elevation view of a double-sided accumulator having parallel integrated high-pressure and low-pressure accumulators, according to at least one illustrated embodiment.

FIG. 32B is a schematic diagram of a side elevation view of a double-sided accumulator having parallel integrated high-pressure and low-pressure accumulators, according to at least one illustrated embodiment.

FIG. 32C is a schematic diagram of a cross-sectional end view of a double-sided accumulator having a high-pressure accumulator and a low-pressure accumulator, according to at least one illustrated embodiment.

FIG. 32D is a schematic diagram of a cross-sectional end view of a double-sided accumulator having a high-pressure accumulator and a low-pressure accumulator, according to at least one illustrated embodiment.

FIG. 36A illustrates a cross-sectional view of a double-sided accumulator having a high-pressure accumulator and a low-pressure accumulator, according to at least one illustrated embodiment.

FIG. 36B illustrates cross-sectional and close-up views of a double-sided accumulator having a high-pressure accumulator and a low-pressure accumulator, according to at least one illustrated embodiment.

FIG. 37A illustrates perspective and partially-exploded views of components of a double-sided accumulator having a high-pressure accumulator and a low-pressure accumulator, according to at least one illustrated embodiment.

FIG. 37D illustrates some components illustrated in FIG. 37C isolated from the rest of the system, according to at least one illustrated embodiment.

FIG. 37E illustrates perspective and exploded views of components of a double-sided accumulator having a high-pressure accumulator and a low-pressure accumulator, according to at least one illustrated embodiment.

FIG. 41A illustrates an integrated set of multiple accumulators, according to at least one illustrated embodiment.

FIG. 50 is a table showing properties of, and relationships between, various emission reduction principles.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, un-recited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

Figure 1:
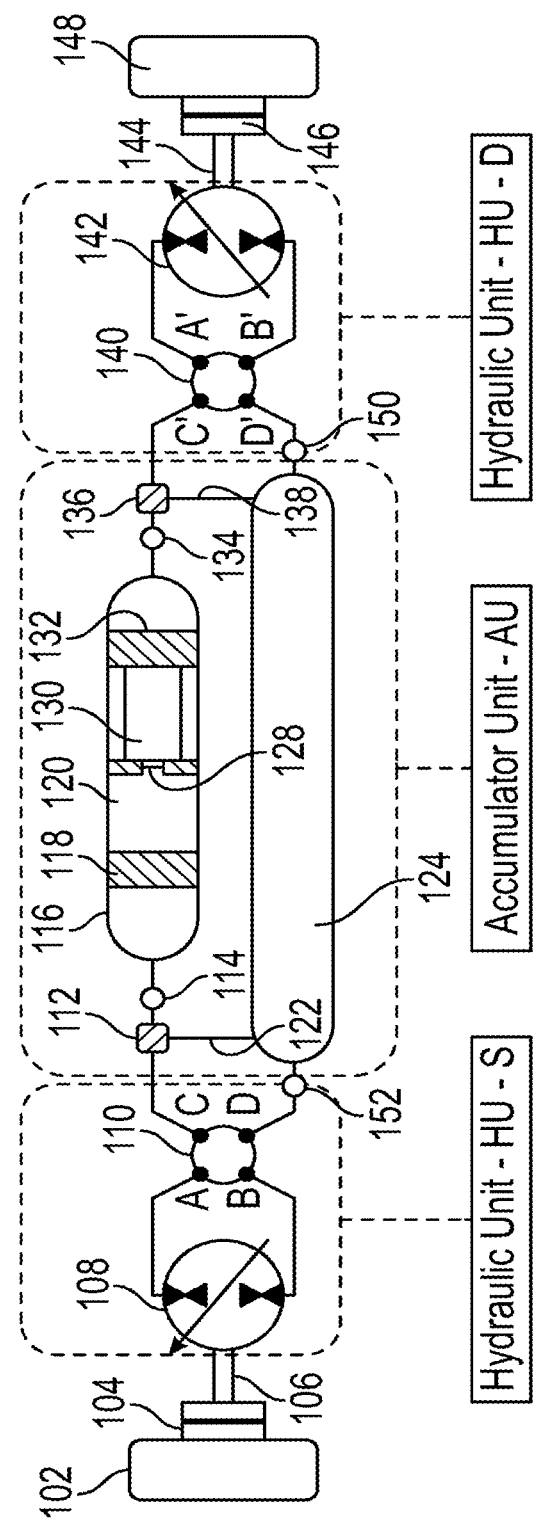
FIG. 1 is a schematic view of an Integrated Energy Conversion, Transfer, and Storage System with double action functionality showing details of a double-sided high pressure accumulator.

As shown in FIG. 1, in some implementations of the Integrated Energy Conversion, Transfer, and Storage System employ integrated mechanical-hydraulic energy conversion. This type of integrated mechanical-hydraulic energy conversion provides the technological improvement of integrating hydraulic units, such as directional control valves and accumulator units. Additionally, the Integrated Energy Conversion, Transfer, and Storage System incorporates a dual-action configuration that reduces flow speed and hydraulic power loss. Furthermore, the Integrated Energy Conversion, Transfer, and Storage System integrates different energy sources and energy outputs.

The implementation of the Integrated Energy Conversion, Transfer, and Storage System shown in FIG. 1 is positioned between a mechanical transmission 102 with a mechanical input coupling 104 on one end and a mechanical transmission 148 with a mechanical output coupling 146 on the other end. In this implementation, the Integrated Energy Conversion, Transfer, and Storage System achieves the technological functions of active control of the mechanical output parameters, intermediate energy storage, and direct connection of a mechanical input coupling 104 and a mechanical output coupling 146.

Some implementations of the Integrated Energy Conversion, Transfer, and Storage System utilize the coupling of a variable displacement hydraulic power unit (HU1) connected to the mechanical input coupling 104, with a directional control valve 110 on one side of an accumulator unit (AU). On the other side of the accumulator unit is coupled a directional control valve 140 connected to a variable displacement hydraulic power unit (HU2), which is mechanically connected to the mechanical output coupling 146. A mechanical shaft 106 provides a direct connection to the mechanical input coupling 104 on one end and a mechanical shaft 144 provides a direct connection of the mechanical output coupling 146 on the other end.

In the Integrated Energy Conversion, Transfer, and Storage System, the mechanical rotational energy provided by the mechanical couplings 104 and 146 is converted into hydraulic energy by the variable displacement hydraulic power units HU1 and HU2, which direct the hydraulic energy to the accumulator unit AU. The hydraulic energy may then fill the accumulator unit AU. As a result, all or part of the transmitted mechanical energy is stored by the displacement imposed by the variable displacement hydraulic power units HU1 and HU2. When the stored energy within the accumulator unit AU is released by the displacement of the variable displacement hydraulic power units, the hydraulic energy is converted into mechanical energy and added to the mechanical power transferred between the mechanical input coupling 104 and the mechanical output coupling 146. The directional control valves 110 and 140 switch between input and output of the connections of the hydraulic power units HU1 and HU2 to the accumulator unit AU.

In at least one implementation of the Integrated Energy Conversion, Transfer, and Storage System, the components of the variable displacement hydraulic power units HU1 and HU2, directional control valves 110 and 140, and accumulator unit AU are integrated, which allows a larger flow path and reduced flow velocities. Accordingly, the Integrated Energy Conversion, Transfer, and Storage System increases system efficiency by reducing flow losses. An additional benefit of this component integration is significant mass reduction. By having two hydraulic units connected to the accumulator unit, the flow is decreased by a factor of two. Thus, the hydraulic power losses are reduced by a factor of eight (i.e., the cube power of the velocity reduction).

In some implementations, the Integrated Energy Conversion, Transfer, and Storage System may be configured to extend to multiple energy input sources, as well as multiple mechanical and/or electrical sources. The structure of the system may be extended using a hydraulic input system that includes hydraulic pipes connected between the directional control valves and the hydraulic input system. Additionally, the structure of the Integrated Energy Conversion, Transfer, and Storage System may be extended by using a sonic electrical generator that includes hydraulic pipes connected between the directional control valves 110 and 140 and the sonic electrical generator. Further, the structure of the Integrated Energy Conversion, Transfer, and Storage System may be extended by using multiple mechanical outputs.

In at least one implementation, the Integrated Energy Conversion, Transfer, and Storage System includes a single hydraulic unit, which integrates the variable displacement hydraulic rotational unit 108 and the rotational directional control valve 110 with the accumulator unit, which integrating the high pressure accumulator 116 and the low pressure accumulator 124. In other implementations, the Integrated Energy Conversion, Transfer, and Storage System includes dual hydraulic units positional on opposite sides of the accumulator unit.

In some implementations of the Integrated Energy Conversion, Transfer, and Storage System, the hydraulic unit HU1 includes the variable displacement hydraulic rotational unit 108 and the rotational directional control valve 110. The variable displacement hydraulic rotational unit 108 acts alternately as hydraulic pump or motor by transferring mechanical torque that is coupled to the mechanical transmission 102 via the shaft 106 and coupling 104. The hydraulic circuit includes rotational directional control valve 110, which creates flow connections of the inlet and outlet ports A and B, of the variable displacement hydraulic rotational unit 108 with the high pressure accumulator 116 using port C and the low pressure accumulator 124 using port D.

Located within the high pressure accumulator 116 is piston 118 that transfers energy from the hydraulic fluid to the energy storage media 120, which is an elastic component. The hydraulic connector 114 links the high pressure accumulator 116 with the hydraulic circuit. The pressure valve 112 enables hydraulic fluid to be release if peak loads occur to the low pressure accumulator 124, by way of the connection pipe 122. The low pressure accumulator 124 is connected to the hydraulic circuit by hydraulic connector 126.

In the implementation shown in FIG. 1, the Integrated Energy Conversion, Transfer, and Storage System has a dual-action configuration. This dual-action configuration is an extension of a single action brake energy recovery system. The dual-action configuration of the Integrated Energy Conversion, Transfer, and Storage System creates a mechanical torque transfer path between two rotational mechanical transmissions 102 and 148. The dual-action configuration has intermediate energy storage capabilities from the rotational mechanical transmissions 108 and 148, and can change the torque transferred between the rotational mechanical transmissions.

The dual action implementation of the Integrated Energy Conversion, Transfer, and Storage System uses the hydraulic unit HU2 coupled to the accumulator unit AU in addition to hydraulic unit HU1. The hydraulic unit HU2 has the same construction as hydraulic unit HU1. The hydraulic unit HU2 includes rotational directional control valve 140 and variable displacement hydraulic rotational unit 142, which connect to the hydraulic connector 134 of the high pressure accumulator 116, and pressure valve 136 which is connected to the low pressure accumulator 124 using hydraulic pipe 138. The hydraulic unit HU1 is also connected to the low pressure accumulator 124 using hydraulic coupling 150.

In some implementations, the Integrated Energy Conversion, Transfer, and Storage System also includes a rotational directional control valve 140 includes ports A' and B' connected to variable displacement hydraulic rotational unit 142, port C' to high pressure accumulator 116, and port D' to the low pressure accumulator 124. The variable displacement hydraulic rotational unit 142 is connected to mechanical transmission 148 via the mechanical shaft 144 and mechanical coupling 146.

In a dual action implementation of the Integrated Energy Conversion, Transfer, and Storage System, the accumulator unit includes a high pressure accumulator 116 and the low pressure accumulator 124. A hydraulic piston 118 is positioned within high pressure accumulator 116 and converts the hydraulic energy of the fluid flow transferred by variable displacement hydraulic rotational unit 108 and controlled by rotational directional control valve 110 to storage media 120. A hydraulic piston 132 is also positioned within the high pressure accumulator 116, and converts the hydraulic energy of the fluid flow transferred by variable displacement hydraulic rotational unit 142 and is controlled by rotational directional control valve 140 to the storage media 130. Storage media 130 is sustained against the walls and the storage media 120 by the supporting wall 128.

Figure 2A:
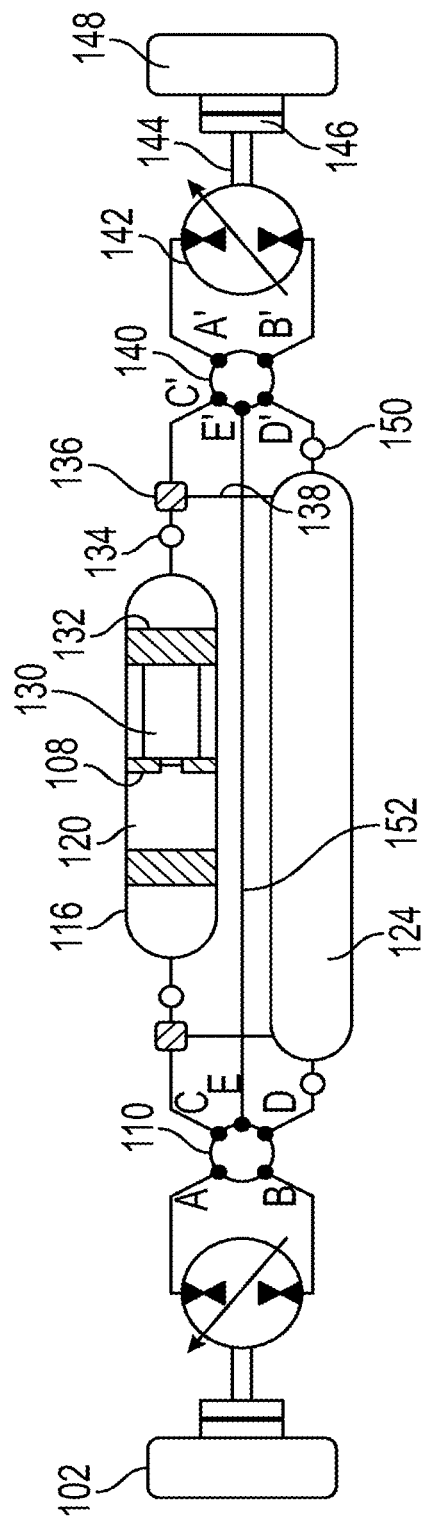
FIG. 2A is a schematic view of an Integrated Integrated Energy Conversion, Transfer, and Storage System with double action functionality showing a structure having an integrated hydrostatic transmission.

Referring now to FIG. 2A, an implementation of the Integrated Energy Conversion, Transfer, and Storage System is shown with an integrated hydrostatic transmission. The integrated hydrostatic transmission adds the additional capability to the system of integrating a continuous variable transmission between mechanical transmission 102 and mechanical transmission 148. Specifically, a hydraulic pipe 152 is used as a bypass connection to the high pressure accumulator 116. In this implementation, the rotational directional control valve 110 includes an additional port E and rotational directional control valve 140 includes an additional port E'. Hydraulic pipe 152 is connected between ports E and E'.

Figure 2B:
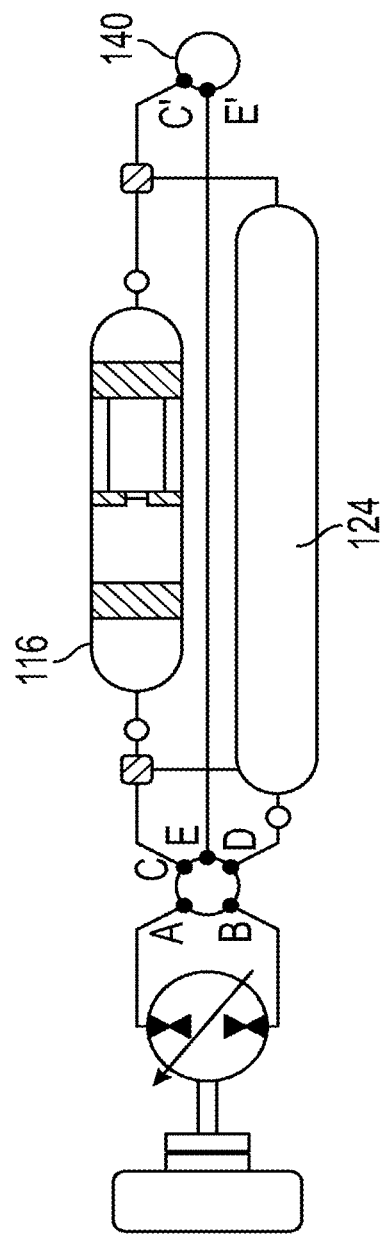
FIG. 2B is a schematic view of an Integrated Energy Conversion, Transfer, and Storage System with double action functionality showing a single side structure.

In a single sided implementation of the Integrated Energy Conversion, Transfer, and Storage System, as shown to FIG. 2B, the double action functionality of the accumulator unit is incorporated into a single mechanical transmission. The rotational directional control valve 140 includes port C' that is connected to high pressure accumulator 116, and a port E' that is connected to low pressure accumulator 124. This single sided implementation of the Integrated Energy Conversion, Transfer, and Storage System, does not include the variable displacement hydraulic rotational unit 142, the mechanical shaft 144, the mechanical coupling 146, or the mechanical transmission 148.

Figure 3:
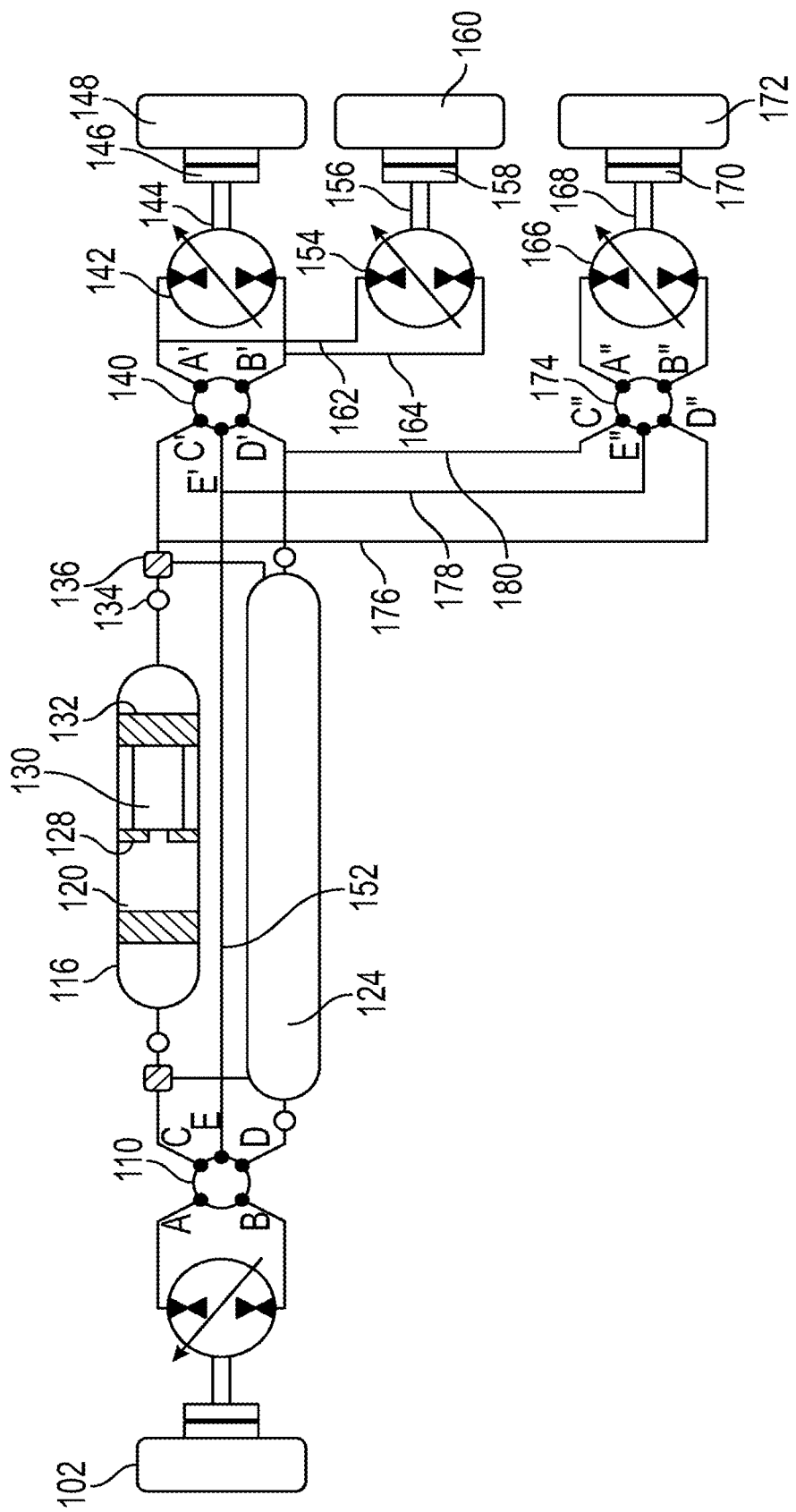
FIG. 3 is a schematic view of an Integrated Energy Conversion, Transfer, and Storage System with double action functionality showing multiple output structures.

Referring now to FIG. 3, other implementations of the Integrated Energy Conversion, Transfer, and Storage System are shown with multiple power outputs. In the first implementation, all output actuators are controlled by a single directional control valve. This implementation demonstrates system structures that are hydraulically connected in parallel. For this implementation the hydraulic circuit splits between rotational directional control valve 140 and variable displacement hydraulic rotational unit 142, which establishes a hydraulic circuit to connect additional variable displacement hydraulic rotational unit 154. The hydraulic circuit includes hydraulic pipes 162 and 164. Variable displacement hydraulic rotational unit 154 transfers torque to mechanical transmission 160, using the mechanical shaft 156 and the mechanical coupling 158.

In the second implementation of the Integrated Energy Conversion, Transfer, and Storage System, separate control is provided to each output actuator. This implementation includes an additional rotational directional control valve 174, which has similar connecting ports A", B", C", D", E", F" as rotational directional control valve 140. The additional rotational directional control valve 174 is connected using hydraulic pipes 176, 178, 180. The variable displacement hydraulic rotational unit 166 transfers torque to the mechanical transmission 172 using the mechanical shaft 168 and the mechanical coupling 170.

Referring now to FIG. 4A, in some implementations, the Integrated Energy Conversion, Transfer, and Storage System includes an integrated mechanical transmission with a direct mechanical torque transfer path. In this implementation, the direct mechanical torque transfer path is a torque transfer shaft 182 between two rotational mechanical transmissions 102 and 148 that are directly connected to mechanical couplings 104 and 146. The torque transfer shaft 182 is connected to the rotational mechanical transmissions 102 and 148 without intermediate hydraulic energy conversion. The mechanical design of the accumulator unit and hydraulic units relies on creating a hollow path for torque transfer shaft 148.

Referring now to FIG. 4B, in some implementations, the Integrated Energy Conversion, Transfer, and Storage System includes an integrated power split transmission. In this implementation, the integrated power split transmission includes the additional components of gear set 184 rigidly connected to mechanical shaft 106 and gear set 186 rigidly connected to mechanical shaft 144. The outputs of gear sets 184 and 186 are connected by mechanical shaft 188. In this implementation, the torque transfer may be continuously adjusted by adjusting the displacement of the variable displacement hydraulic rotational units 108 and 142.

Figure 5B:
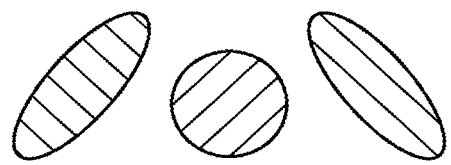
FIG. 5B shows a sectional view A-A of the core Integrated Energy Conversion, Transfer, and Storage System.
Figure 5A:
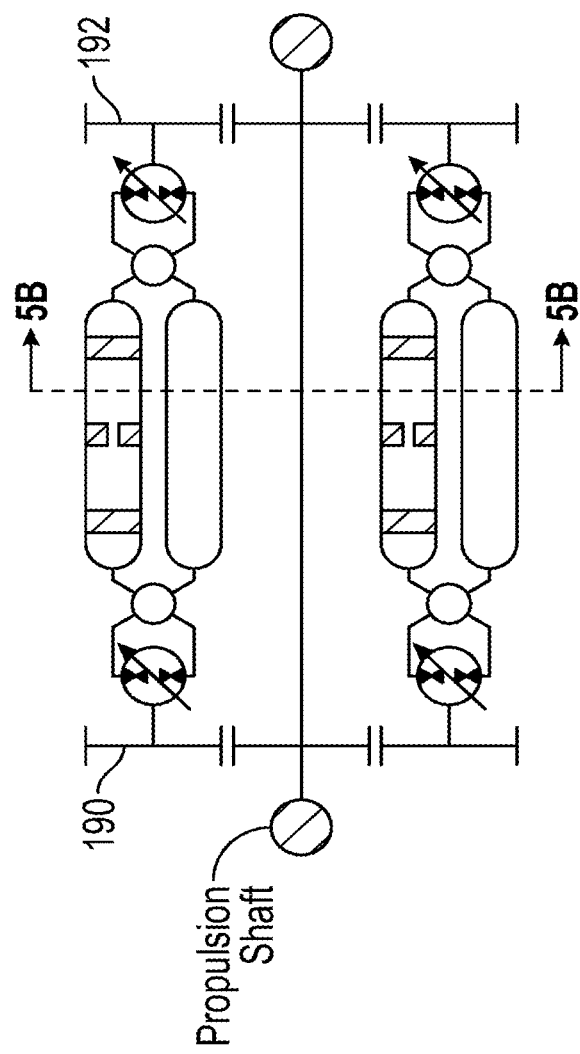
FIG. 5A is a schematic view of an Integrated Energy Conversion, Transfer, and Storage System with double action functionality showing a structure having an integrated power split transmission.

Referring now to FIGS. 5A-5B, some implementations of the double action Integrated Energy Conversion, Transfer, and Storage System have a multiple hydraulic unit configuration. With regard to the implementation depicted in FIG. 5A, the core assembly of Integrated Energy Conversion, Transfer, and Storage System includes two hydraulic power and control units and the included accumulator units. Additional core assemblies of Integrated Energy Conversion, Transfer, and Storage System may be linked to the propulsion shaft by gear sets in a modular manner to create flexible, larger energy storage and conversion capacities. Specifically, FIG. 5A illustrates the connection of two core assemblies of Integrated Energy Conversion, Transfer, and Storage System to propulsion shafts using gear sets 190 and 192. FIG. 5B shows a sectional view A-A of the core Integrated Energy Conversion, Transfer, and Storage System. This view illustrates how the Integrated Energy Conversion, Transfer, and Storage System may be positioned to meet packaging constraints.

Referring now to FIGS. 6A-6B, an implementation of the Integrated Energy Conversion, Transfer, and Storage System is shown with additional core assemblies. The additional core assemblies integrate the propulsion shafts using gear sets 194, 196, 198 and 200.

Figure 7:
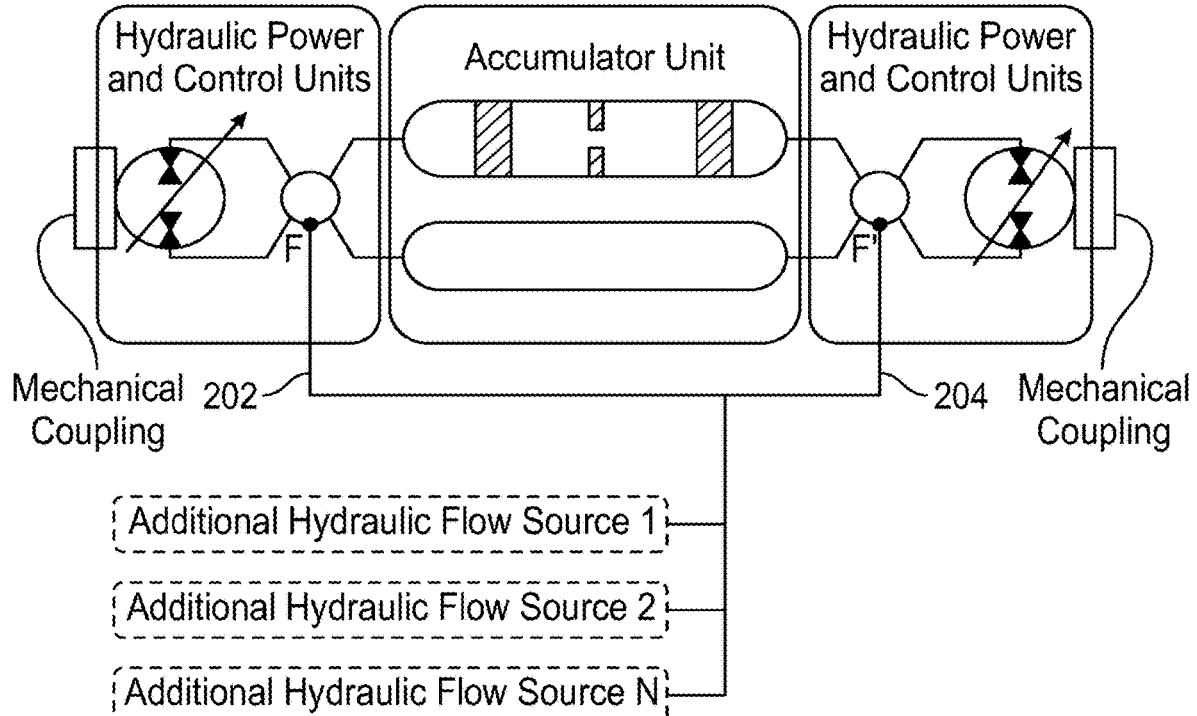
FIG. 7 is a schematic view of an Integrated Energy Conversion, Transfer, and Storage System with double action functionality showing integration of multiple additional hydraulic sources.

FIG. 7 illustrates an implementation of the Integrated Energy Conversion, Transfer, and Storage System with double action functionality that integrates an additional hydraulic source. In some implementations, additional hydraulic flow sources may be incorporated to integrate the additional hydraulic source with the Integrated Energy Conversion, Transfer, and Storage System. In such implementations, hydraulic pipes 202 and 204 provide a connection from the additional hydraulic flow sources to the directional valves of Integrated Energy Conversion, Transfer, and Storage System using additional ports F and F'.

In implementations in which additional hydraulic sources are available, as well as additional Integrated Energy Conversion, Transfer, and Storage Systems to be connected, the additional hydraulic sources are connected in parallel. An example of a multiple additional hydraulic flow source application is a combined wind wave application as described in related application Serial No. entitled "Integrated Renewable Energy and Waste Heat Harvesting System," App. Ser. No. 62/606,521, filed Sep. 26, 2017, which is incorporated by reference herein in its entirety.

Figure 8:
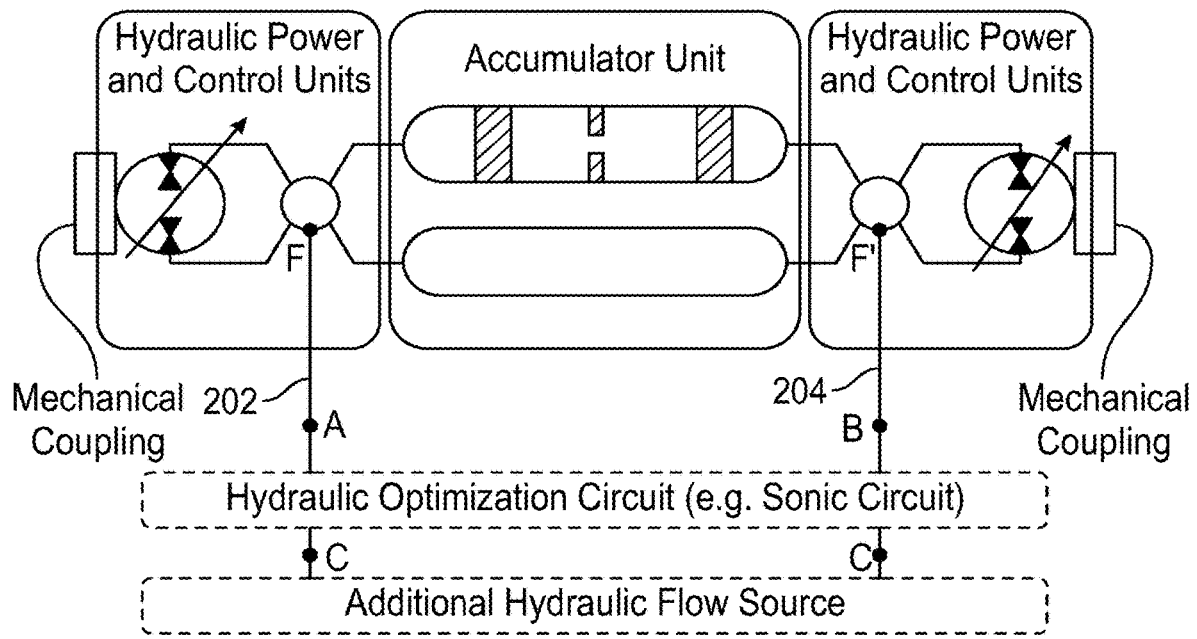
FIG. 8 is a schematic view of an Integrated Energy Conversion, Transfer, and Storage System with double action functionality showing integration of a hydraulic optimization circuit and additional hydraulic sources.

Referring now to FIG. 8, to improve hydraulic performance, a generic hydraulic optimization circuit is included between the basic additional hydraulic flow source and the Integrated Energy Conversion, Transfer, and Storage System. An example of a hydraulic optimization circuit is a sonic circuit as described in related application Ser. No. 15/731,360, filed Jun. 1, 2017, entitled "Thermo-Hydraulic Pressure Wave Based Propulsion System," which is incorporated by reference in its entirety.

Figure 9:
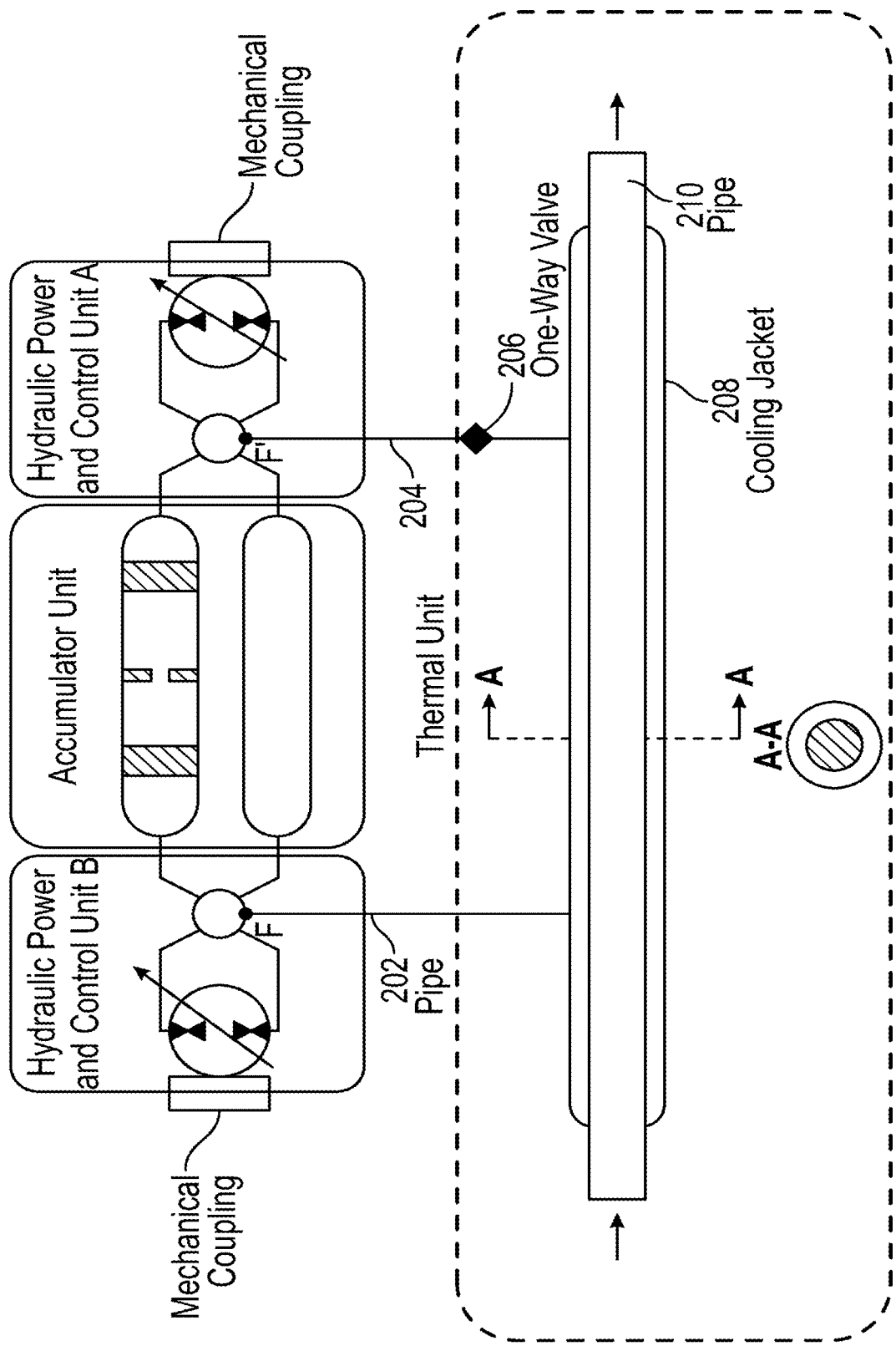
FIG. 9 is a schematic view of an Integrated Energy Conversion, Transfer, and Storage System with double action functionality showing integration of additional thermal borne hydraulic sources using a tubular structure.

Referring now to FIG. 9, in implementation of an Integrated Energy Conversion, Transfer, and Storage System is shown with double action functionality that integrates additional thermal hydraulic sources. This implementation adds heat to a flowing media. The flowing media is heated to accumulate energy from an external heat source and release the energy to the hydraulic core system. To implement this cycle, pipe 204 is connected to the port F' of the core Integrated Energy Conversion, Transfer, and Storage System. The hydraulic power and control unit A acts as hydraulic pump for the thermal unit. The thermal unit includes a hydraulic liquid jacket 208 that has a circular shape and surrounding pipe 210 that is the flow path for the fluid (e.g., gas or liquid) where heat transfer develops, which may be wither heating or cooling.

In the implementation of the Integrated Energy Conversion, Transfer, and Storage System shown in FIG. 9, the outer material of the cooling jacket 208 includes an insulating material. Notably, the pipe assemblies 208 and 210 act as a counter-flow convective-conductive heat exchanger. To create the flow circuit, the one-way valve 206 provides the flow path from hydraulic power and control unit A, which acts as a hydraulic pump, to the directional control valve of the hydraulic power and control unit B via port F. At the hydraulic power and control unit B, the thermal energized liquid is directed to the accumulator unit or the variable displacement power unit which acts as a hydraulic motor. An example of a convective-conductive hydraulic heat exchanger is described in Ser. No. 15/731,360, filed Jun. 1, 2017, which is incorporated by reference above.

Figure 10:
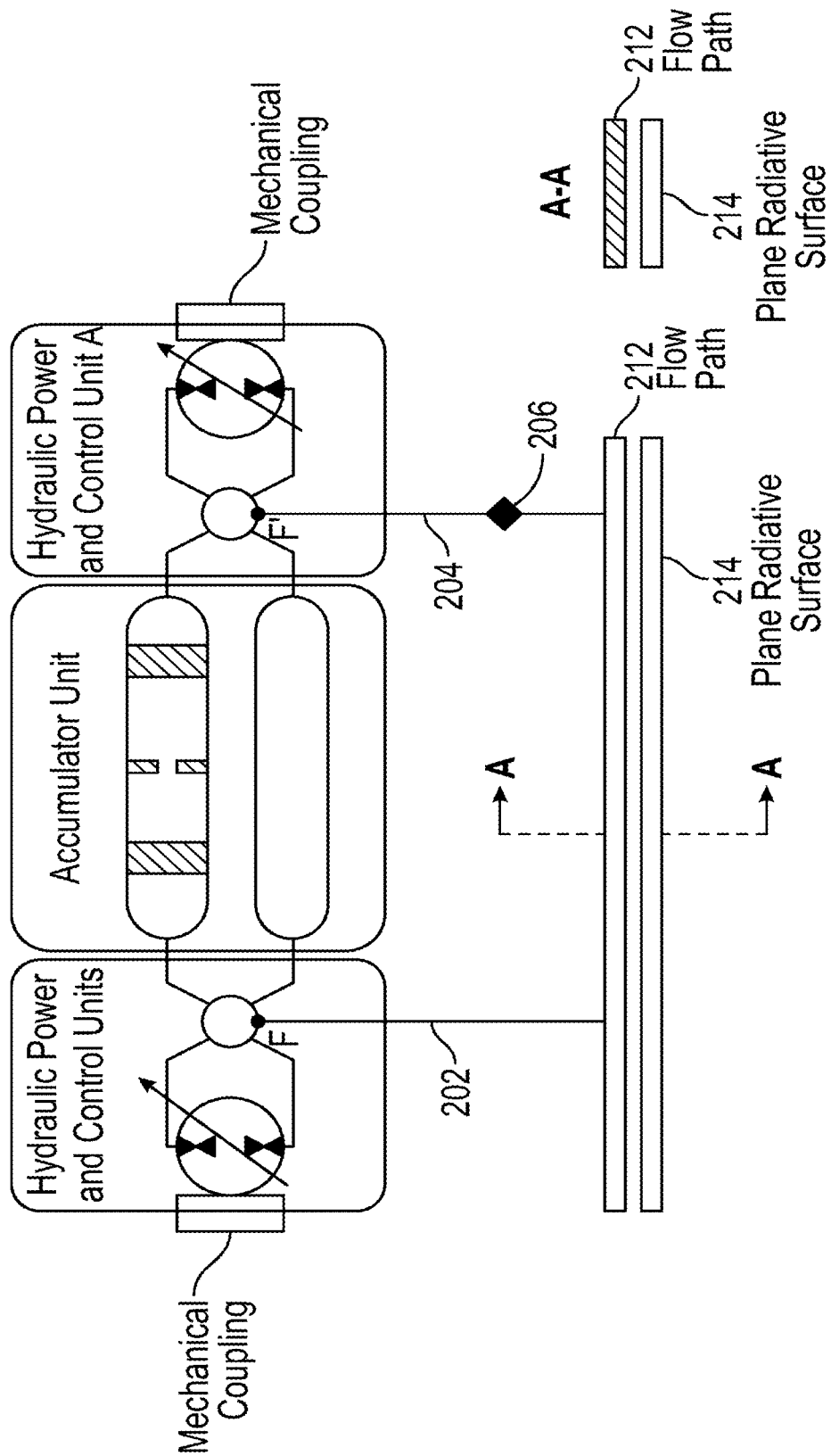
FIG. 10 is a schematic view of an Integrated Energy Conversion, Transfer, and Storage System with double action functionality showing integration of additional thermal borne hydraulic sources using a planar/surface structure.

Referring now to FIG. 10, in some implementations of the Integrated Energy Conversion, Transfer, and Storage System, a radiative heat source is integrated into the system. In one such implementation, the plane radiative surface 214 is placed in front of the rectangular flow space 212 as shown in sectional view A-A, for a maximum radiative view factor. The flow space contains the fluid that is driven by the hydraulic power and control unit A towards the accumulator unit and/or the hydraulic power and control unit B.

Figure 11:
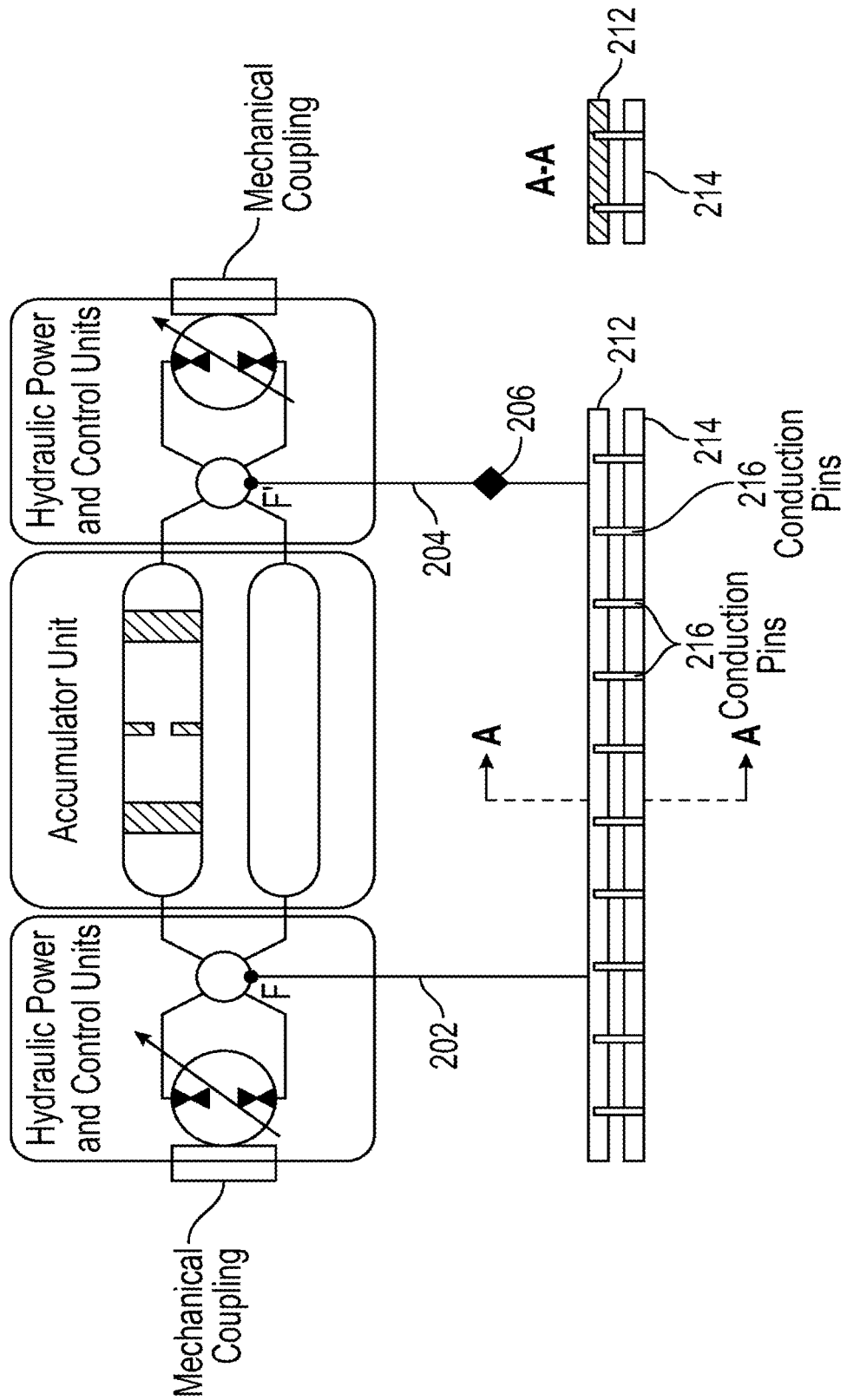
FIG. 11 is a schematic view of an Integrated Energy Conversion, Transfer, and Storage System with double action functionality showing integration of additional thermal borne hydraulic sources using a planar/surface structure having additional conduction support.

As shown in the implementations of the Integrated Energy Conversion, Transfer, and Storage System of FIG. 11, conduction heat transfer from the radiative surface may be enhanced by using conduction pins 216, which are placed in contact with the hot surface 214, and integrated within the flow path 212. The conduction pins 216 increase the contact surface of the work liquid with the heat source, thereby generating a combined radiative-conduction heat source. An example of a radiative conductive hydraulic heat exchanger is described in Ser. No. 15/731,360, filed Jun. 1, 2017, as incorporated by reference above.

Figure 12:
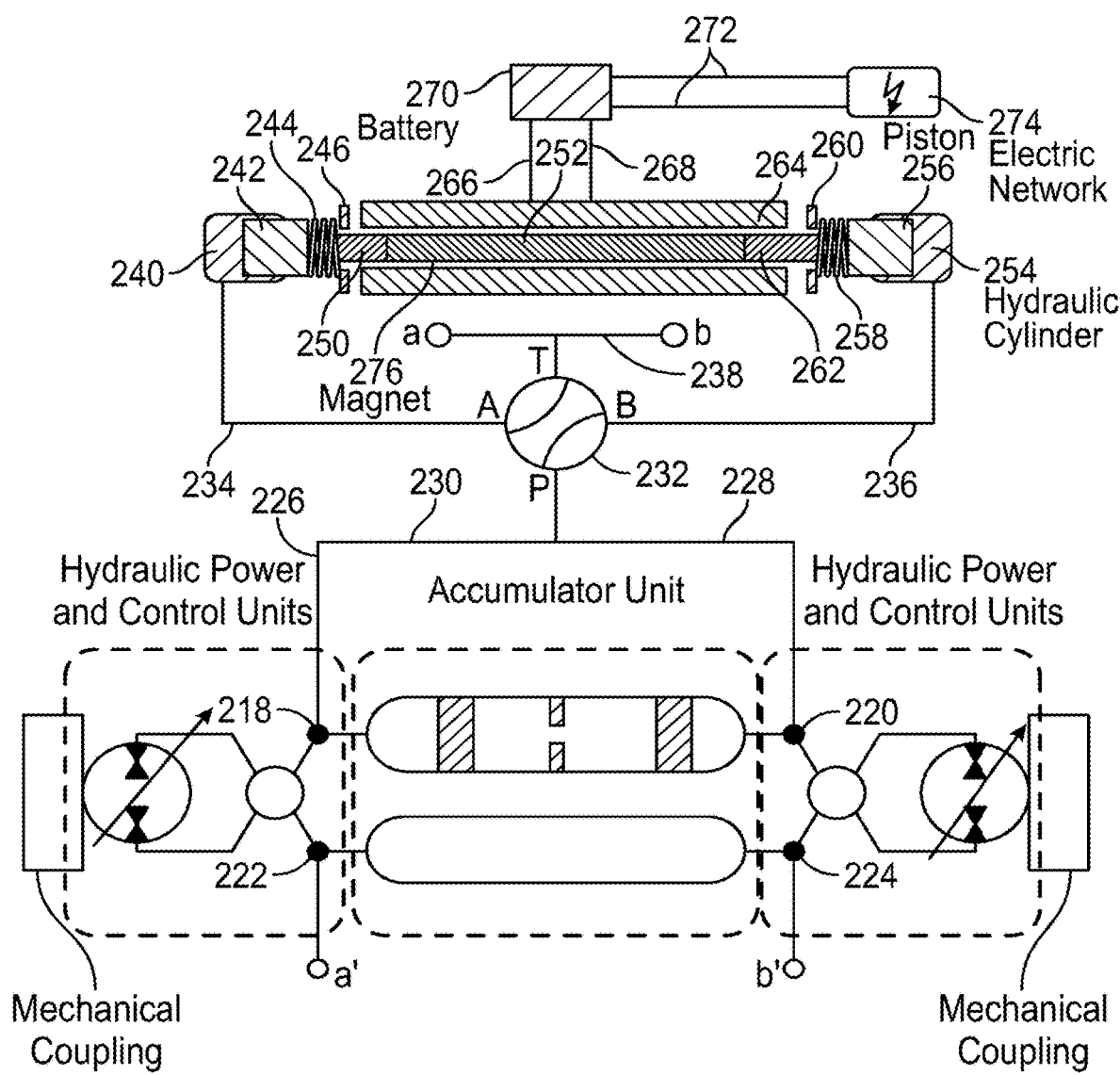
FIG. 12 is a schematic view of an Integrated Energy Conversion, Transfer, and Storage System with double action functionality showing integration of an electrical linear generator based on a solid magnetic element or on magneto-hydrodynamics.

Referring now to FIG. 12, some implementations of the Integrated Energy Conversion, Transfer, and Storage System with double action functionality additionally include an integrated electrical generator. In such an implementation, the Integrated Energy Conversion, Transfer, and Storage System is expanded with an integrated electrical system to store energy by electrical matter, as well as to feed an electrical consumer or network. Some such implementations of the Integrated Energy Conversion, Transfer, and Storage System incorporate an alternating linear generator. In the implementation shown in FIG. 12, the alternating linear generator includes a magnetic core 252 that is mounted rigidly to hydraulic pistons 250 and 262. The magnetic core 252 is surrounded by an electromagnetic coil 264. Accordingly, electrical current is induced due to linear alternating displacement of magnetic core 276. The induced current is directed to an electrical storage media (battery) 270 using electrical wires 266 and 268. Additionally, the electrical storage media 270 is connected to an electrical actuator or an electrical network 274 using electrical wires 272.

In some implementations, pressure from the hydraulic circuit actuates hydraulic pistons 242 and 256, which generate the alternating linear displacement of the magnetic element 252 between the hydraulic cylinders 240 and 254. The neutral position of magnetic core 252 is maintained by the spring 244 acting between hydraulic piston 242 and rigid fixed wall 246, and the spring 258 acting between hydraulic piston 256 and rigid fixed wall 260. The hydraulic cylinders are connected to Integrated Energy Conversion, Transfer, and Storage System using hydraulic valves 218 and 220 connected to the high pressure accumulator of the accumulator unit, and hydraulic valves 222 and 224 are connected to the low pressure accumulator of the accumulator unit. High pressure pipes 226 and 228 are linked by hydraulic pipe 230, and are connected to port P of the rotational valve 232. During rotation, the rotational valve 232 provides two different connection combinations. The first connection combination is P-A and B-T at the same time. The second connection combination is P-B and A-T at the same time.

Referring still to FIG. 12, in some implementations of the Integrated Energy Conversion, Transfer, and Storage System, Port A is connected via hydraulic pipe 234 to hydraulic cylinder 240, and Port B is connected via hydraulic pipe 236 to hydraulic cylinder 254. Additionally, Port T is connected central pipe 238, which provides a connection at the low pressure accumulator of the accumulator unit by the hydraulic connectors a-a' and b-b'.

In at least one implementation of the Integrated Energy Conversion, Transfer, and Storage System, the magnetic core 252 is actuated using hydraulic fluid from the accumulator unit. The hydraulic fluid from the accumulator unit is directed to port P of the rotational control valve 232. Due to the rotation of the rotational control valve 232, the liquid at port P is directed alternately to ports A and B. Consequently, the pistons 242 and 256 generate the alternating displacement of the magnetic core 252, which is fixed to the pistons 242 and 256. Concurrently, the rotational control valve 232 provides alternating connection of Port B to T and A to T, which releases liquid at the end of the stroke from hydraulic cylinders 240 and 254, to the low pressure accumulator of the accumulator unit. In some implementations, the magnetic core 252 is an electromagnetic-suitable liquid which is actuated within housing 276 by hydraulic pistons 250 and 262 to induce electrical current into the coil 264.

Figure 13:
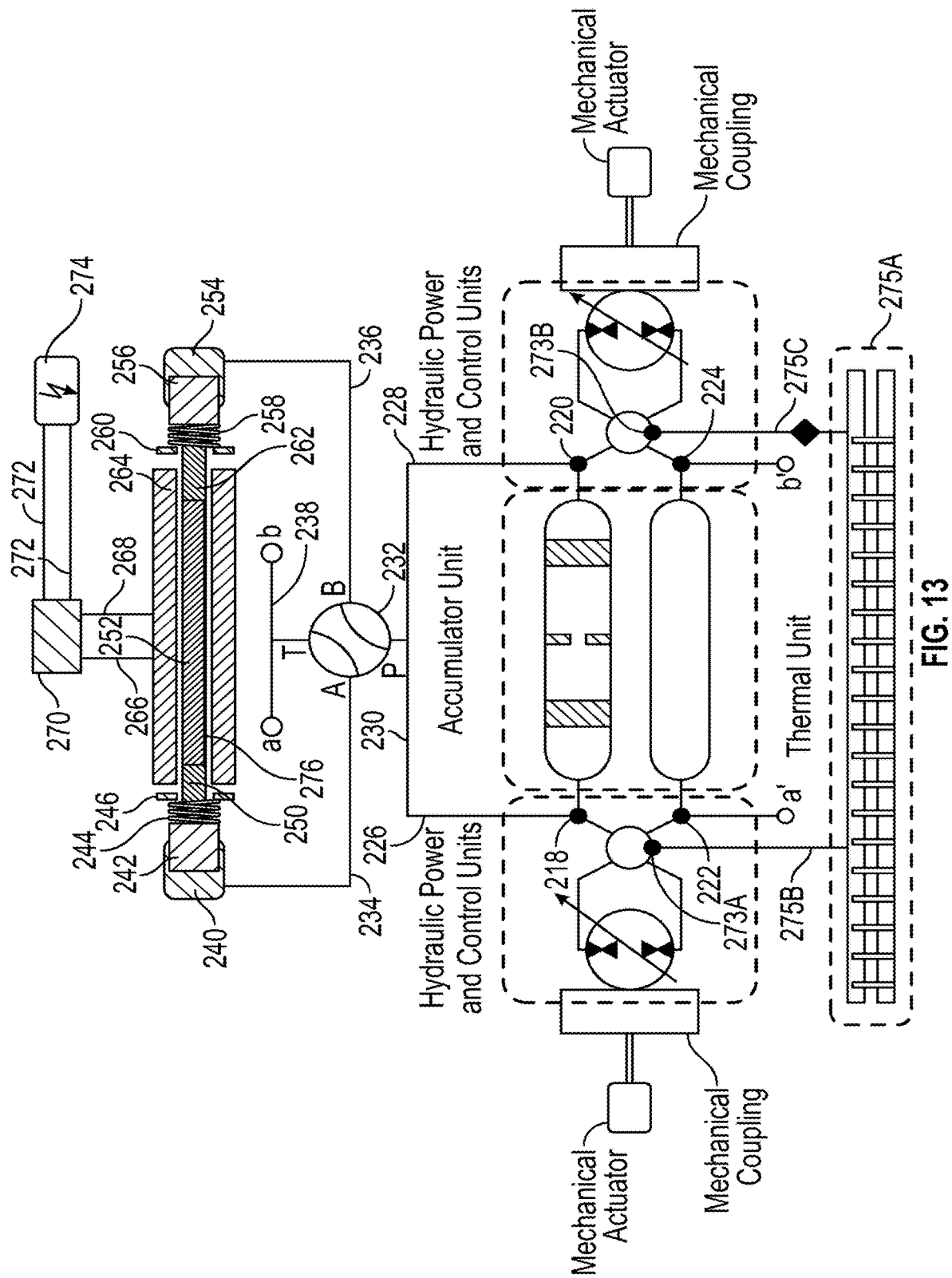
FIG. 13 is a schematic view of an Integrated Energy Conversion, Transfer, and Storage System integrating mechanical and thermal energy sources for mechanical and electrical power supply.

Referring now to FIG. 13, the general Integrated Energy Conversion, Transfer, and Storage System structure further integrates a thermal energy source 275A. The thermal energy source 275A has a mechanical interface 275B and an electrical interface 275C. The thermal energy source 275A connects via the mechanical interface 275B and the electrical interface 275C to the directional control valves of the Hydraulic Power and Control Units via ports 273A and 273B.

Figure 14:
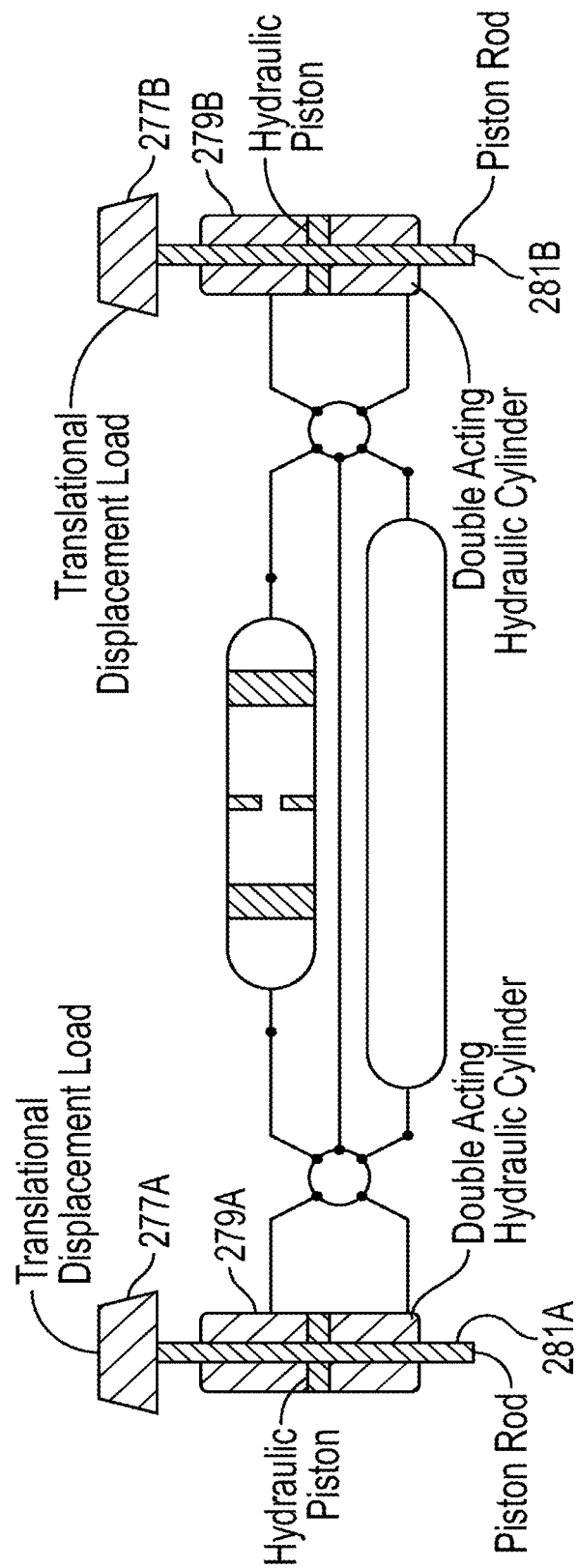
FIG. 14 illustrates applicability of an Integrated Energy Conversion, Transfer, and Storage System for use with linear hydraulic actuators (hydraulic cylinders).

Referring now to FIG. 14, in some implementations of the Integrated Energy Conversion, Transfer, and Storage System, the hydraulic power units incorporate alternating linear displacement. In such an implementation, the Integrated Energy Conversion, Transfer, and Storage System incorporates translational displacement loads 277A and 277B, which are connected to piston rods 281A and 281B. The piston rods 281A and 281B are housed in double acting hydraulic cylinders 279A and 279B. The double acting hydraulic cylinders 279A and 279B further house hydraulic pistons. The translational displacement loads 277A and 277B provide alternating linear displacement to the Integrated Energy Conversion, Transfer, and Storage System via the piston rods 281A and 281B, the double acting hydraulic cylinders 279A and 279B, and the hydraulic pistons.

Figure 15:
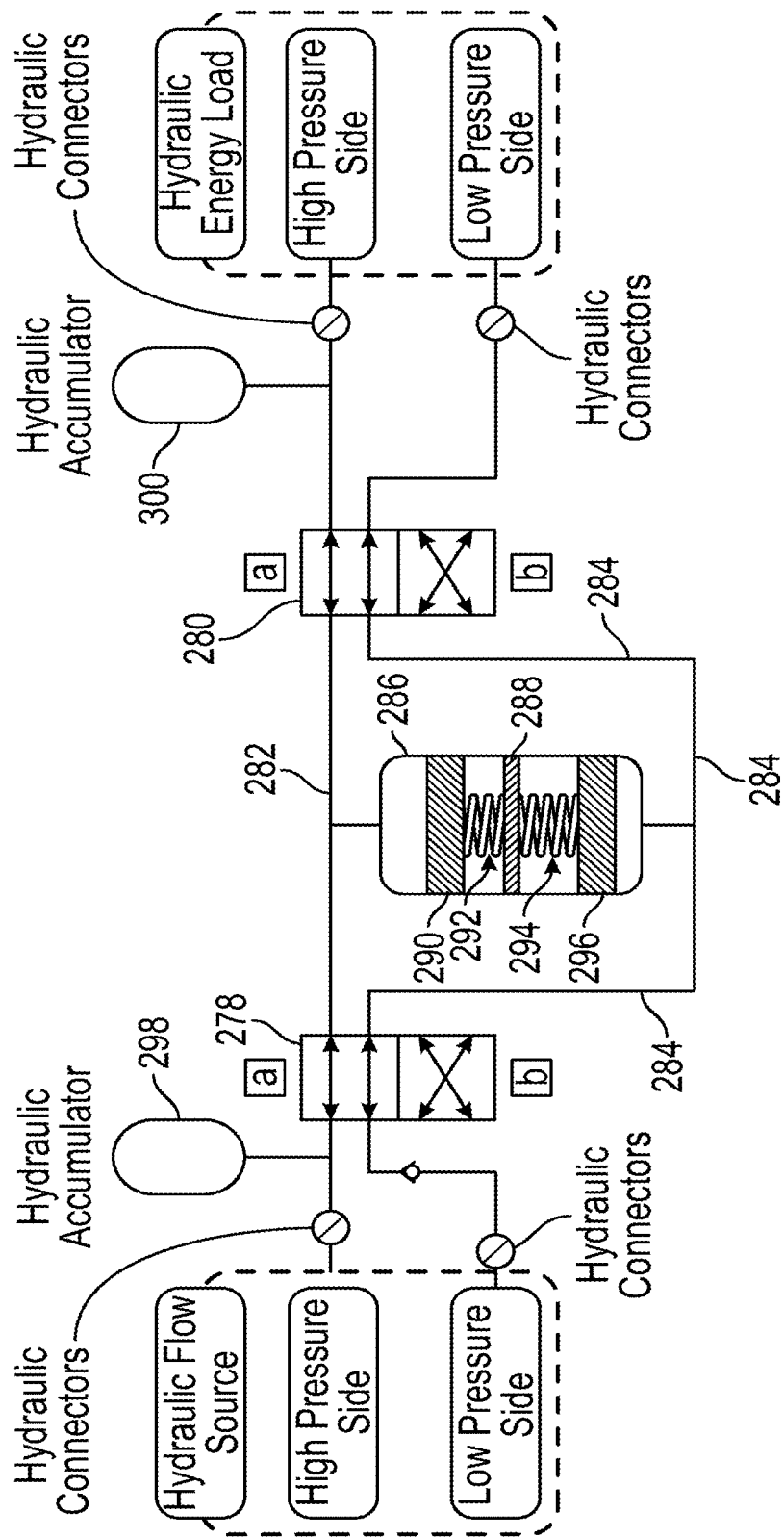
FIG. 15 illustrates an Integrated Energy Conversion, Transfer, and Storage System circuit with additional hydraulic flow source, optimized using a sonic resonating circuit—parallel connection—position a of directional control valve.

Referring now to FIG. 15, an implementation of an efficiency optimization circuit is shown, in accordance with the configuration in FIG. 8. The efficiency optimization is integrated between a hydraulic energy generation source and a hydraulic energy load. The hydraulic energy generation source and the hydraulic energy load each include a high pressure side and a low pressure side. In this implementation, the sides of the hydraulic circuit provide alternating pressure to generate oscillations that create hydraulic inertia and capacity. In some implementations, the oscillations and the hydraulic inertia generate resonance conditions. To create these conditions, two 2/4 (two position/4 port) directional control valves 278 and 280 are used, as shown in FIG. 15.

In such an implementation, when directional control valve 278 is in the "a" position, the liquid from the high pressure side of the hydraulic flow source flows through pipe 282 towards directional control valve 280. The directional control valve 280 directs the fluid to the high pressure side of the hydraulic energy load. The low pressure side of the hydraulic flow source and hydraulic energy load are connected by pipe 284 that is positioned between directional control valves 278 and 280. Concurrently, due to the pressure in the pipe 282, the piston 290 in cylinder 286 is pushed against the spring 292 which sits on the separation wall 288. Due to the low pressure in pipe 284, the spring 294 pushes piston 296 to its outside extreme position. By switching the positions of directional control valves 278 and 280 to the "b" position, the high pressure circuit generated by the new positions of directional control valves 278 and 280 is directed through pipe 284.

Referring still to FIG. 15, due to the pressure change that occurs by switching the position of the directional control valves 278 and 280, the piston 296 within hydraulic cylinder 286 is pushed against spring 294 that sits on separation wall 288. Concurrently, due to low pressure in pipe 282, piston 290 is pushed to its extreme outside position by spring 292. By periodically switching between positions "a" and "b" of directional control valves 278 and 280, the mass spring systems, which include piston 290 and related spring 292 on one side and piston 296 and spring 294 on the other side, will oscillate. The mass of the pistons, spring rate, and oscillating frequency are chosen to meet resonance conditions to increase the efficiency and reduce losses of resonance. In some implementations, the overall connectivity of the high pressure and low pressure sides of the hydraulic flow source and hydraulic energy load is not affected. Additionally, hydraulic accumulators 298 and 300 are employed to compensate for oscillations in the non-resonating part of the circuit.

Figure 16:
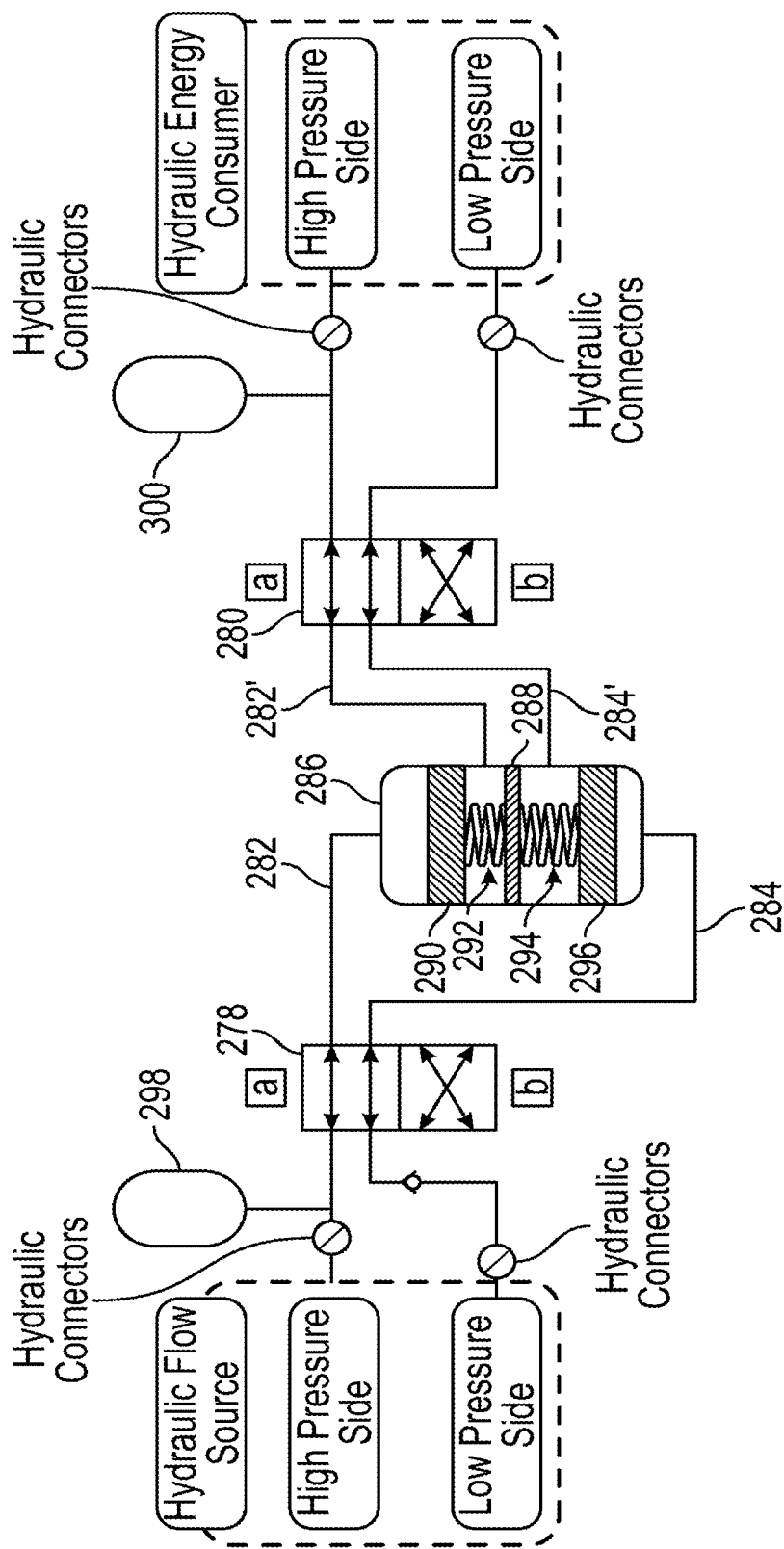
FIG. 16 illustrates an Integrated Energy Conversion, Transfer, and Storage System circuit with additional hydraulic flow source, optimized using a sonic resonating circuit—series connection—position a of directional control valve.

Referring now to FIG. 16, in implementations where fluid separation is desired to be obtained, connection pipes 282 and 284 are split, and pistons 290 and 296 also function as a mechanical separator. The pipe 282 directs the fluid in front of piston 290 which pushes the liquid adjacent the piston through pipe 282' towards directional control valve 280. In the same manner, pipe 284 directs the fluid in front of piston 296 which separates the space relative to the fluid in pipe 284. The flow space adjacent piston 296 is connected to pipe 284' which is connected to directional control valve 280.

Figure 17:
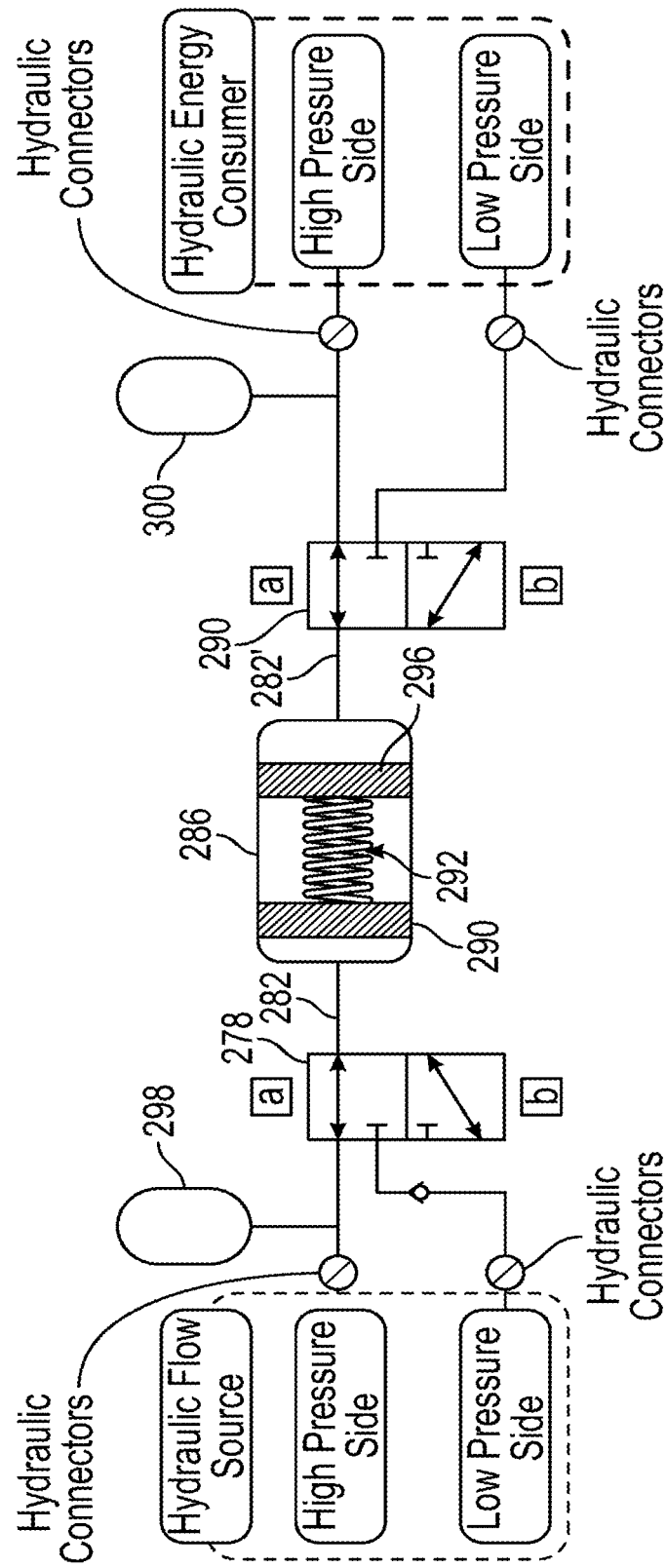
FIG. 17 illustrates an additional Integrated Energy Conversion, Transfer, and Storage System circuit with additional hydraulic flow source, optimized using a sonic resonating circuit—position of a directional control valve.

Referring now to FIG. 17, in some implementations the positioning of the components is configured for series connectivity of the resonating assembly. The resonating assembly includes hydraulic cylinder 286 with spring 292 placed between and acting against pistons 290 and 296 which are in contact with the liquid in pipes 282 and 282' and rely on 2/3 directional control valves. In this implementation, the separation wall 288 is removed from the parallel connection and only one spring is used. In the "a" position of the directional control valves 278 and 290, the hydraulic circuit is under pressure. When the spring 96 is compressed in the "b" position, the hydraulic circuit is released and the spring expands. The correlation of valve opening/closing frequency, the mass of the pistons, and the spring rates for resonance define the assembly. The assembly includes hydraulic cylinder 286, pistons 290 and 296, and spring 292, as a hydraulic resonator.

In various implementations of the Integrated Energy Conversion, Transfer, and Storage System, as described with respect to FIGS. 1-17, any type of hydraulic pump/motor assembly may be integrated with the Integrated Energy Conversion, Transfer, and Storage System. The description provided below relates to the vane and axial piston implementations, as examples of such integration. Typically, vane type implementations involve lower cost and noise, while axial piston type implementations involves higher working pressure and lower drag torque. Both the vane and axial piston implementations involve the axial direction integrating in a more compact manner with the accumulator unit. This type of axial direction integration is suitable for mobile applications. Another implementation, such a radial piston configuration for the hydraulic power unit, may also be employed in situations that do not require strict packaging constraints. Notably, a rotational directional control valve is suitable for all implementations to achieve proper integration.

In some implementations, during vehicle operation when the Integrated Energy Conversion, Transfer, and Storage System is not employed, the displacement of the variable displacement hydraulic rotational unit is set to zero, so no mechanical-hydraulic torque is transferred. In such an implementation, a minimum drag torque is provided.

In another implementation, during an intermediate energy storage running mode, the displacement of the variable displacement hydraulic rotational unit is set to its maximum position and the port connections of the rotational directional control valve rotates so that connections A to C and B to D are established. The variable displacement hydraulic rotational unit is rotated by the mechanical coupling and shaft powered by the attached mechanical system through the mechanical transmission. The hydraulic liquid is absorbed from the low pressure accumulator and pushed within the high pressure accumulator, which actuates the piston in a single-sided implementation. In a double-sided implementation, two pistons are actuated. The pistons are connected to the storage element stores energy using deformation and force transferred from the pistons.

When the accumulator exceeds its storage capacity, which is a condition monitored as a failsafe function, the high pressure accumulator closes as a result of a new position that is obtained by the rotational directional control valve. The failsafe function is described above with reference to FIG. 2. The new position of the rotational directional control valve connects the output of the variable displacement hydraulic rotational unit to the low pressure accumulator by a controlled local resistance. This controlled local resistance provides a hydraulic brake (retarder mode) if further braking is needed (e.g., a downhill run). Alternatively, the displacement of the variable displacement hydraulic rotational unit is set to zero if accumulated energy has to be stored.

In some implementations, the stored energy is used by rotating the rotational directional control valve to a new position. The rotational directional control valve connects the high pressure accumulator to the variable displacement hydraulic rotational unit input and the output to the low pressure accumulator. If the same rotational direction is maintained for the variable displacement hydraulic rotational unit as during energy storing, then the connections to the high and low pressure accumulator must be reversed. For example, during the stopping and starting that takes place at a traffic light, the connections to the high and low pressure accumulator must be reversed if the Integrated Energy Conversion, Transfer, and Storage System is used as a brake energy recovery system for vehicles. The same connectivity of the ports of the rotational directional control valve that occurs during energy storage acts to generate a reversed rotational direction from the configuration is maintained during braking. If the Integrated Energy Conversion, Transfer, and Storage System is implemented as a brake energy recovery system for vehicles, this configuration is useful when starting the vehicle after it has been parked.

Since the Integrated Energy Conversion, Transfer, and Storage System with double action functionality employs on two variable displacement hydraulic rotational units, a hydrostatic transmission is established by direct connection of the two variable displacement hydraulic rotational units. This configuration provides an additional function of the hydrostatic transmission mode that is useful to provide a continuous variable transmission ratio in a broad range, but with less efficiency than a mechanical transmission.

The broad range and rapid response make this configuration useful for short period of time when peak torque is needed, such as accelerating to pass another vehicle on a freeway, or driving in high resistance conditions, e.g., driving through sand, driving up a steep slope, or the like. This configuration is also useful for continuous adjustment of the displacements of the variable displacement hydraulic rotational units, so that the internal combustion engine can easily switch between operation on more fuel efficient curves of the engine map, operation on conditions that occur during city driving, or operation on off road conditions. When operating in this configuration, short term intermediate storage and retrieve of energy is achieved.

Figure 18A:
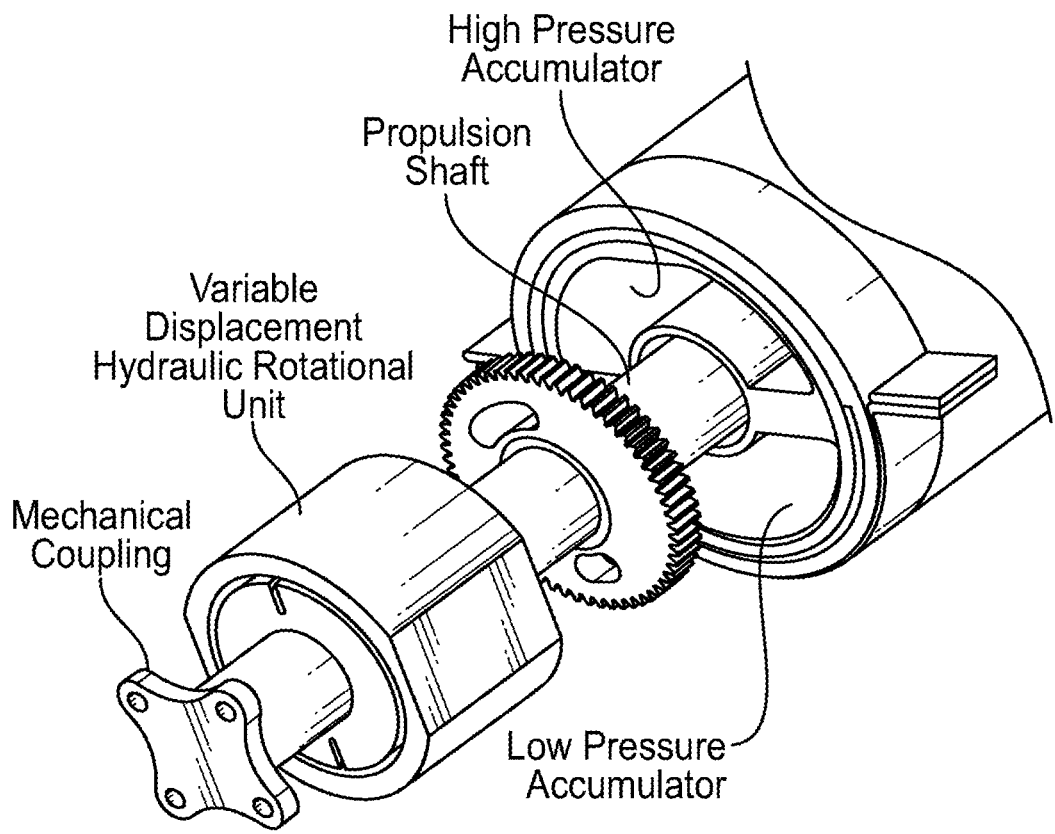
FIGS. 18A and 18B show pictorial views of components within an Integrated Hydraulic Power and Control Unit of the Integrated Energy Conversion, Transfer, and Storage System.
Figure 18B:
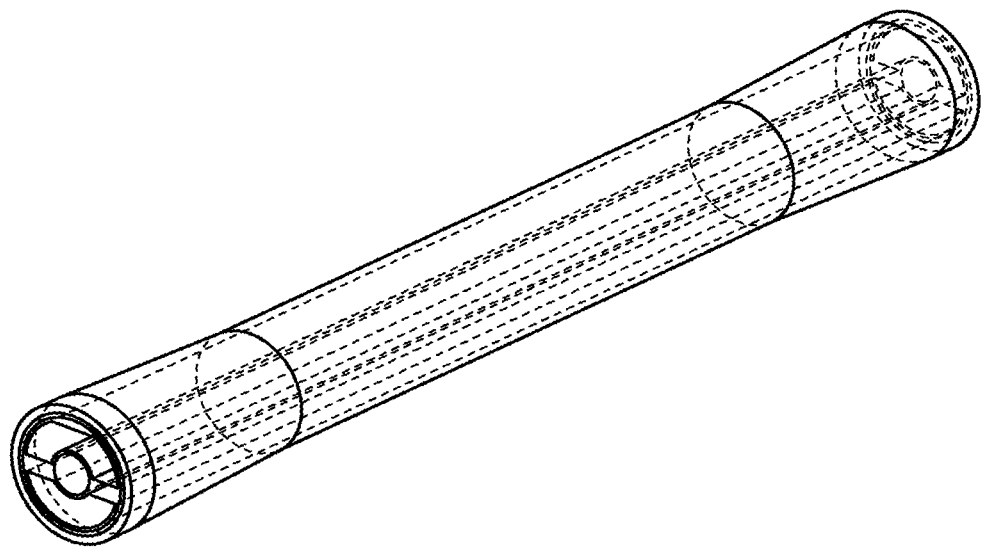

Referring now to FIGS. 18A and 18B, the relationship of the core components of the Integrated Energy Conversion, Transfer, and Storage System to each other is shown. Specifically, FIG. 18A shows an implementation of the Integrated Energy Conversion, Transfer, and Storage System that includes a mechanical coupling, a variable displacement hydraulic rotational unit, a propulsion shaft, a high pressure accumulator and a low pressure accumulator. FIG. 18BA shows an implementation of an accumulator unit with hollow space for a propulsion shaft that provides a direct mechanical connection. In this implementation, the high pressure accumulator and a low pressure accumulator surround the hollow space for the propulsion shaft.

Figure 19C:
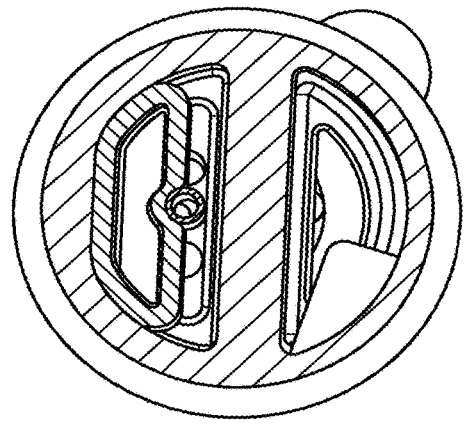
FIGS. 19A, 19B, and 19C are radial cross-sectional views of an Integrated Hydraulic Power and Control Unit.
Figure 19B:
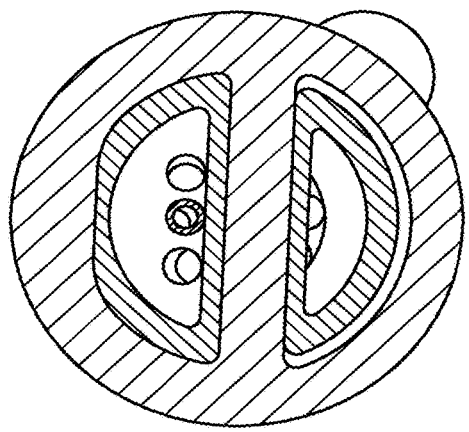
Figure 19A:
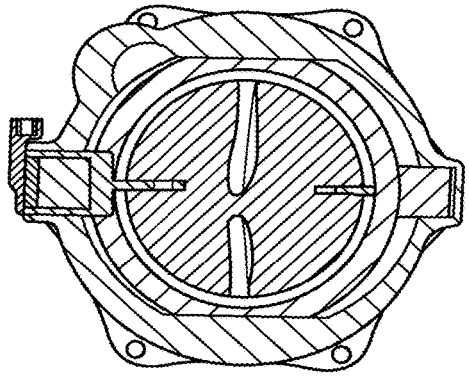
Figure 19D:
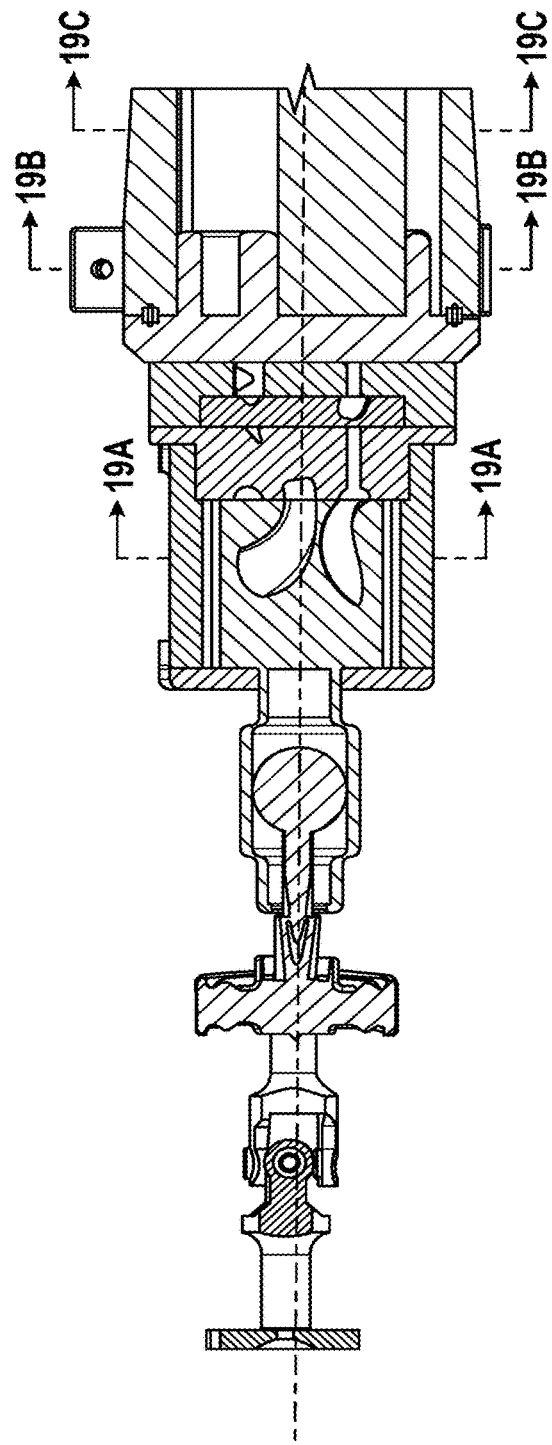
FIG. 19D is a longitudinal cross-sectional view of an Integrated Hydraulic Power and Control Unit.

Referring now to sectional views provided in FIGS. 19A, 19B, and 19C, in some implementations of the Integrated Energy Conversion, Transfer, and Storage System, the hydraulic unit acts as an integrated hydraulic power and control unit, using vane type configuration of hydraulic pump and motors. FIG. 19D shows a side view of the Integrated Energy Conversion, Transfer, and Storage System through which section cuts are made for FIGS. 19A, 19B, and 19C.

Figure 20:
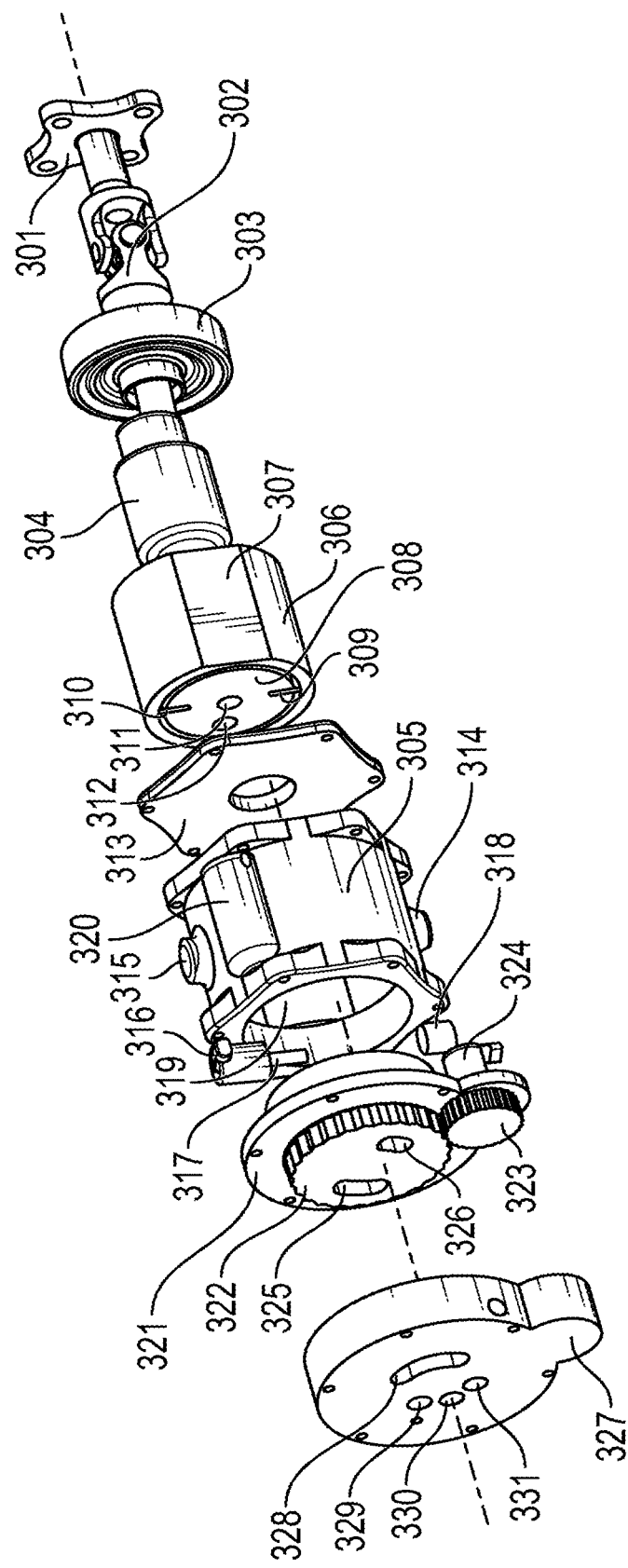
FIG. 20 is an exploded view of the accumulator side of an Integrated Hydraulic Power and Control Unit.
Figure 21:
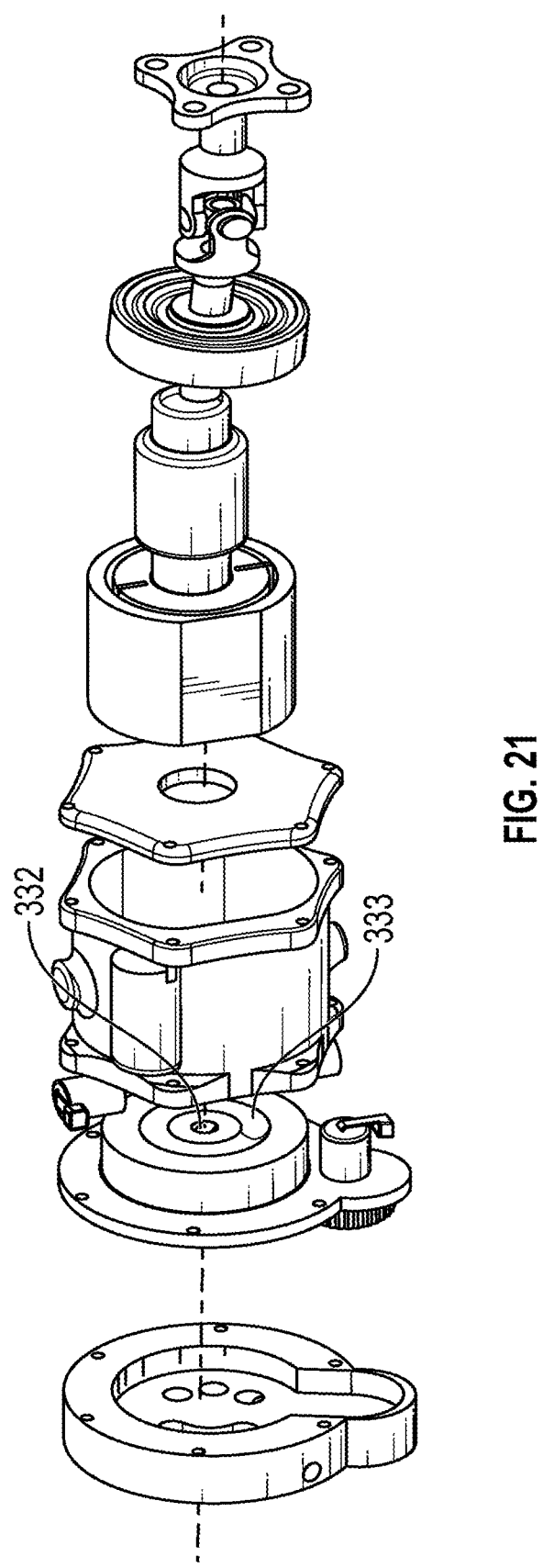
FIG. 21 is an exploded view of the actuation side of an Integrated Hydraulic Power and Control Unit.

Referring now to exploded views provided in FIGS. 20 and 21, in some implementations of the Integrated Energy Conversion, Transfer, and Storage System, the hydraulic unit acts as an integrated hydraulic power and control unit, using vane type configuration of hydraulic pump and motors.

Figure 22A:
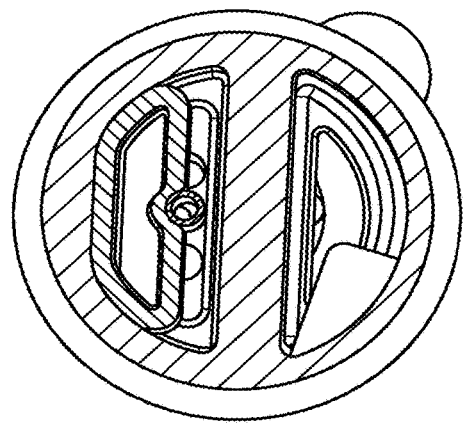
FIGS. 22A, 22B and 22C are radial cross-sectional views of an Integrated Hydraulic Power and Control Unit.
Figure 22B:
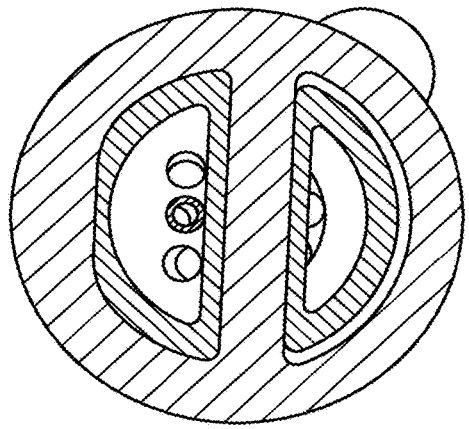
Figure 22C:
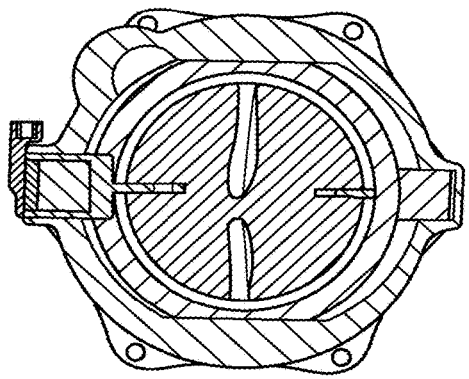
Figure 22D:
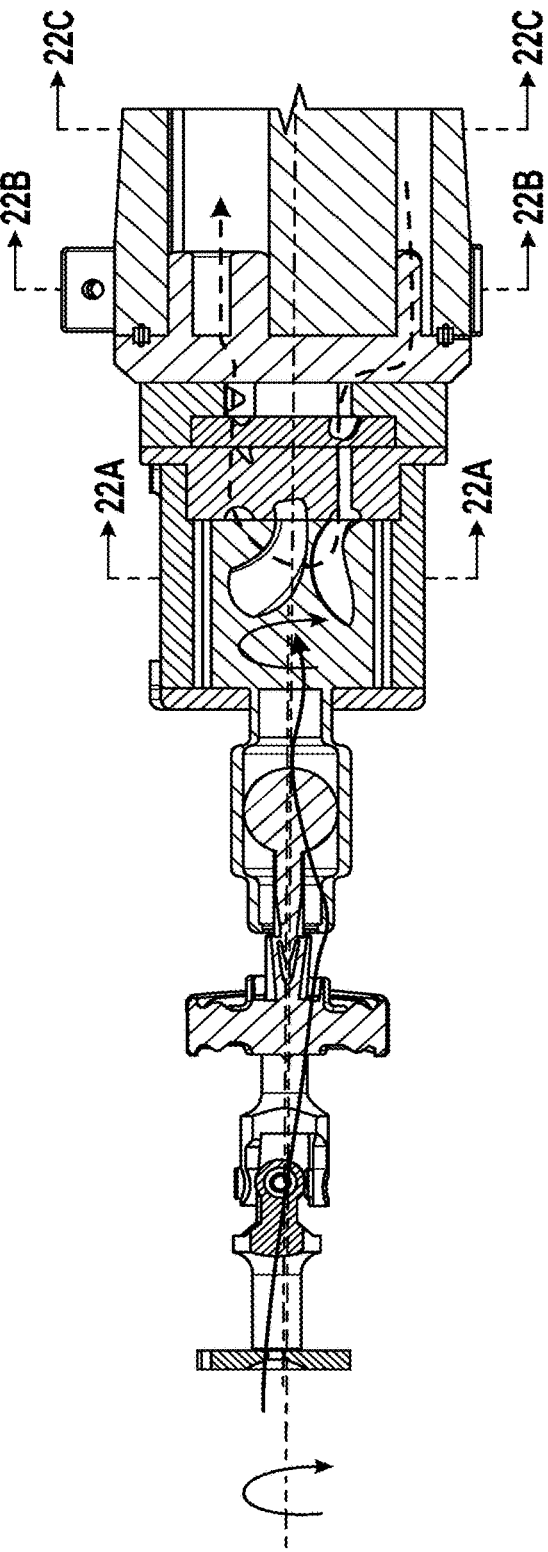
FIG. 22D is a longitudinal cross-sectional view of an Integrated Hydraulic Power and Control Unit along an internal flow path of mechanical and hydraulic energy.

Referring now to sectional views provided in FIGS. 22A, 22B, and 22C, in some implementations of the Integrated Energy Conversion, Transfer, and Storage System, the hydraulic unit acts as an integrated hydraulic power and control unit, using vane type configuration of hydraulic pump and motors. Additionally, FIG. 22D illustrates the mechanical flow path in continuous arrows, and the hydraulic flow path in dashed arrows.

Figure 23:
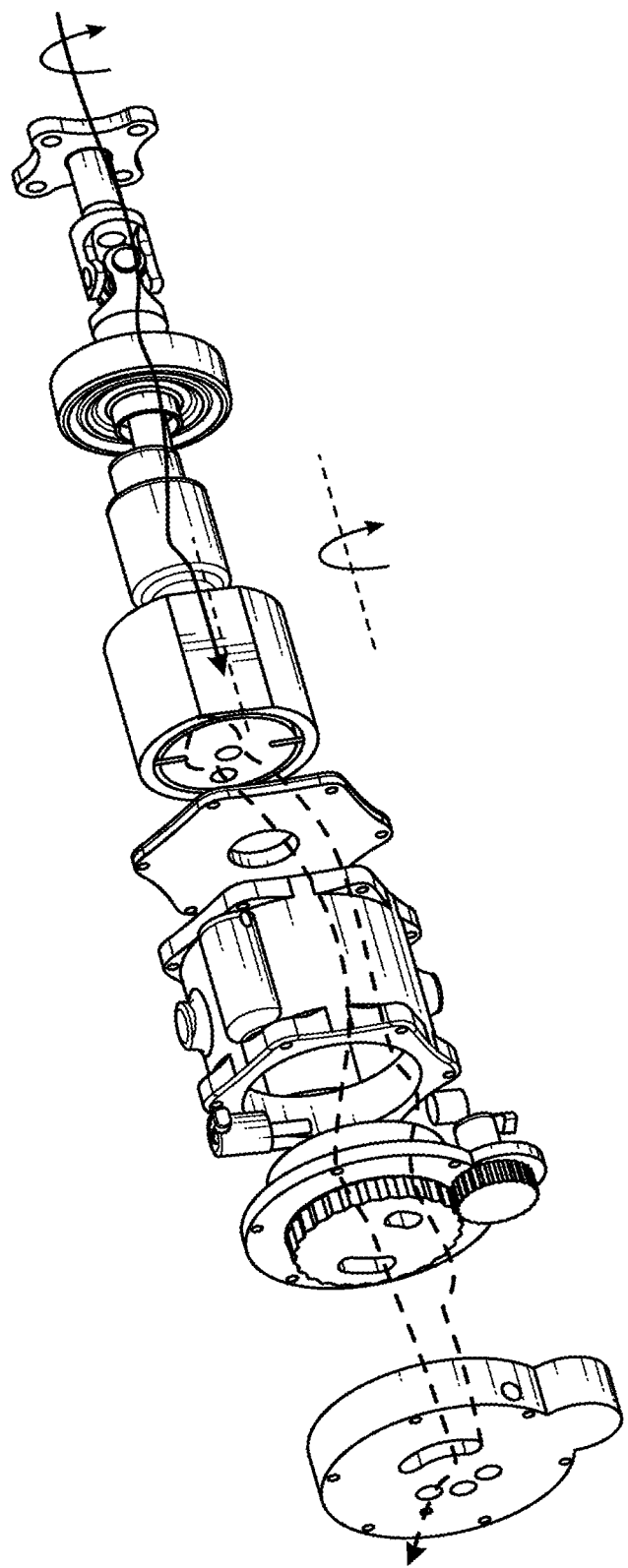
FIG. 23 is an exploded view of an Integrated Hydraulic Power and Control Unit showing an internal flow path of mechanical and hydraulic energy.

Referring now to isometric view provided in FIG. 23, the mechanical flow path in the Integrated Energy Conversion, Transfer, and Storage System is shown in continuous arrows, and the hydraulic flow path in the Integrated Energy Conversion, Transfer, and Storage System is shown in dashed arrows.

As shown in FIG. 20, in some implementations of the Integrated Energy Conversion, Transfer, and Storage System, the integrated hydraulic power and control unit includes connection flange 301 attached to joint 302 and shaft 304, which is supported by bearing 303. The variable displacement hydraulic rotational unit uses a variable displacement hydraulic vane pump/motor implementation, and includes a fixed housing 305 that is closed on the mechanical coupling side (towards connection flange 301) by cap 313.

On the directional control valve side of the Integrated Energy Conversion, Transfer, and Storage System, the fixed housing 305 is closed by directional control valve cap 321. Within fixed housing 305, the mobile housing 306 is positioned. The mobile housing 306 glides within fixed housing 305 due to the plane surface 307 that is machined on the outer surface of mobile housing 306 and inner surface 319 of the fixed housing 305. The mobile housing 306 is moved due to guidance surfaces 307 and 319 in one direction. The mobile housing 306 actuated by pin 317 of solenoid 316 attached to the fixed housing 305 inside orifice 315. The mobile housing 306 is retracted in the initial position by elastic element (spring) 318 placed inside orifice 314 of the fixed housing 305.

As shown in the sectional view A-A in FIG. 19A, the inner surface of the mobile housing 306 has an elliptical shape. In FIG. 19A, the mobile housing 306 shown in a perpendicular view relative to the rotation axis. Within the mobile housing 306, rotor 308 is placed. The rotor 308 is rigidly connected to shaft 304. Inside the rotor 308 are gliding vanes 309 and 310. Also within the rotor 308 are hydraulic feeding channels 311 and 312, which function as hydraulic inlet/outlet ports, according to the position of the directional control valve and torque flow.

In some implementations of the of the Integrated Energy Conversion, Transfer, and Storage System, the hydraulic feeding channels 311 and 312 are directed adjacent the vanes into the flow space, and are limited by the vanes that glide inside the rotor 308, the outer rotor 308 surface, and the inner elliptical inner surface of the mobile housing 306. Due to the difference of cross-sectional shape of the elliptical inner surface of the mobile housing 306 and the cylindrical outer surface of the rotor 308, the volume is limited between the vanes, the mobile housing, and rotor. The volume changes continuously during rotation of the rotor, which provides the variable displacement that is needed for the variable displacement hydraulic rotational unit. The magnitude of displacement variability is continuously adjusted by the position of the mobile housing 306 relative to the rotor 308. For concentric positioning of mobile housing 306 and rotor 308 during the rotation of the rotor 308, no displacement variability is obtained, and no hydraulic/mechanical energy transfer is obtained. This condition is that is implemented when the recovery system should not interfere with the mechanical transmission of the vehicle.

In some implementations, the maximum variability of the displacement is obtained when the mobile housing 306 is moved to the most extreme position allowed by the dimensions of the fixed housing 305. The mobile housing 306 is moved by the pin 317 of the solenoid 316. The maximum and intermediate positions of the mobile housing 306 relative to the rotor 308 are needed for hydraulic-mechanical energy conversion during system operation.

If a mechanical torque is applied, using the connection flange 301, joint 302, shaft 304, and rotor 308, then the liquid is absorbed through the hydraulic feeding channel 311 connected to the space that increases during the rotation of the rotor. The active volume is limited between the vanes, mobile housing, and rotor. During further rotation, the volume is limited between the vanes, mobile housing, and rotor. The volume decreases, forcing the liquid to exit the rotor through hydraulic feeding channel 312. This is typical actuation for an implementation that employs variable displacement hydraulic vane pump/motors.

In some implementations of the Integrated Energy Conversion, Transfer, and Storage System, the fixed housing 305 is closed on the directional control valve side by the connecting cap 321. The connecting cap 321 separates the variable displacement hydraulic rotational unit and the directional control valve, which has two channels 332 and 333 aligned with feeding channels 311 and 312. The connecting cap 321 supports the rotational geared flow control element 322 which rotates, actuated by the gear 323, which is powered by the rotational electric actuator 324. The rotational geared flow control element 322 defines a large size hydraulic orifice 325, which during all rotational positions generates the connection to the low pressure accumulator. The smaller size hydraulic orifice 326 of the rotational geared flow control element 322 generates, by rotation, alternate connections to the fixed hydraulic ports 328 for the high pressure accumulator. The alternate connections include port 329 for the direct connection pipe 152 (see FIG. 1) and port 330 for the connection to the thermal unit using the pipe 202 (see FIG. 9). The fixed hydraulic ports 328, 329, 330, 331 are integrated in the directional control valve housing 327.

Referring now to the directional control valves described in FIGS. 1-4B, the relationship of the ports with the embodiment described in FIGS. 19A-21 is provided below. In some implementations, the feeding channels 311 and 312 are permanently connected during rotation of rotor 308 with fixed channels 331 and 330, respectively.

In some implementations, Port A of rotational directional control valve 110 and Port A' of rotational directional control valve 140 (See FIGS. 1-4B) are connected to hydraulic port 311 in rotor 308 and channel 332 in connecting cap 321 (See FIGS. 20-21). In other implementations, Port B of rotational directional control valve 110 and Port B' of rotational directional control valve 140 (See FIGS. 1-4B) are connected to hydraulic port 312 in rotor 308 and channel 333 in connecting cap 321. In still other implementations, Port C of rotational directional control valve 110 and Port C' of rotational directional control valve 140 (See FIGS. 1-4B) are connected to hydraulic port 329 in directional control valve housing 327. In yet other implementations, Port D of rotational directional control valve 110 and Port D' of rotational directional control valve 140 (See FIGS. 1-4B) are connected to hydraulic port 328 in directional control valve housing 327. In at least one implementation, Port E of rotational directional control valve 110 and Port E' of rotational directional control valve 140 (See FIGS. 1-4B) are connected to hydraulic port 330 in directional control valve housing 327. In some implementations, Port F of rotational directional control valve are connected to and Port F' of rotational directional control valve 140 (See FIGS. 1-4B) for hydraulic port 331 in directional control valve housing 327.

The rotation of the control disc 322 generates the following flow paths: (1) Port A-Port C and Port B-Port D for charge/discharge of the high pressure accumulator with opposed rotational direction during discharge as during charging; (2) Port A-Port D and Port B-Port C for charge/discharge of the high pressure accumulator with same rotational direction during discharge as during charging; (3) Port A-Port E and Port B-Port D for hydrostatic propulsion mode in one rotational direction; (4) Port B-Port E and Port A-Port D for hydrostatic propulsion mode in opposed rotational direction; (5) Port A-Port F and Port B-Port D for thermal energy recovery mode in one rotational direction; (6) Port B-Port F and Port A-Port D for thermal energy recovery mode in opposed rotational direction; (7) Port A-Port D, Port B-Port D, and Port C closed for retarder mode (accumulator full).

Figure 24:
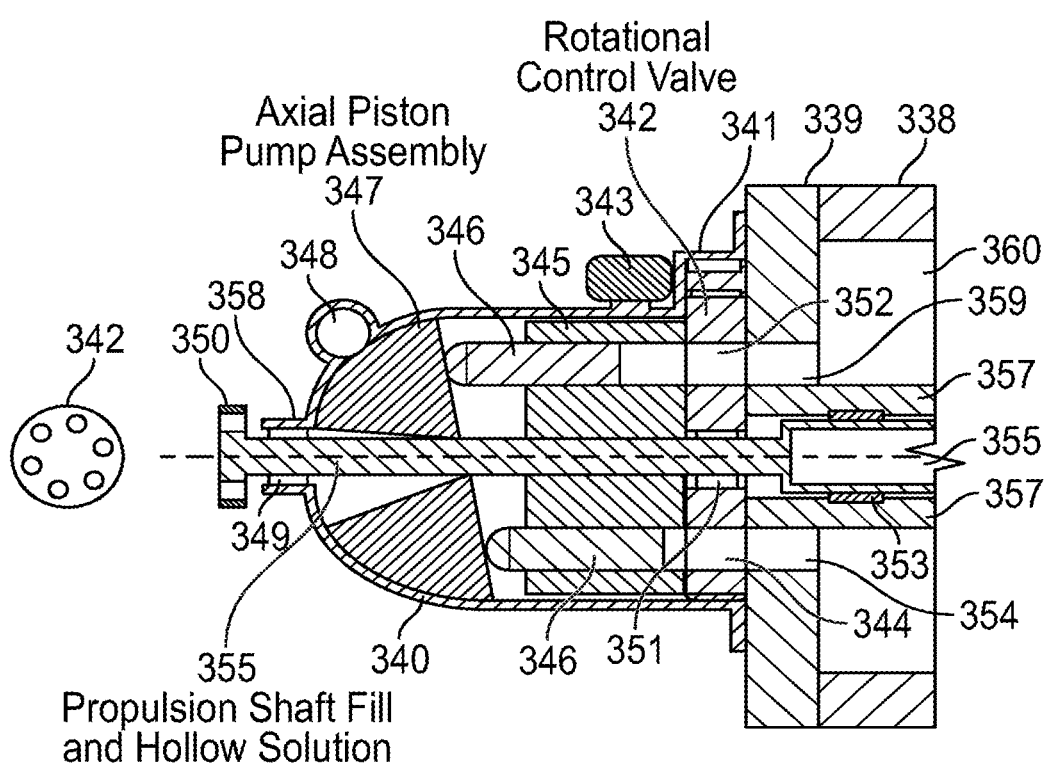
FIG. 24 illustrates an axial piston principle applied to an Integrated Energy Conversion, Transfer, and Storage System.

Referring now to FIG. 24 an implementation of the Integrated Energy Conversion, Transfer, and Storage System is shown with an integrated axial piston-variable displacement pump. The accumulator housing 338 covering the high pressure accumulator 360 is closed by end cap 339. To the end cap 339 is attached housing 340 of the axial piston hydraulic unit which comprises of rotational control valve 342 actuated by gear 341 which is powered by electrical rotational actuator 343. The rotational control valve 342 includes hydraulic orifices 344 and 352 that provide a connection to the high pressure accumulator 360 or the low pressure accumulator 353. The hydraulic orifices 344 and 352 are positioned in alignment with hydraulic orifices 359 and 354 of the end cap 339. Piston body 345 contains pistons 346 that are placed parallel to and rigidly mounted on the propulsion shaft 355. The pistons 346 are supported by rotational hemisphere 347 that is rotated around a perpendicular axis to propulsion shaft 355 by gear 348, which changes the stroke of the pistons 346 and, thus, the displacement of the hydraulic unit. Propulsion shaft 355 has an attached connection flange 350 and is mounted in the housing 340 using bearings 349 and 358. The rotational control valve 342 rotates against the propulsion shaft 355 using bearings 351. To reduce the mass of the propulsion shaft 355, the part that rotates inside separation wall 357 between the high pressure accumulator 360 and the low pressure accumulator 353 includes a hollow part 356.

Figure 25:
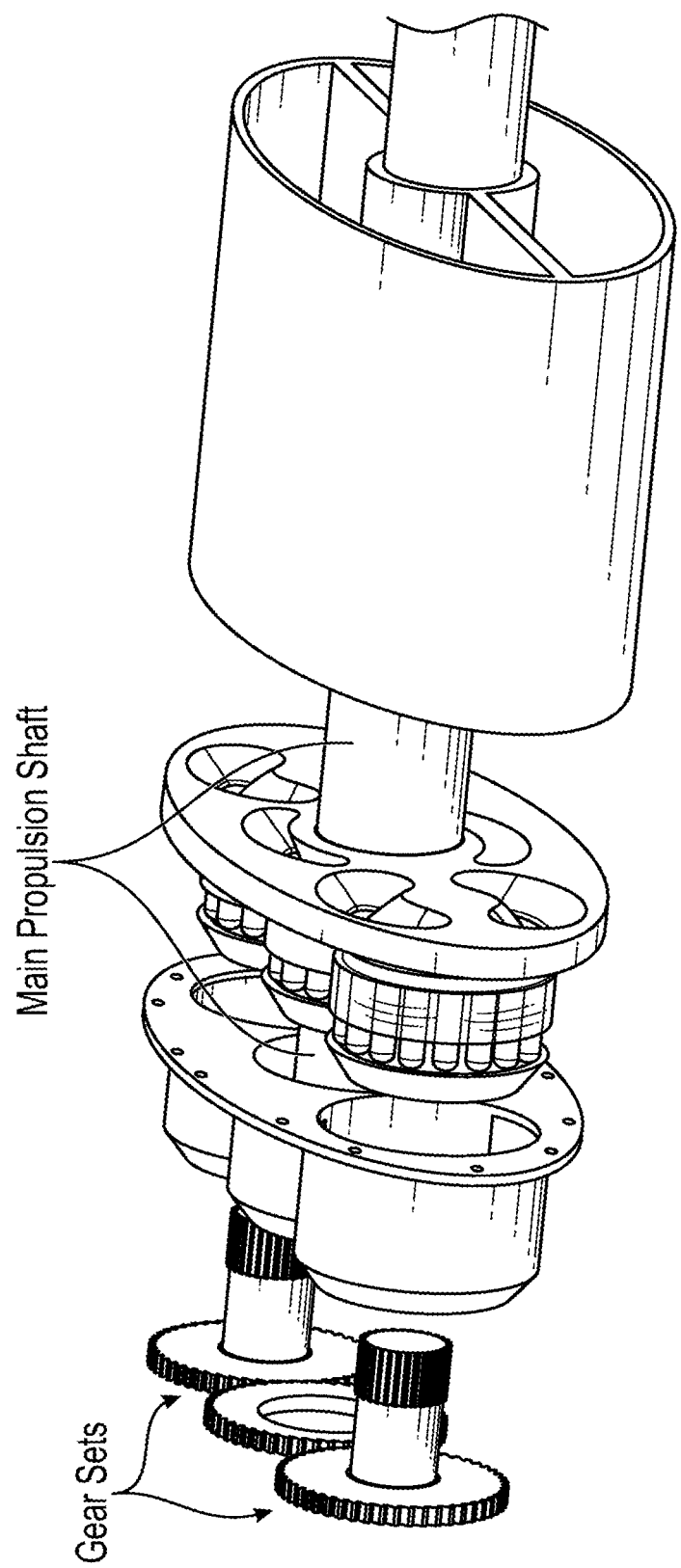
FIG. 25 is an exploded view of a multiple hydraulic systems implementation.
Figure 26:
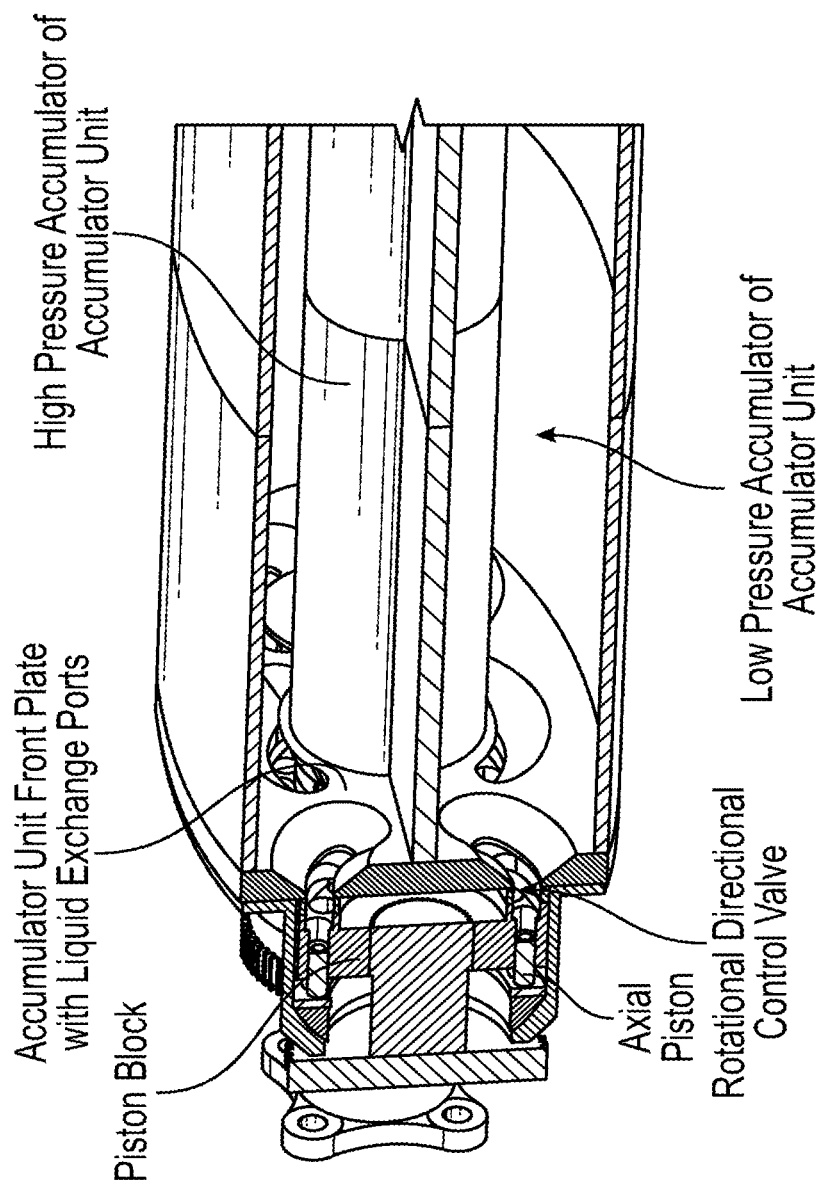
FIG. 26 is a longitudinal cross-sectional view of the multiple hydraulic systems implementation shown in FIG. 25.

Referring now to FIG. 25, an implementation of the Integrated Energy Conversion, Transfer, and Storage System that incorporates an axial piston pump and multiple gear sets. Additional axial piston hydraulic units can be included in a modular manner to increase the working capacity of Integrated Energy Conversion, Transfer, and Storage System. Specifically, FIG. 25 shows an implementation of the Integrated Energy Conversion, Transfer, and Storage System in which three hydraulic units are coupled by multiple gears to the main propulsion shaft. FIG. 26 shows a sectional view of the implementation of the Integrated Energy Conversion, Transfer, and Storage System shown in FIG. 25. FIG. 26 shows the details of the integration of the hydraulic power units with the associated control valve and the accumulator unit front plate.

Figure 27:
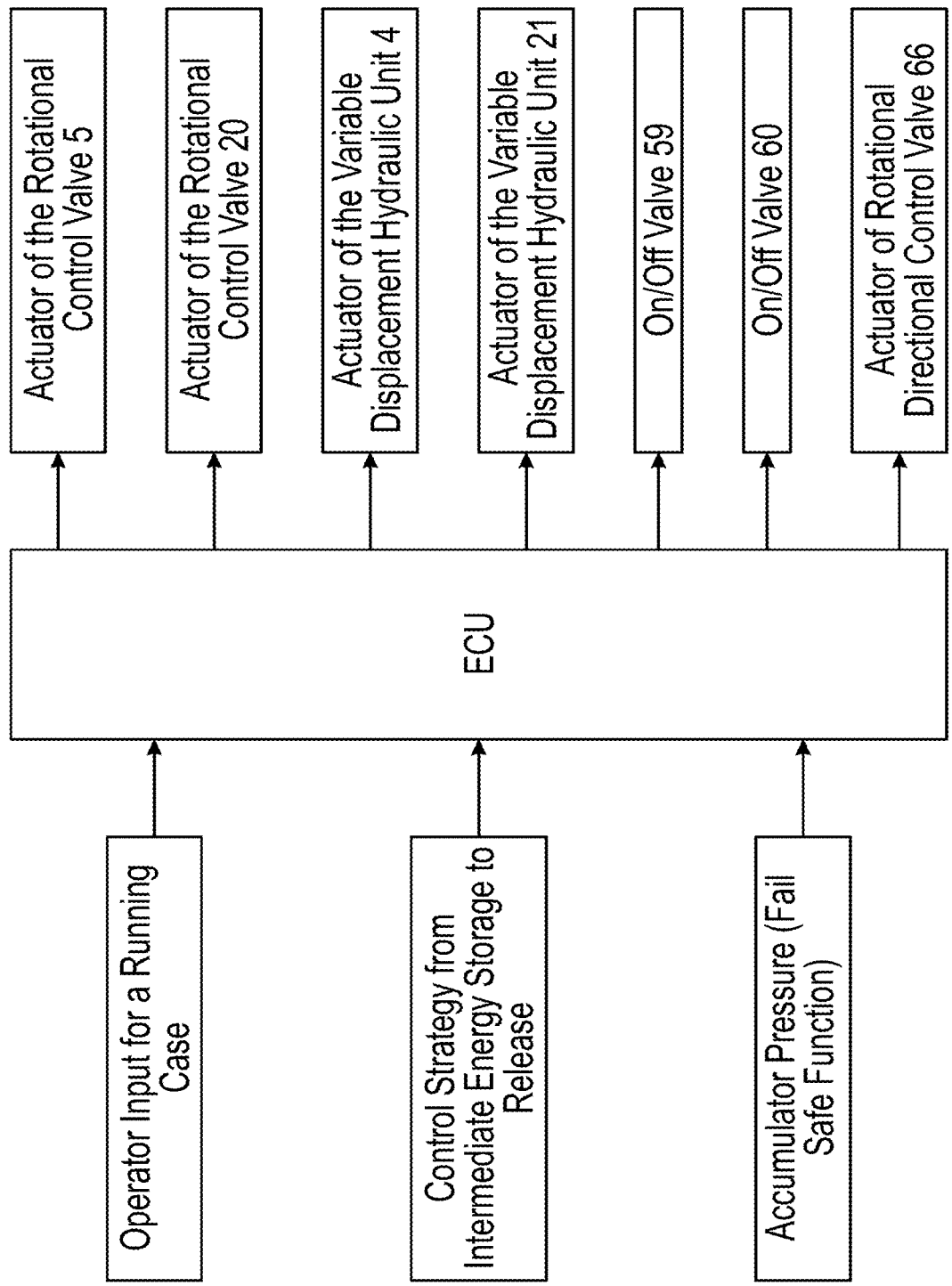
FIG. 27 is a block diagram showing the structure of a control system as described herein.

Referring now to FIG. 27, the structure of the energy control unit (ECU) of Integrated Energy Conversion, Transfer, and Storage System is shown with double action functionality to meet the functions of converting, accumulating, storing, and releasing energy. The energy control unit (ECU) of Integrated Energy Conversion, Transfer, and Storage System may operate in retarder and variable hydrostatic transmission modes.

Figure 28:
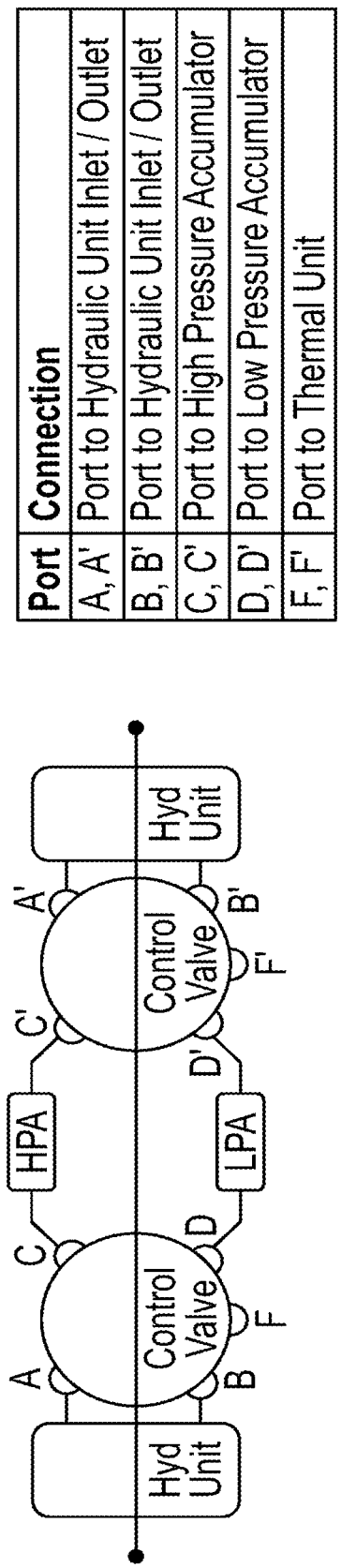
FIG. 28 illustrates connectivity of directional control valve ports for different running conditions.

As shown in FIG. 28, the port connections provided represent different running conditions. These port connections include: A, A' corresponding with Port to Hydraulic Unit Inlet/Outlet; B, B' corresponding with Port to Hydraulic Unit Inlet/Outlet; C, C' corresponding with Port to High Pressure Accumulator; D, D' corresponding with Port to Low Pressure Accumulator; and F, F' corresponding with Port to Thermal Unit. FIG. 28 also sets forth several running cases and running conditions, which include: (1) Constant Speed—No Intermediate Storage; (2) Intermediate Storage; (3) Controlled Flow Resistance—Retarder Mode; (4) Usage of Stored Energy—Same Rotational Direction as During Filling; (5) Usage of Stored Energy—Same Rotational Direction as During Filling; (6) Stop/Go-Low Speed/Low Load-Power Boost; and (7) Additional Hydraulic Flow Source.

Figure 29:
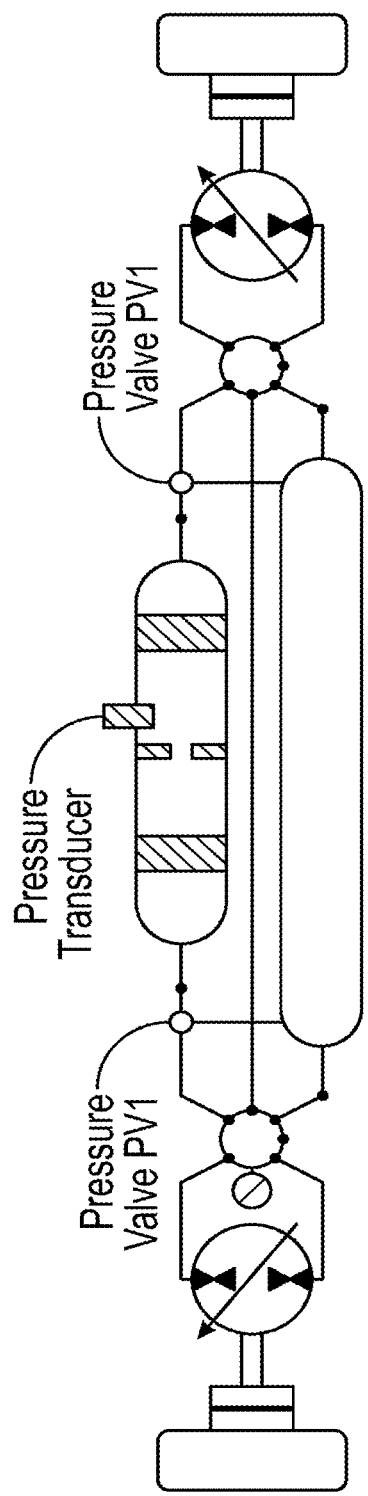
FIG. 29 illustrates the structure of a fail-safe system that relieves excess pressure that may accumulate in an Integrated Energy Conversion, Transfer, and Storage System.

Referring now to FIG. 29, in some implementations of the Integrated Energy Conversion, Transfer, and Storage System, two pressure valves PV1 and PV2 are incorporated which connect the high pressure accumulator with the low pressure accumulator. In the implementation of FIG. 29, the two pressure valves PV1 and PV2 act as safety features. Additionally, the Integrated Energy Conversion, Transfer, and Storage System includes a pressure transducer connected to the high pressure accumulator. The pressure transducer measures the load and filling degree, as well as serves as an input parameter for the control system.

Figure 30A:
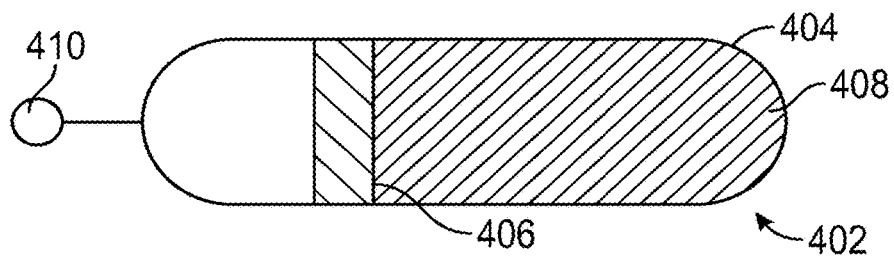
FIG. 30A is a schematic diagram of a side elevation view of a single-sided accumulator having a single elastic element, according to at least one illustrated embodiment.
Figure 30B:
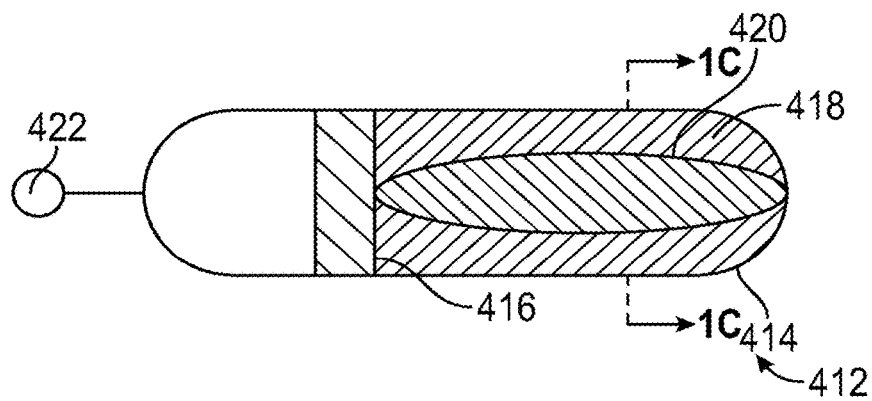
FIG. 30B is a schematic diagram of a side elevation view of a single-sided accumulator having two elastic elements, according to at least one illustrated embodiment.
Figure 30C:
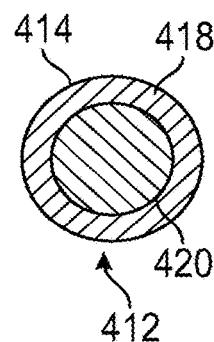
FIG. 30C is a schematic diagram of a cross-sectional end view of a single-sided accumulator having two elastic elements, according to at least one illustrated embodiment.

Referring now to the accumulator portion of the Integrated Energy Conversion, Transfer, and Storage System, FIG. 30A illustrates a single-sided accumulator 402 including a housing 404, a hydraulic piston 406 positioned to compress an energy storage medium 408 within the housing 404, and a hydraulic inlet/outlet port 410. In some implementations, the energy storage medium 408 is a compressible gas such as a nitrogen gas, such that the piston 406 and the energy storage medium 408 act as a pneumatic spring within the housing 404. FIG. 30B illustrates a single-sided accumulator 412 including a housing 414, a hydraulic piston 416 positioned to compress a gaseous elastic element 418, such as a nitrogen gas sealed behind the piston 416, and a mechanical elastic element 420 such as a mechanical helical or disc spring, and a hydraulic inlet/outlet port 422. The two elastic elements 418 and 420 have different elasticities and different energy storage capacities. The gaseous elastic element 418 is sealed within the accumulator 412 at a pre-charge pressure. FIG. 30C illustrates a cross-sectional view of the accumulator 412 taken along line 1C-1C of FIG. 30B.

Figure 30D:
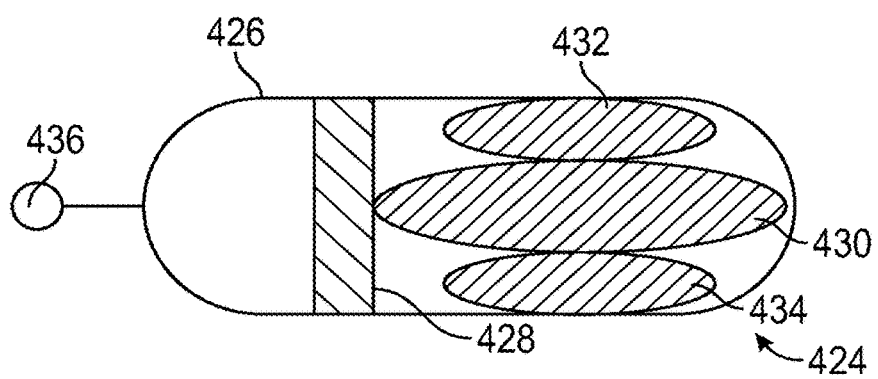
FIG. 30D is a schematic diagram of a side elevation view of a single-sided accumulator having three elastic elements, according to at least one illustrated embodiment.

FIG. 30D illustrates a single-sided accumulator 424 including a housing 426, a hydraulic piston 428 positioned to compress a primary elastic element 430 which includes an annular elastomer spring engaged with the piston 428 and with an end of the housing 426 opposite the piston 428 across a length of the primary elastic element 430, and a hydraulic inlet/outlet port 436. FIG. 30D also illustrates that the single-sided accumulator 424 includes two secondary elastic elements 432 and 434, which also include annular elastomer springs. The secondary elastic elements 432 and 434 are engaged with respective and opposite sides of the primary elastic element 430, and with respective and opposite sidewalls of the housing 426.

Figure 30E:
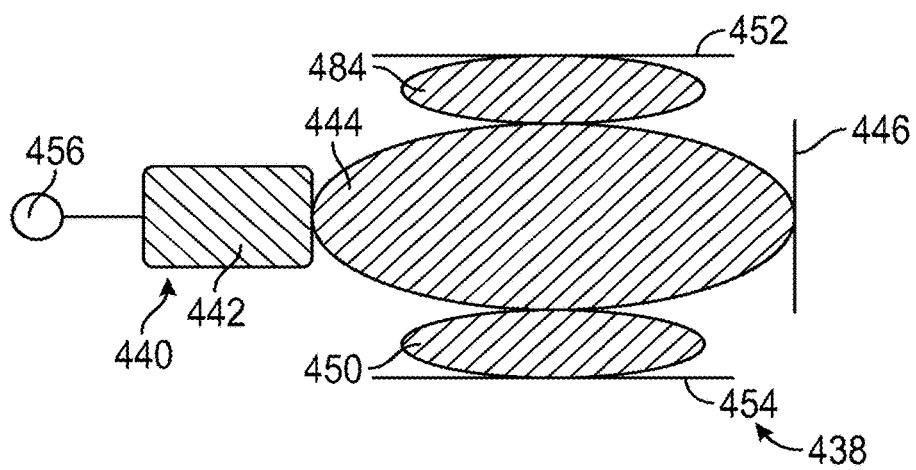
FIG. 30E is a schematic diagram of a side elevation view of a single-sided accumulator having three elastic elements and a hydraulic cylinder, according to at least one illustrated embodiment.

FIG. 30E illustrates a single-sided accumulator 438 including a hydraulic cylinder 440 having a central piston 442 positioned to slide longitudinally through the cylinder 440. The accumulator 438 also includes a primary elastic element 444 engaged with the piston 442 and a flexible end wall 446 of the accumulator 438 in a manner similar to that described above for the primary elastic element 430. The accumulator 438 also includes two secondary elastic elements 448 and 450 engaged with the primary elastic element 444 and flexible side walls 452 and 454 of the accumulator 438 in a manner similar to that described above for the secondary elastic elements 432 and 434. The piston 442 glides or slides longitudinally within the primary elastic element 44, compressing a fluid therein. The flexible walls 446, 452, and 454 contain and help to compress the respective elastic elements 444, 448, and 450. The accumulator 438 also includes a hydraulic inlet/outlet 456.

Figure 31A:
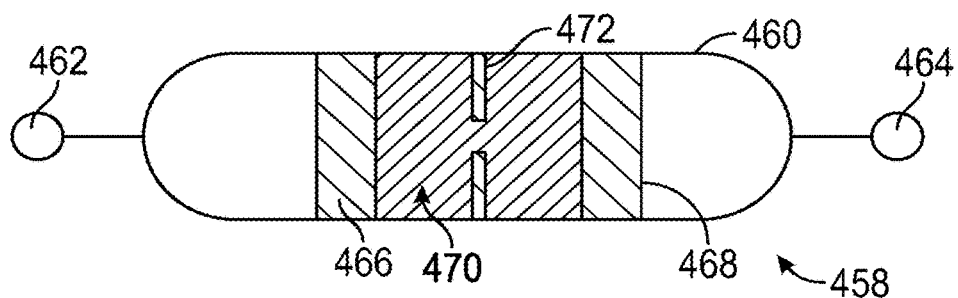
FIG. 31A is a schematic diagram of a side elevation view of a double-sided accumulator having a single elastic element, according to at least one illustrated embodiment.

FIG. 31A illustrates a double-sided accumulator 458 including a housing 460, a first inlet/outlet 462, a second inlet/outlet 464, a first piston 466, a second piston 468, a single elastic element 470 comprising a compressed gas, and a dividing wall 472. In the double-sided accumulator 458, the storage media of the two sides of the elastic element 470 are of same nature, that is, the same gaseous material, such as nitrogen. Displacement of the pistons 466 and 468 is limited inside the housing 460 by the dividing wall 472, which nevertheless has an opening at the center thereof to allow the gaseous material to flow freely back and forth between the pistons 466 and 468.

Figure 31B:
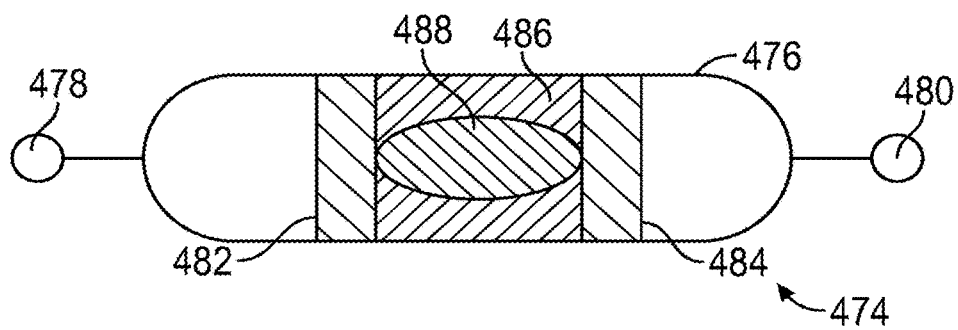
FIG. 31B is a schematic diagram of a side elevation view of a double-sided accumulator having two elastic elements, according to at least one illustrated embodiment.

FIG. 31B illustrates a double-sided accumulator 474 including a housing 476, a first inlet/outlet port 478, a second inlet/outlet port 480, a first piston 482, a second piston 484, a gaseous elastic element 486 such as a nitrogen gas sealed behind and between the pistons 482 and 484, and a mechanical elastic element 488 such as a mechanical helical or disc spring or an elastomer hose. The gaseous elastic element 486 and the mechanical elastic element 88 are fixed to and defined between the pistons 482 and 484.

Figure 31C:
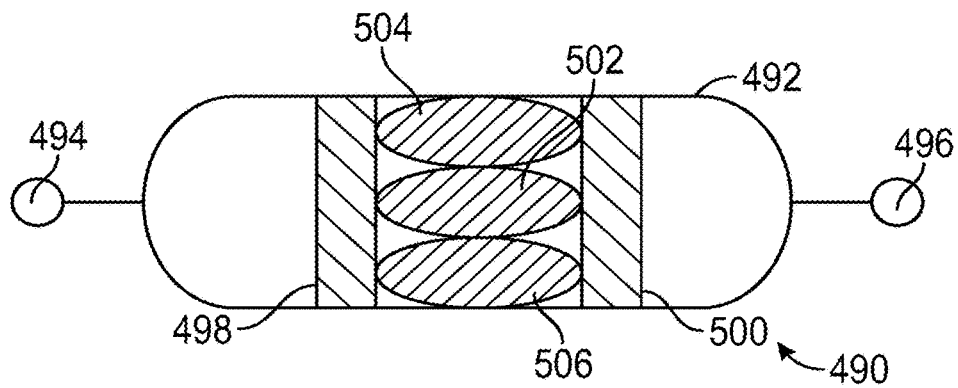
FIG. 31C is a schematic diagram of a side elevation view of a double-sided accumulator having three elastic elements coupled to one another in parallel, according to at least one illustrated embodiment.

FIG. 31C illustrates a double-sided accumulator 490 including a housing 492, a first inlet/outlet port 494, a second inlet/outlet port 496, a first piston 498, a second piston 500, a primary elastic element 502, and two secondary elastic elements 504 and 506. The primary and secondary elastic elements 502, 504, 506 each comprise an elastomer element or a mechanical spring. The primary and secondary elastic elements 502, 504, 506 are arranged in parallel. Otherwise stated, the primary and secondary elastic elements 502, 504, 506 are each coupled at a first end to the first piston 498 and at a second end to the second piston 500, such that the primary elastic element 502 is confined between the first and second pistons 498 and 500 and the two secondary elastic elements 504 and 506, and such that the secondary elastic elements 504 and 506 are confined between the first and second pistons 498 and 500, the primary elastic element 502, and a sidewall of the housing 492.

Figure 31D:
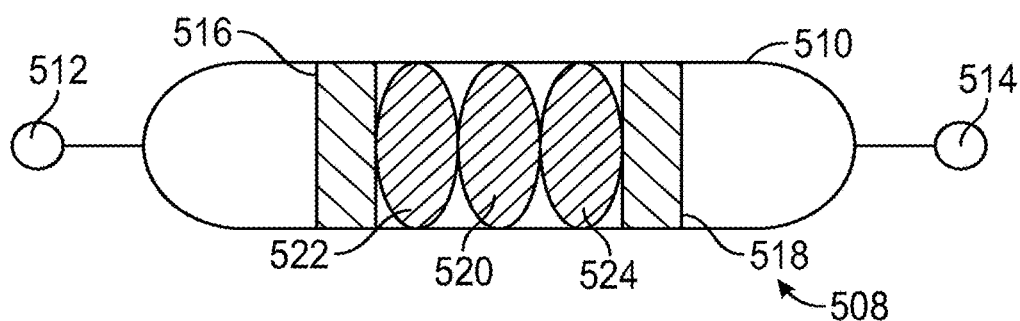
FIG. 31D is a schematic diagram of a side elevation view of a double-sided accumulator having three elastic elements coupled to one another in series, according to at least one illustrated embodiment.

FIG. 31D illustrates a double-sided accumulator 108 including a housing 510, a first inlet/outlet port 512, a second inlet/outlet port 514, a first piston 516, a second piston 518, a primary elastic element 520, and two secondary elastic elements 522 and 524. The primary and secondary elastic elements 520, 522, 524 each comprise an elastomer element or a mechanical spring. The primary and secondary elastic elements 520, 522, 524 are arranged in series. Otherwise stated, the primary elastic element 520 is confined between two sidewalls of the housing 510 and the two secondary elastic elements 522 and 524, and the secondary elastic elements 522 and 524 are confined between a respective one of the first and second pistons 516 and 518, the primary elastic element 520, and the two sidewalls of the housing 510.

FIG. 32A illustrates a double-sided accumulator 526 with parallel and integrated high-pressure and low-pressure accumulators 528 and 530, respectively, including an outer housing 532 and an internal dividing wall 534 that divides the accumulator 526 between the high-pressure accumulator 528 and the low-pressure accumulator 530. The accumulator 526 includes a first inlet/outlet port 536 for the high-pressure accumulator 528, a second inlet/outlet port 538 for the high-pressure accumulator 528, a third inlet/outlet port 540 for the low-pressure accumulator 530, and a fourth inlet/outlet port 542 for the low-pressure accumulator 530. The high-pressure accumulator 528 includes an elastic element 544, which includes an elastomer hose, pre-filled and pre-charged with a compressed nitrogen gas.

FIG. 32B illustrates a double-sided accumulator 546 with parallel and integrated high-pressure and low-pressure accumulators 548 and 550, respectively, including an outer housing 552 and an internal dividing wall 554 that divides the accumulator 546 between the high-pressure accumulator 548 and the low-pressure accumulator 550. The accumulator 546 includes a first inlet/outlet port 556 for the high-pressure accumulator 548, a second inlet/outlet port 558 for the high-pressure accumulator 548, a third inlet/outlet port 560 for the low-pressure accumulator 550, and a fourth inlet/outlet port 562 for the low-pressure accumulator 550. The high-pressure accumulator 548 includes a first piston 564, a second piston 566, and an elastic element 568 positioned between and coupled to the first and second pistons 564 and 566.

FIG. 32C illustrates possible cross-sectional shapes of components of the accumulator 546, taken along line 3C,3D-3C,3D of FIG. 32B, wherein the high-pressure accumulator 548 has a circular cross-sectional shape and the low-pressure accumulator 550 has a cross-sectional shape comprising a crescent, or elliptical cross-sectional shape with a portion blocked by the circular cross-sectional shape of the high-pressure accumulator 548. FIG. 32D illustrates possible cross-sectional shapes of components of the accumulator 546, taken along line 3C,3D-3C,3D of FIG. 32B, wherein the high-pressure accumulator 548 has a circular cross-sectional shape and the low-pressure accumulator 550 has a trapezoidal cross-sectional shape with a portion blocked by the circular cross-sectional shape of the high-pressure accumulator 548.

Figure 33A:
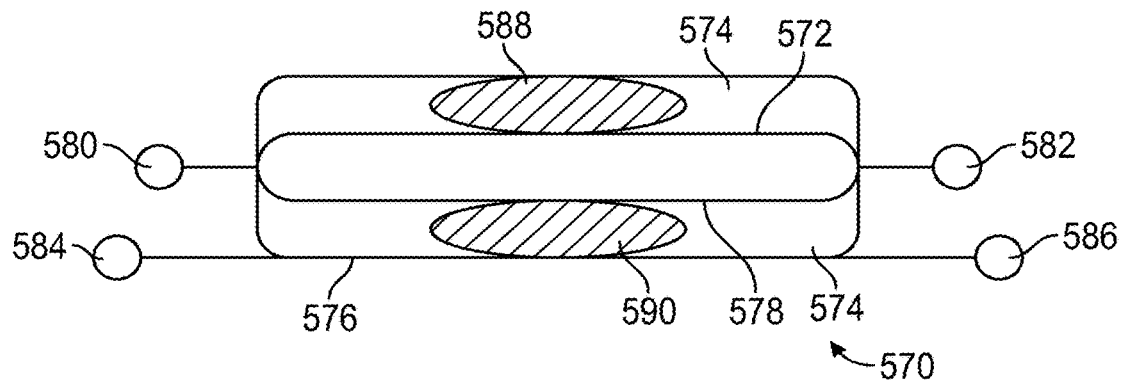
FIG. 33A is a schematic diagram of a side elevation view of a double-sided accumulator having concentric integrated high-pressure and low-pressure accumulators, according to at least one illustrated embodiment.

FIG. 33A illustrates a double-sided accumulator 570 with parallel, integrated, and concentric high-pressure and low-pressure accumulators 572 and 574, respectively, including an outer housing 576 and an internal dividing wall 578 that divides the accumulator 570 between the high-pressure accumulator 572 and the low-pressure accumulator 574. The high-pressure accumulator 572, the low-pressure accumulator 574, the outer housing 576, and the internal dividing wall 578 have circular cross-sectional shapes, and the internal dividing wall 578 is concentric with the outer housing 576.

The accumulator 570 includes a first inlet/outlet port 580 for the high-pressure accumulator 572, a second inlet/outlet port 582 for the high-pressure accumulator 572, a third inlet/outlet port 584 for the low-pressure accumulator 574, and a fourth inlet/outlet port 586 for the low-pressure accumulator 574. The low-pressure accumulator 574 includes a first elastic element 588 and a second elastic element 590, which store energy when deformed under high or low pressures. In some implementations, the internal dividing wall 578 is elastic or elastomeric to retain stored energy when deformed under high or low pressures.

Figure 33B:
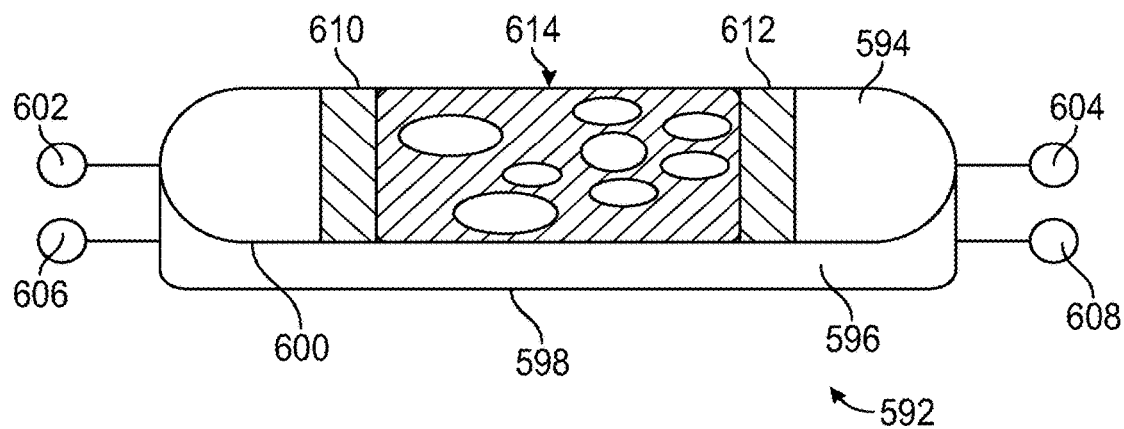
FIG. 33B is a schematic diagram of a side elevation view of a double-sided accumulator having continuously variable storage capacity, according to at least one illustrated embodiment.

FIG. 33B illustrates a double-sided accumulator 592 with parallel and integrated high-pressure and low-pressure accumulators 594 and 596, respectively, including an outer housing 598 and an internal dividing wall 600 that divides the accumulator 592 between the high-pressure accumulator 594 and the low-pressure accumulator 596. The accumulator 592 includes a first inlet/outlet port 202 for the high-pressure accumulator 594, a second inlet/outlet port 604 for the high-pressure accumulator 594, a third inlet/outlet port 606 for the low-pressure accumulator 596, and a fourth inlet/outlet port 608 for the low-pressure accumulator 596. The high-pressure accumulator 594 includes a first piston 610, a second piston 612, and an elastic element 614 positioned between the first and second pistons 610 and 612. The elastic element 614 includes a liquid/gas mixture with continuously variable storage capacity for liquid and gas in varying proportions, wherein the composition of the liquid/gas mixture is controlled by an external hydraulic circuit.

Figure 34:
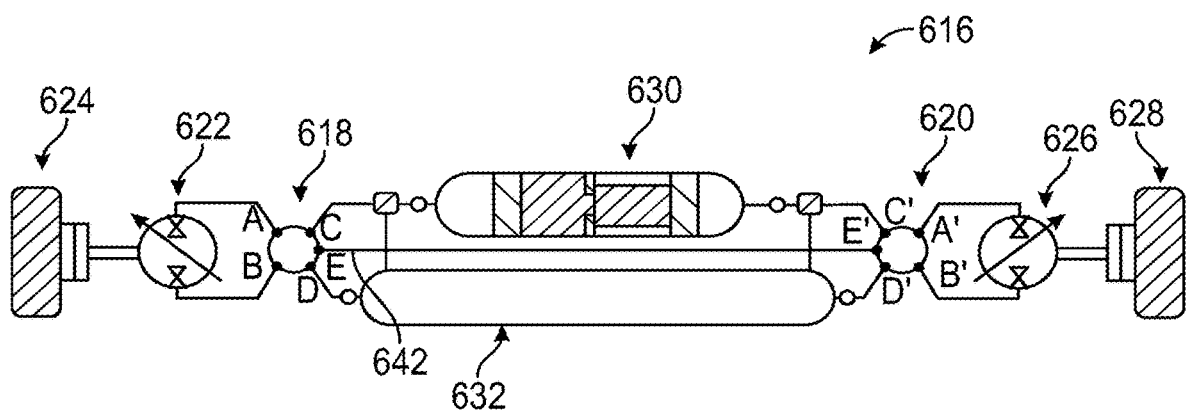
FIG. 34 is a schematic diagram of an accumulator coupled to valves, actuators, and mechanical devices, according to at least one illustrated embodiment.

FIG. 34 illustrates a schematic diagram of a double sided accumulator 616 coupled at its first side to a first flow control valve 618 and at its second side to a second flow control valve 620. The first and second flow control valves 618 and 620 are coupled, respectively, to a first hydraulic motor 622 that powers a first mechanical device such as a wheel 624, and to a second hydraulic motor 626 that powers a second mechanical device such as a wheel 628. The accumulator 616 has an implementation matching that described above for accumulator 126 and/or accumulator 146, that is, the accumulator 616 is a double sided accumulator with parallel and integrated high-pressure and low pressure accumulators 630, 632, respectively.

The first and second flow control valves 618 and 620 couple hydraulic ports of the accumulator 616 to hydraulic ports of the hydraulic motors 622 and 626, to allow hydraulic fluid to flow from the accumulator 616 to the motors 622 and 626, to discharge energy from the accumulator 616 to drive the wheels 624 and 628, or to allow hydraulic fluid to flow from the motors 622 and 626 to the accumulator 616, to recover energy from the wheels 624 and 628 and store it in the accumulator 616. In such an implementation, the accumulator 616 independently recovers energy from, or provides energy to, the wheels 624 and 628, improving overall efficiency.

Figure 35A:
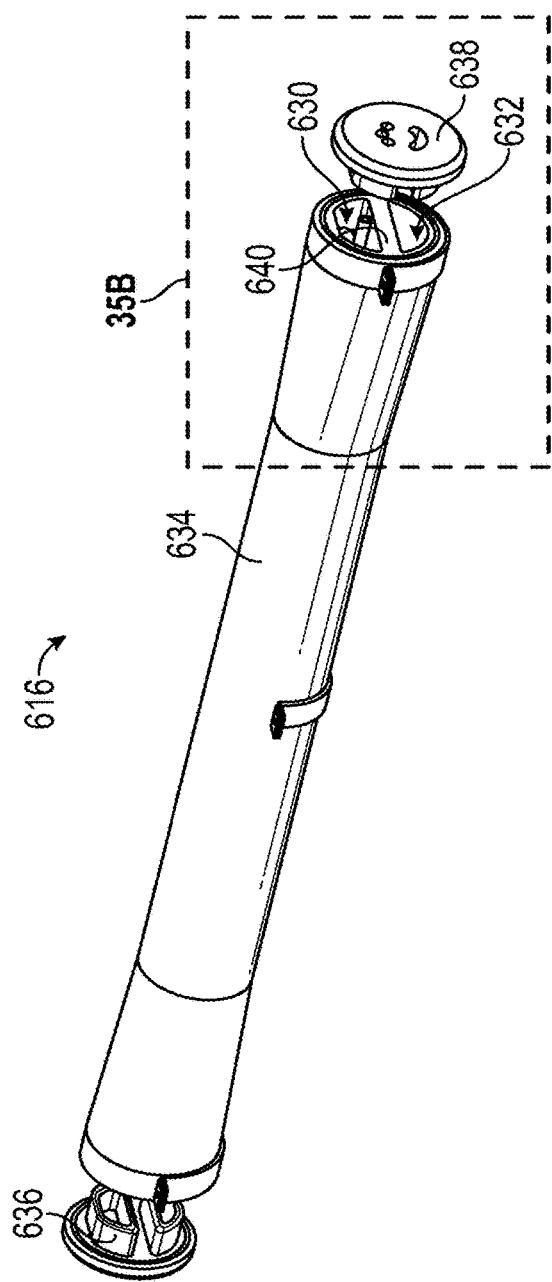
FIG. 35A illustrates a double-sided accumulator having a high-pressure accumulator and a low-pressure accumulator, as well as a housing with two end caps, according to at least one illustrated embodiment.
Figure 35B:
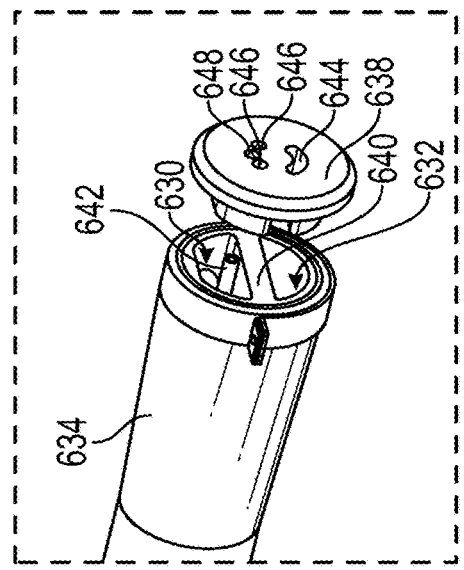
FIG. 35B illustrates a double-sided accumulator having a high-pressure accumulator and a low-pressure accumulator, as well as a housing with two end caps, according to at least one illustrated embodiment.
Figure 37B:
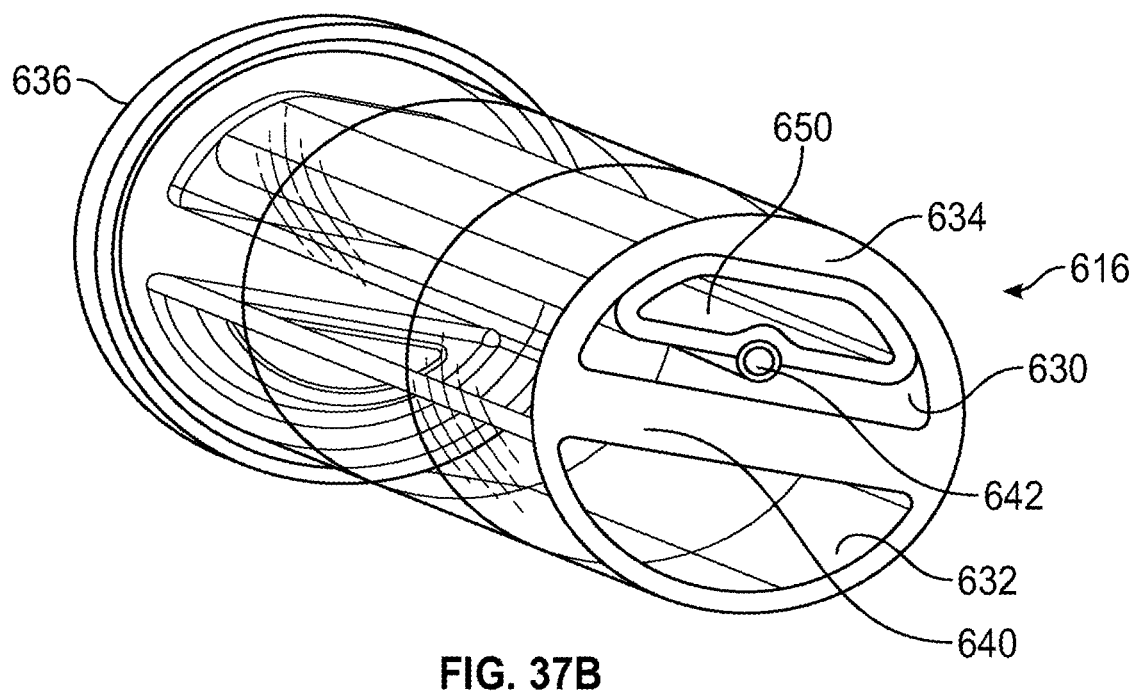
FIG. 37B illustrates perspective and phantom views of components of a double-sided accumulator having a high-pressure accumulator and a low-pressure accumulator, according to at least one illustrated embodiment.
Figure 37C:
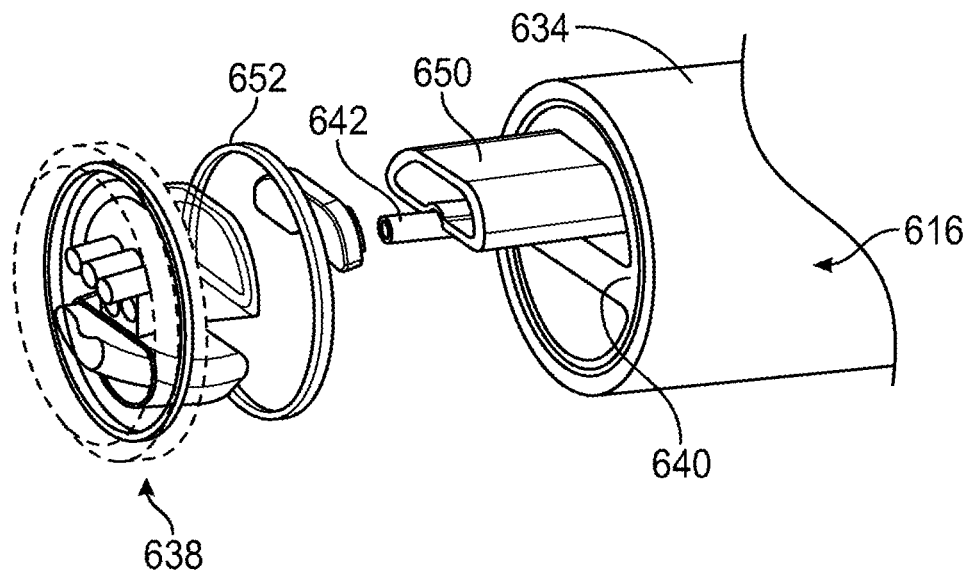
FIG. 37C illustrates a close-up view of components illustrated in FIG. 37A, according to at least one illustrated embodiment.

FIGS. 35A, 35B, 36A, 36B, and 37A-37E illustrate more specific details of one implementation of the accumulator 616. FIGS. 35A, 35B, 36A, and 36B illustrate that the accumulator 616 includes a hollow, cylindrical outer housing 634, a first end cap 636 at a first end of the housing 634, a second end cap 638 at a second end of the housing 634 opposite to the first end, and an internal dividing wall 640 that separates the high-pressure accumulator 630 from the low-pressure accumulator 632 within the housing 634. FIGS. 35A, 35B, 36A, and 36B also illustrate that the accumulator 616 includes a hydraulic pipe 642 that extends through and along the length of the high-pressure accumulator 630. FIG. 35B also illustrates that the second end cap 638 includes a low pressure port 644 that is hydraulically coupled to the low-pressure accumulator 632, two high pressure ports 646 that are hydraulically coupled to the high-pressure accumulator 630, and a hydraulic pipe port 648 that is hydraulically coupled to the hydraulic pipe 642. The hydraulic pipe 642 can extend along the length of the accumulator 616 to couple the first flow control valve 618 directly to the second flow control valve 620.

FIGS. 36A, 36B, and 37A-37E illustrate that the accumulator 616 includes an elastic element 650, which includes an elastomer hose pre-filled and pre-charged with a compressed nitrogen gas, positioned within the high-pressure accumulator 630. FIGS. 36A, 36B, and 37A-37E illustrate that the accumulator 616 also includes gaskets 652 to seal the first and second end caps 636 and 638 to the end faces of the housing 634.

Figure 38A:
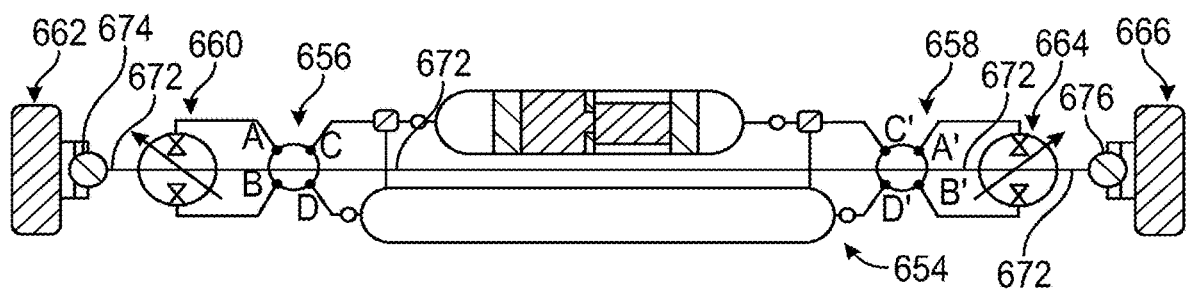
FIG. 38A is a schematic diagram of an accumulator having an integrated axle coupled to valves, actuators, and mechanical devices, according to at least one illustrated embodiment.

FIG. 38A illustrates a schematic diagram of a double sided accumulator 654 coupled at its first side to a first flow control valve 656 and at its second side to a second flow control valve 658. The first and second flow control valves 656 and 658 are coupled, respectively, to a first hydraulic motor 660 that powers a first mechanical device such as a wheel 662, and to a second hydraulic motor 664 that powers a second mechanical device such as a wheel 666. The accumulator 654 has an implementation matching that described above for accumulator 616 except for the differences described herein.

Figure 38B:
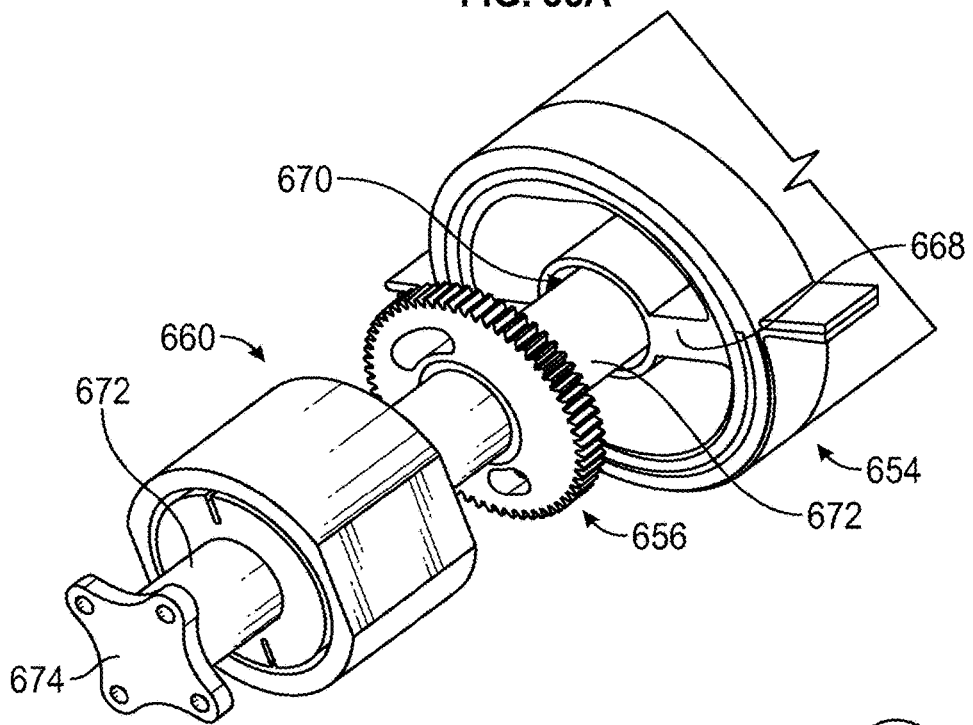
FIG. 38B illustrates a double-sided accumulator having an integrated axle, a high-pressure accumulator, and a low-pressure accumulator, according to at least one illustrated embodiment.
Figure 38C:
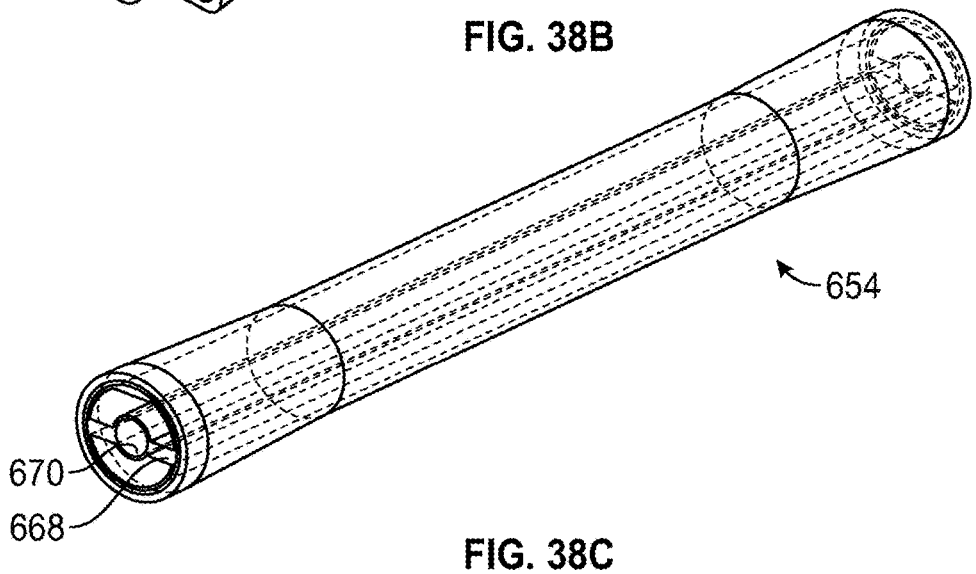
FIG. 38C illustrates a double-sided accumulator having an integrated axle, a high-pressure accumulator, and a low-pressure accumulator, according to at least one illustrated embodiment.
Figure 39A:
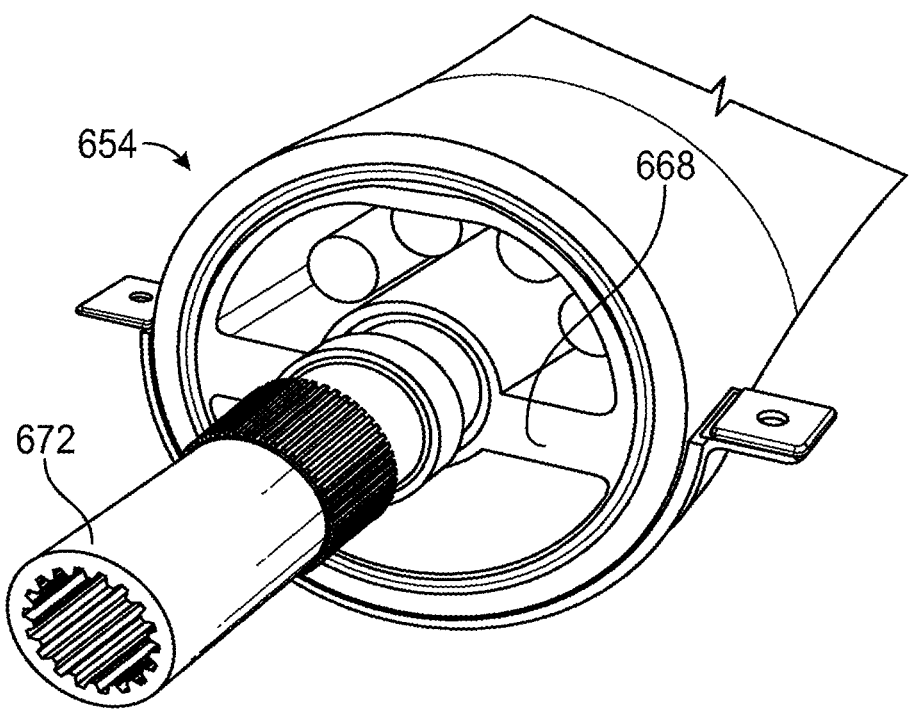
FIG. 39A illustrates a double-sided accumulator having an integrated axle, a high-pressure accumulator, and a low-pressure accumulator, according to at least one illustrated embodiment.
Figure 39B:
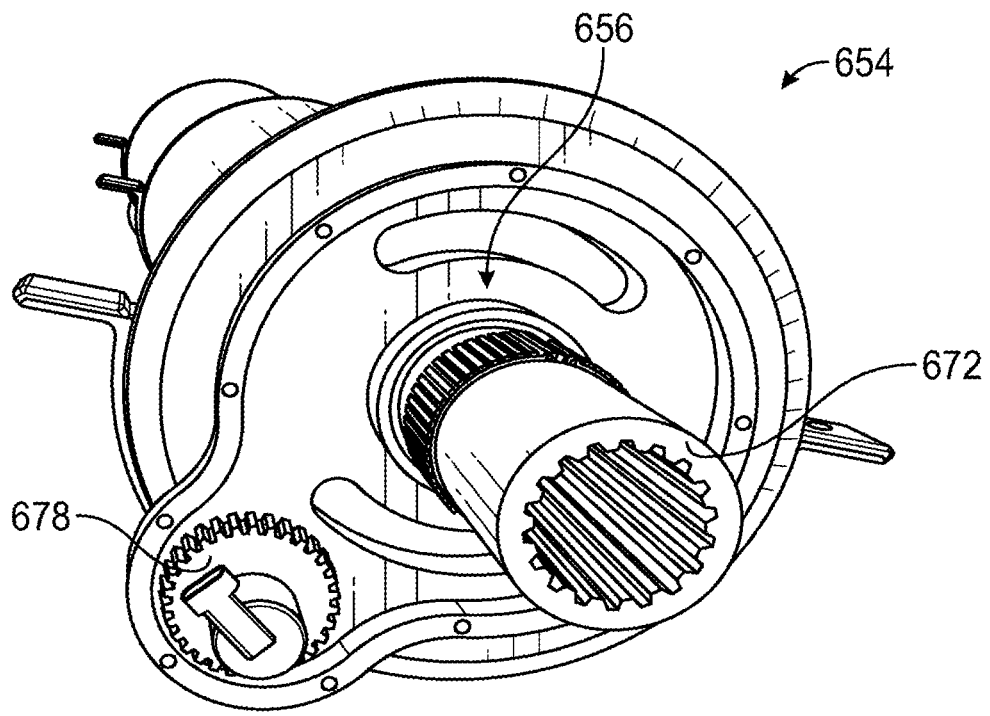
FIG. 39B illustrates a double-sided accumulator having an integrated axle, a high-pressure accumulator, and a low-pressure accumulator, according to at least one illustrated embodiment.
Figure 39C:
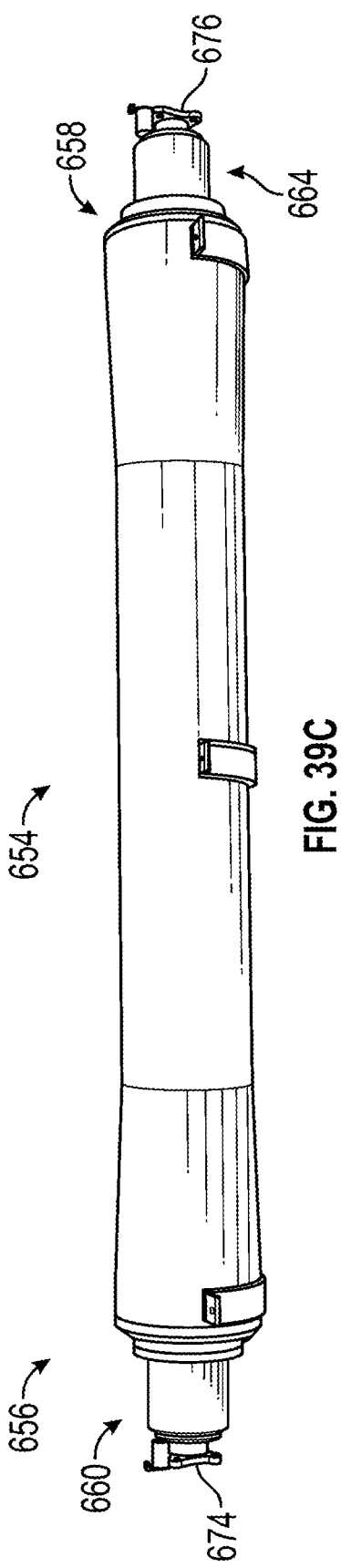
FIG. 39C illustrates a double-sided accumulator having an integrated axle, a high-pressure accumulator, and a low-pressure accumulator, according to at least one illustrated embodiment.

As illustrated in FIGS. 38B and 38, the accumulator 654 includes an internal dividing wall 668 similar to the internal dividing wall 640, but has an open conduit 670 extending longitudinally therethrough. As illustrated in FIG. 38B, a propulsion shaft or axle 672 extends through the open conduit 670. The axle 672 is coupled, such as rigidly coupled, to the first wheel 662 by a first mechanical coupling 674, and is coupled, such as rigidly coupled, to the second wheel 666 by a second mechanical coupling 676. Thus, the two wheels 662 and 666 are rigidly coupled to one another by an axle 672 extending through the accumulator 654. FIGS. 39A-39C further illustrate the accumulator 654, including its dividing wall 668 and axle 672, as well as additional details of the flow control valve 656, including its actuation mechanism 678.

Figure 40A:
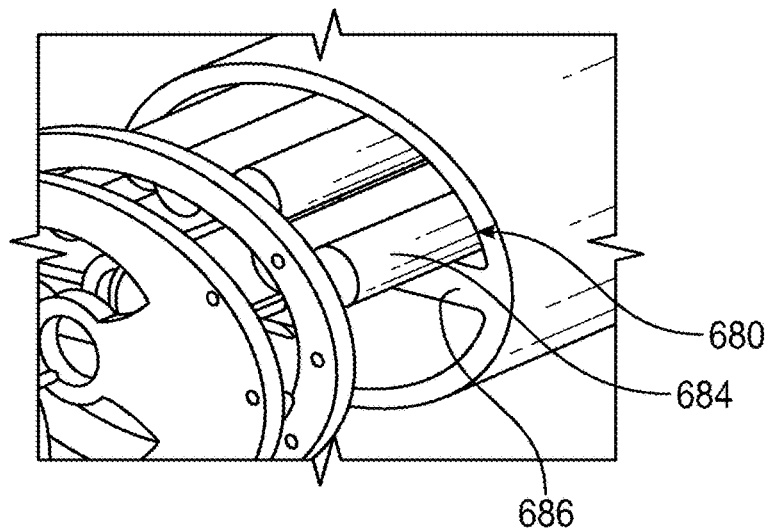
FIG. 40A illustrates an elliptical, double-sided accumulator having an integrated axle, a high-pressure accumulator, and a low-pressure accumulator, according to at least one illustrated embodiment.
Figure 40B:
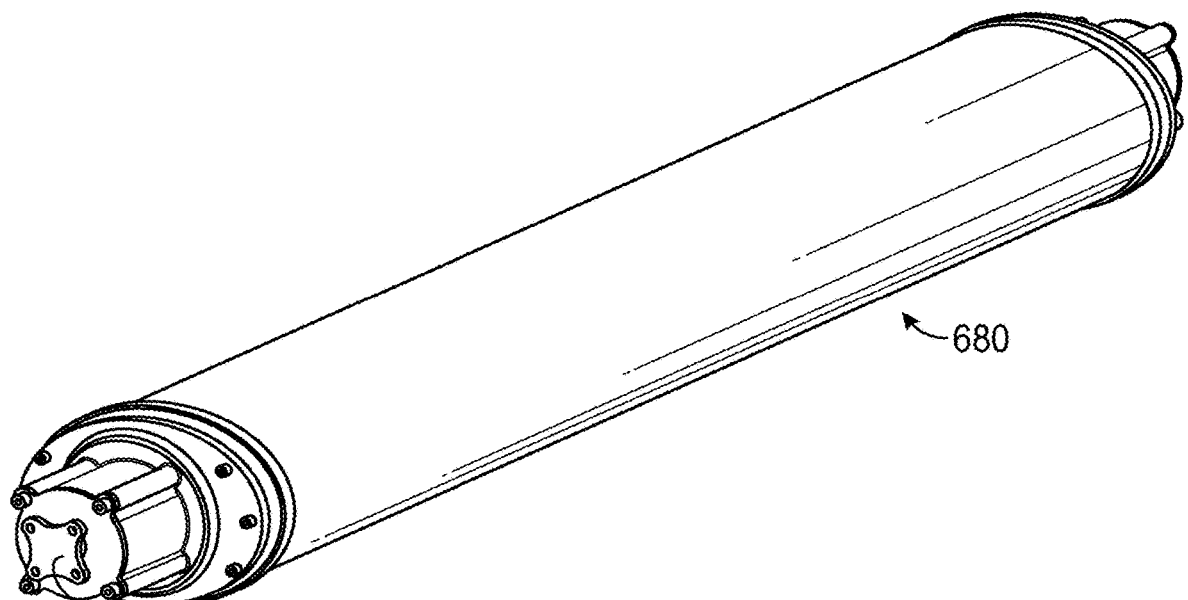
FIG. 40B illustrates an elliptical, double-sided accumulator having an integrated axle, a high-pressure accumulator, and a low-pressure accumulator, according to at least one illustrated embodiment.

FIGS. 40A and 40B illustrate another double-sided accumulator 680 coupled at its first side to a first flow control valve, a first hydraulic motor, and a first mechanical coupling 682 and at its second side to a second flow control valve, a second hydraulic motor, and a second mechanical coupling. The accumulator 680 has an implementation matching that described above for accumulator 654 except for the differences described herein. The accumulator 680 has an overall cross-sectional shape comprising an ellipse, with an internal dividing wall 686 extending along the major axis of the ellipse. The accumulator 680 also includes a plurality of elastomeric elements 684 for storage of accumulated energy.

Figure 41B:
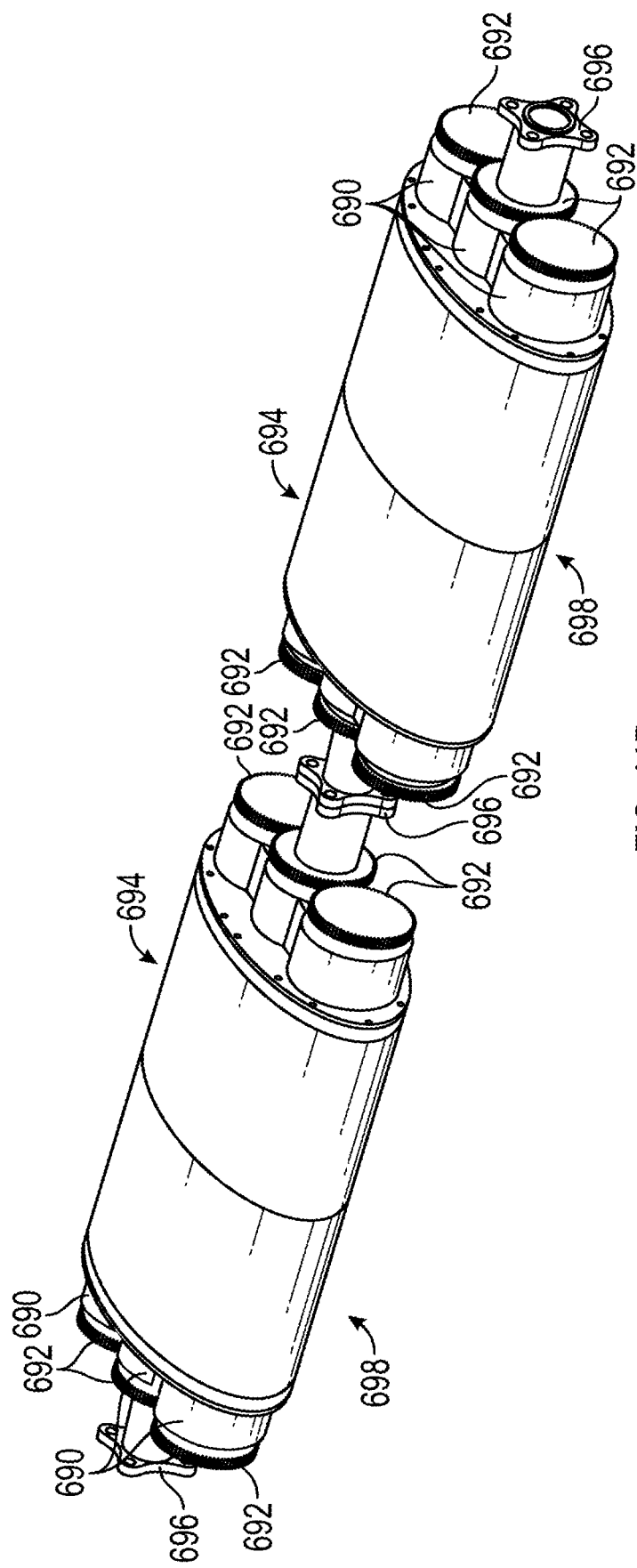
FIG. 41B illustrates an integrated set of multiple accumulators, according to at least one illustrated embodiment.
Figure 41C:
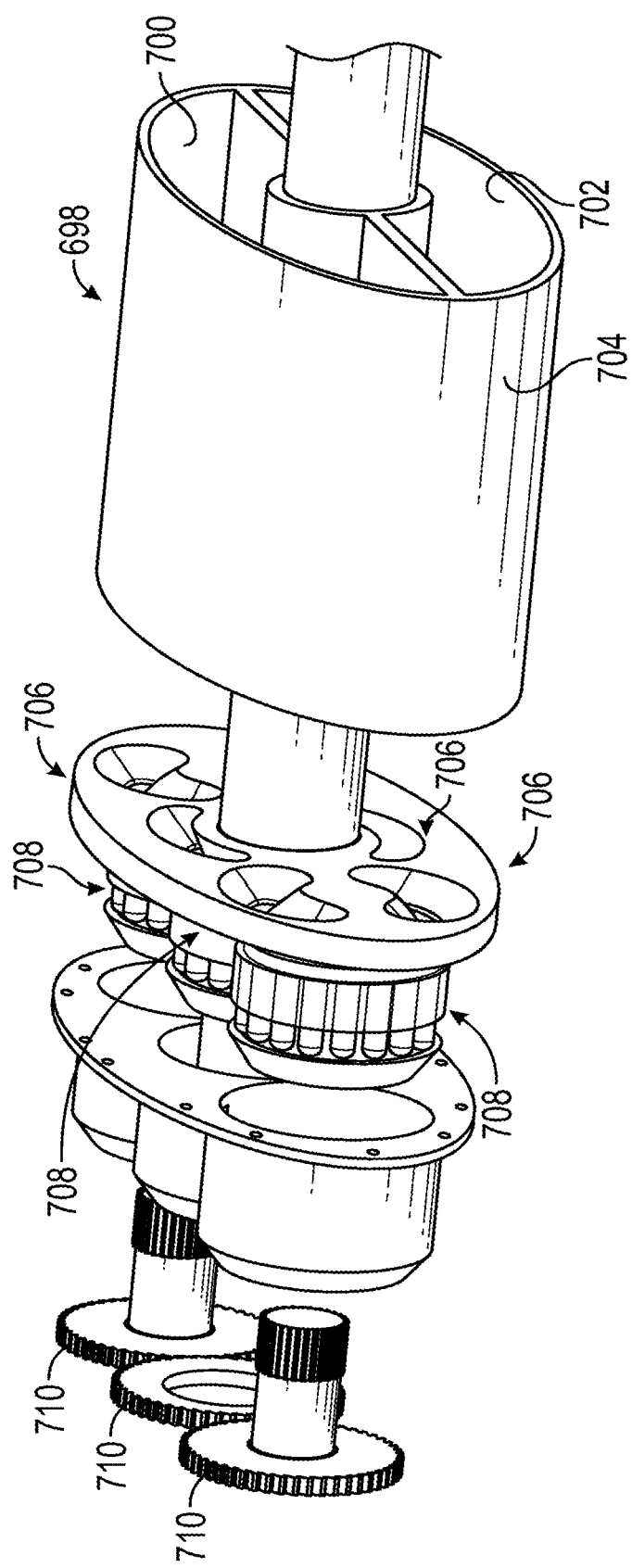
FIG. 41C illustrates an exploded view of an accumulator having an integrated axle, a high-pressure accumulator, and a low-pressure accumulator, according to at least one illustrated embodiment.
Figure 41D:
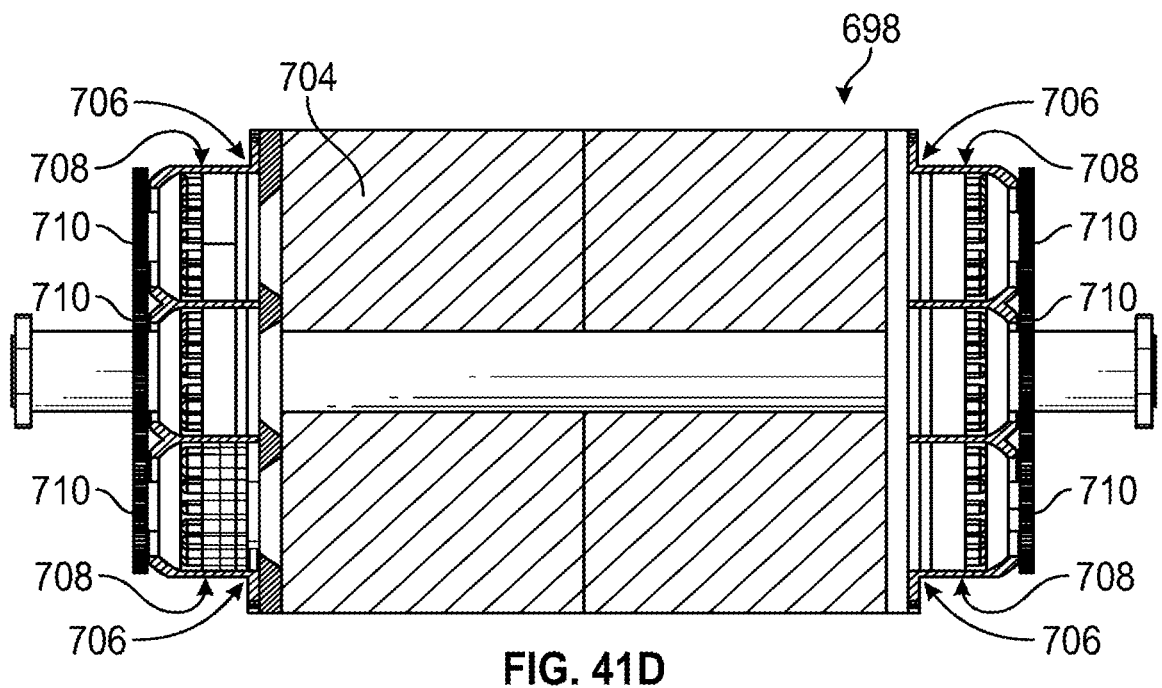
FIG. 41D illustrates a top plan view of an accumulator having an integrated axle, a high-pressure accumulator, and a low-pressure accumulator, according to at least one illustrated embodiment.
Figure 41E:
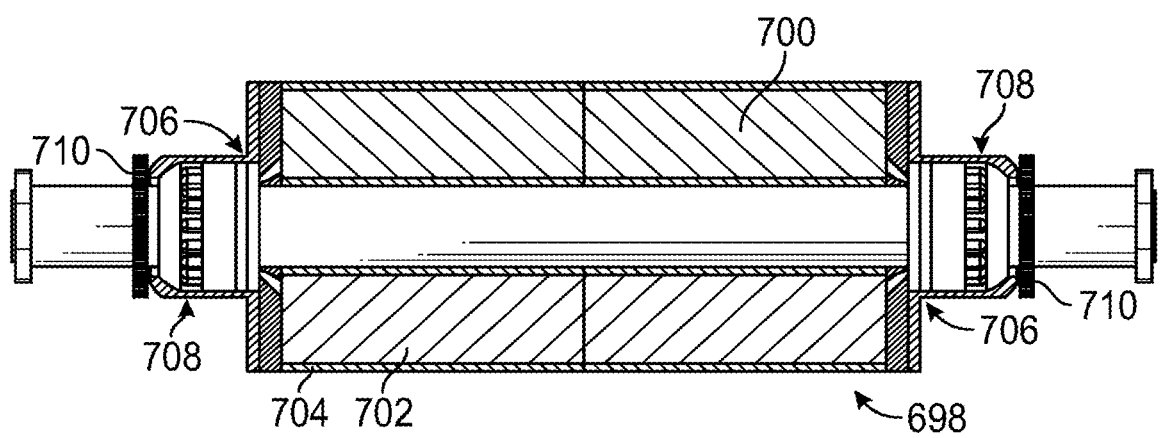
FIG. 41E illustrates a side view of an accumulator having an integrated axle, a high-pressure accumulator, and a low-pressure accumulator, according to at least one illustrated embodiment.
Figure 41F:
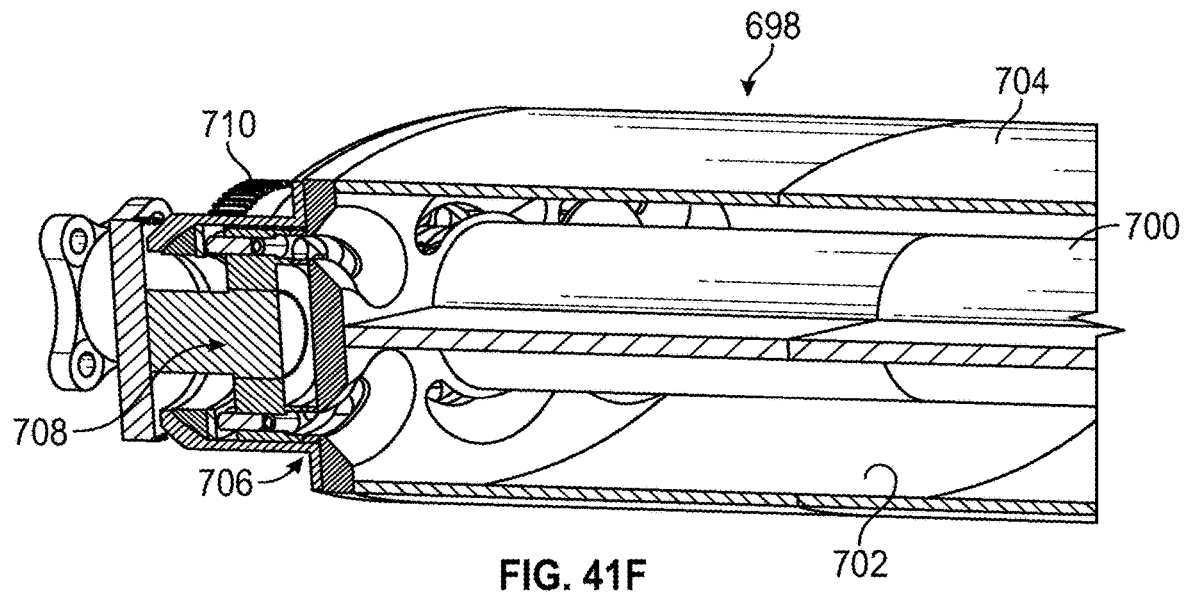
FIG. 41F illustrates a cross-sectional view of an accumulator having an integrated axle, a high-pressure accumulator, and a low-pressure accumulator, according to at least one illustrated embodiment.
Figure 41G:
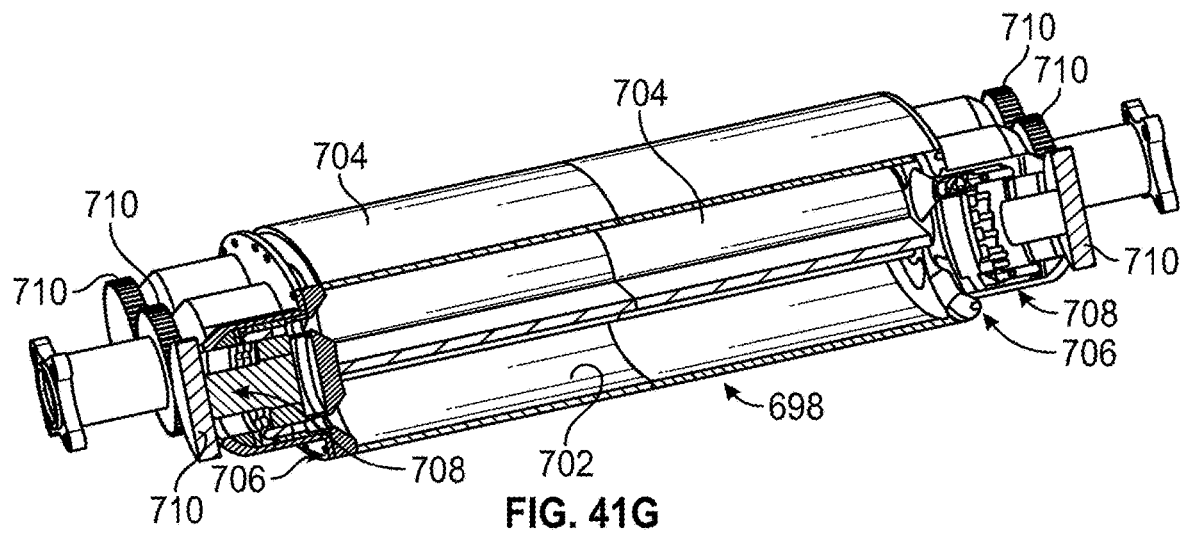
FIG. 41G illustrates a cross-sectional view of an accumulator having an integrated axle, a high-pressure accumulator, and a low-pressure accumulator, according to at least one illustrated embodiment.

FIGS. 41A-41G illustrate sets of multiple accumulators that are integrated with one another and with respective valves, hydraulic motors, and axles as described herein, and provided together as an integrated set of multiple accumulators. FIG. 41A illustrates a schematic diagram of such an integrated set 688 of six accumulators 690, together with respective valves, hydraulic motors, and axles, wherein each of the six accumulators 690 has a structure corresponding to that of the accumulator 654. The axle of each of the six accumulators 690 is coupled at either end to a gear 692. The six accumulators 690 are grouped into accumulator units or subsets of three accumulators 690, with each of the units or subsets housed together within a housing 694 having an elliptical cross-sectional shape.

The gears 692 coupled to the axle of each accumulator 690 within a single one of the housings 694 are meshed with one another, such that the three accumulators in each housing 694 are coupled to one another in parallel. Further, the axle of one of the accumulators within each of the housings 694 is coupled at either end to a mechanical coupling 696. One mechanical coupling 696 coupled to one of these axles is coupled to another mechanical coupling 696 coupled to the other of these axles, such that the accumulators of the two accumulator units or subsets are coupled to one another in series.

FIGS. 41B-41G illustrate another accumulator unit 698 including a single high-pressure accumulator 700 and a single low-pressure accumulator 702, housed together within a housing 704 having an elliptical cross-sectional shape. The accumulator unit 698 is coupled at each of its two opposing ends to three valves 706 and three hydraulic motors 708. Each of the hydraulic motors 708 is coupled to a respective gear 710 and the three gears 710 are meshed with one another to couple the valves 706 and motors 708 to one another in parallel. The accumulator unit 698 may be used in place of one or both of the accumulator units or subsets of three accumulators 690 illustrated in FIG. 41A.

Figure 42A:
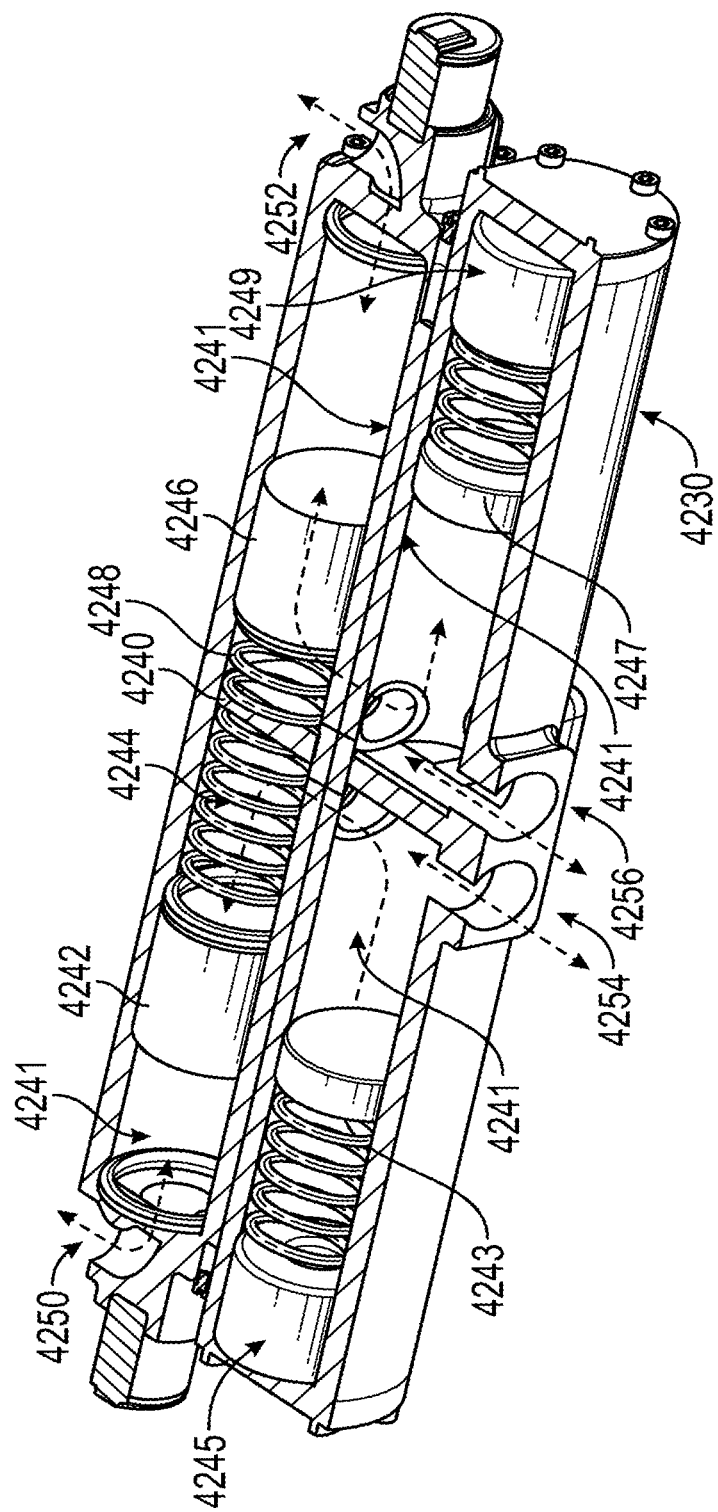
FIG. 42A illustrates a hydraulic system including a hydraulic accumulator, according to at least one illustrated embodiment.

FIG. 42A is illustrates a three-dimensional model of a hydraulic cylinder 4230 in the hydraulic propulsion system 4200. As illustrated in FIG. 42A, the hydraulic cylinder 4230 includes a first inlet/outlet 4250, and second inlet/outlet 4252, a third inlet/outlet 4254, and a fourth inlet/outlet 4256. Depending on the positions of the first and second flow control valves 4220 and 4222, the hydraulic cylinder 4230 has either a first inlet 4250, a second inlet 4252, a first outlet 4254, and a second outlet 4256, or a first inlet 4254, a second inlet 4256, a first outlet 4250, and a second outlet 4252.

The hydraulic cylinder 4230 illustrated in FIG. 42A houses a fixed dividing wall 4240, which divides the hydraulic cylinder 4230 into two distinct and rigid hydraulic chambers. Each hydraulic chamber is itself divided into two sub-chambers that are separated by additional dividing walls 4241. A first one of the chambers houses a first piston 4242 and a first elastic element or spring 4244 coupled to the first piston 4242 and to the dividing wall 4240 in its first sub-chamber, as well as a third piston 4243 and a third elastic element or spring 4245 coupled to the third piston 4243 and to a wall opposite the dividing wall 4240 in its second sub-chamber. A second one of the chambers houses a second piston 4246 and a second elastic element or spring 4248 coupled to the second piston 4246 and to the dividing wall 4240 in its first sub-chamber, as well as a fourth piston 4247 and a fourth elastic element or spring 4249 coupled to the fourth piston 4247 and to a wall opposite the dividing wall 4240.

The hydraulic cylinder 4230 illustrated in FIG. 42A includes a dilating fluid that flows into and out of the hydraulic cylinder 4230 through the first inlet/outlet 4250 and the second inlet/outlet 4252, and a working fluid that flows into and out of the hydraulic cylinder 4230 through the third inlet/outlet 4254 and the fourth inlet/outlet 4256. The working fluid is separated from the dilating fluid within the hydraulic cylinder 4230 by the first and second pistons 4242 and 4246.

When relatively high-pressure waves traveling through the dilating fluid enter the hydraulic cylinder 4230 through the first and second inlets 4250 and 4252, they travel toward and then exert relatively high pressures against the first and second pistons 4242 and 4246. As a result, the pistons 4242 and 4246 are urged to move toward the working fluid, compress the first and second springs 4244 and 4248, and initiate relatively high-pressure waves that travel through the working fluid toward the third and fourth pistons 4243 and 4247 and the third and fourth springs 4245 and 4249. The high pressure waves compress the springs 4245 and 4249 and travel toward the outlets 4254 and 4256 to exit the hydraulic cylinder 4230 through the outlets 4254 and 4256.

When relatively high-pressure waves traveling through the working fluid enter the hydraulic cylinder 4230 through the inlets 4254 and 4256, they travel toward and then exert relatively high pressures against the third and fourth pistons 4243 and 4247, third and fourth springs 4245 and 4249, and first and second pistons 4242 and 4246. As a result, the springs 4245 and 4249 are compressed, the springs 4244 and 4248 are extended, and the pistons 4242 and 4246 are urged to move toward the dilating fluid to initiate relatively high-pressure waves that travel through the dilating fluid toward the outlets 4250 and 4252 to exit the hydraulic cylinder 4230 through the outlets 4250 and 4252.

Thus, as the first and second flow control valves 4220 and 4222 are moved back and forth between their respective first and second positions, and as the relatively high-pressure waves alternate between entering the hydraulic cylinder 4230 through the inlets 4250 and 4252 and through the inlets 4254 and 4256, the pistons 4242 and 4246 each begin to oscillate back and forth within the hydraulic cylinder 4230 with respect to the fixed dividing wall 4240. The springs 4244 and 4248 are alternately compressed and extended. In some implementations, this movement of the springs 4244 and 4248 provides sonic inertia and/or introduces a phase shift into the system's dynamic behavior. Further, as the relatively high-pressure waves travel back and forth through the hydraulic cylinder 4230, the springs 4245 and 4249 are increasingly compressed, which in some implementations provides energy storage (e.g., accumulation) in the compression of the springs 4245 and 4249. The masses of the pistons 4242, 4246, 4243, and 4247, and the spring constants or stiffnesses of the springs 4244, 4245, 4248, and 4249 are selected or designed so that these components oscillate under resonant conditions, or resonate, within the hydraulic cylinder 4230 for a given frequency or given frequencies of the relatively high-pressure waves.

Figure 42B:
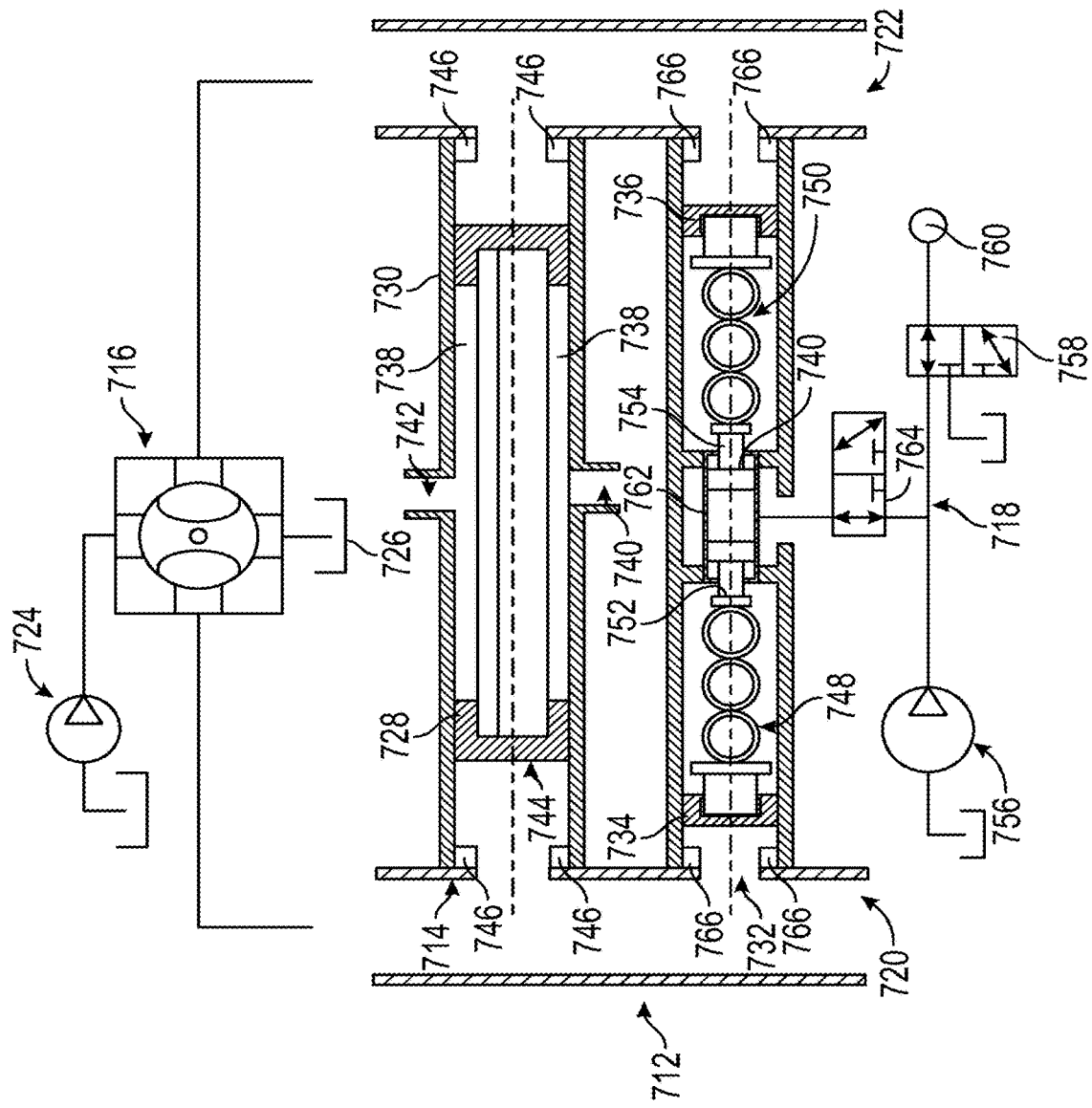
FIG. 42B illustrates a hydraulic system including a hydraulic accumulator, according to at least one illustrated embodiment.

FIG. 42B illustrates a hydraulic system 712 including a hydraulic cylinder 714 and a hydraulic accumulator 732. In the hydraulic system 712, a hydraulic flow control valve 716 is used to generate oscillating hydraulic pressure waves traveling through opposed hydraulic conduits 720 and 722. A constant-flow hydraulic pump 724 generates and provides a high-pressure hydraulic fluid to the first flow control valve 716, and a hydraulic fluid reservoir 726 provides a relatively low-pressure hydraulic fluid to the first flow control valve 716.

Figure 42C:
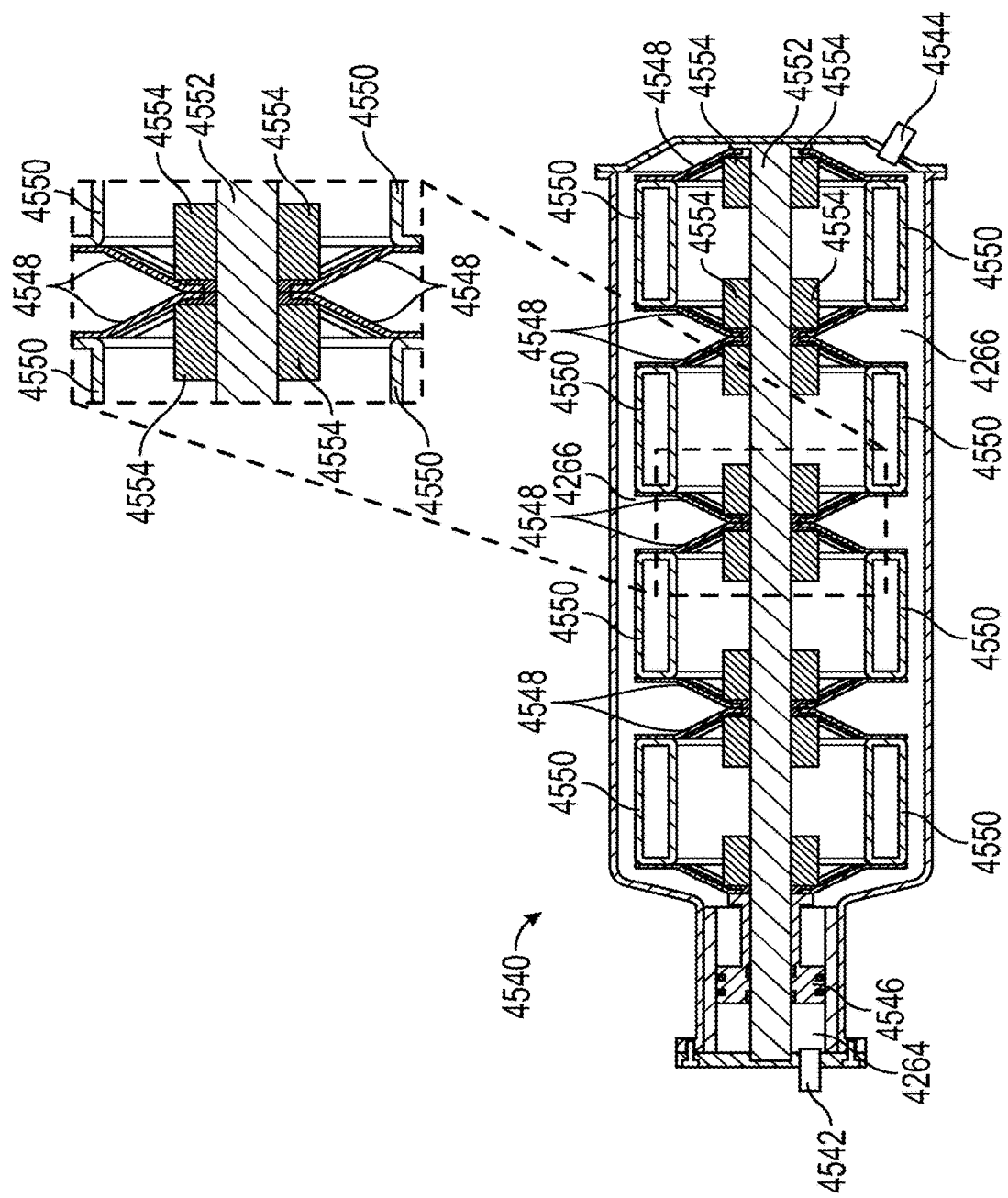
FIG. 42C illustrates a cross-sectional view of a hydraulic accumulator, according to at least one illustrated embodiment.

FIG. 42C illustrates a cross-sectional view of an alternative accumulator unit 4540, which acts as a dual high-pressure and low-pressure accumulator unit by incorporating both the high-pressure accumulator 4264 and the low-pressure accumulator 4266. The accumulator unit 4540 includes a first inlet port 4542 that allows access for a relatively high-pressure fluid to the high pressure accumulator 4264, and a second inlet port 4544 that allows access for a relatively low-pressure fluid to the low pressure accumulator 4266. When a high-pressure fluid is provided to the high-pressure accumulator 4264 through the first inlet 4542 and/or a low-pressure fluid is provided to the low-pressure accumulator 4266 through the second inlet 4544, the respective pressures turn a piston 4546 within the accumulator 4540. This compresses a plurality of disc springs 4548 and a plurality of hose-type elastomer springs 4550 interconnected with the disc springs 4548, thereby storing energy for later use in the compression of the springs 4548, 4550.

In one implementation, the springs 4548 and 4550 are mounted on a support shaft 4552 running the length of the accumulator 4540, to provide support and stability for the springs 4548 and 4550. In some embodiments, the accumulator 4540 includes a plurality of massive bodies 4554 coupled to the springs 4548 and/or 4550. The accumulator 4540 is coupled to a hydraulic conduit of the hydraulic propulsion system 4200 that carries oscillating pressure waves, as described herein, so that the accumulator 4540 can also store energy in the oscillation of the masses 4554 and the springs 4548, 4550. Spring constants or stiffnesses of the springs 4548 and 4550 and/or the masses of the massive bodies 4554 are selected or designed so that these components oscillate under resonant conditions, or resonate, within the accumulator 4540.

Figure 42D:
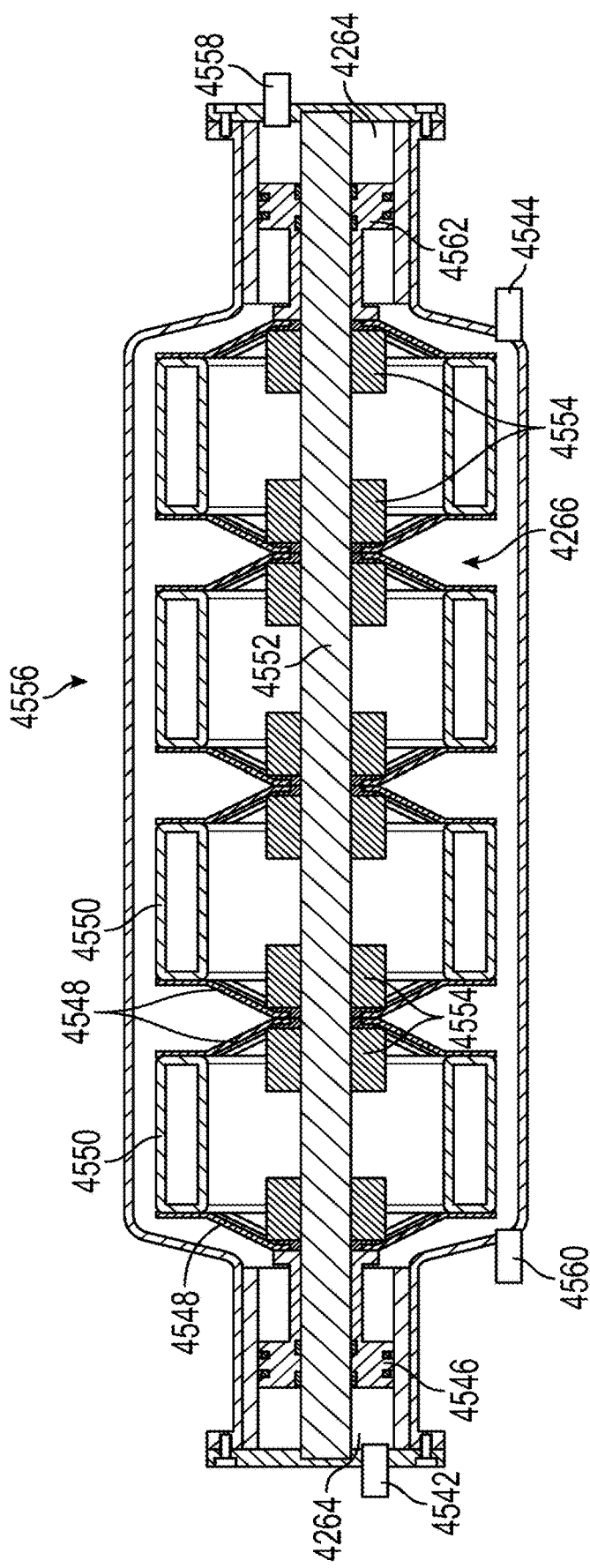
FIG. 42D illustrates a cross-sectional view of an alternative implementation of a hydraulic accumulator, according to at least one illustrated embodiment.

FIG. 42D illustrates a cross-sectional view of an alternative implementation of an accumulator unit 4556, which acts as a dual high-pressure and low-pressure accumulator unit by incorporating both the high-pressure accumulator 4264 and the low-pressure accumulator 4266. The accumulator unit 4556 has the same features as the accumulator unit 4540, except that it includes a third inlet port 4558 that allows access for a relatively high-pressure fluid to the high pressure accumulator 4264, a fourth inlet port 4560 that allows access for a relatively low-pressure fluid to the low pressure accumulator 4266, and a second piston 4562 coupled to the springs 4548 and 4550 at an end thereof opposite to the piston 4546.

When a high-pressure fluid is provided to the high-pressure accumulator 4264 through the first inlet 4542 and/or the third inlet 4558, and/or a low-pressure fluid is provided to the low-pressure accumulator 4266 through the second inlet 4544 and/or the fourth inlet 4560, the respective pressures move the pistons 4546 and/or 4562 within the accumulator 4540, thereby compressing the springs 4548 and/or 4550, and storing energy for later use in the compression of the springs 4548, 4550 and/or in resonance of the springs 4548, 4550 and pistons 4546, 4562.

A variable speed electric motor is used to actuate the valve 716, such as by moving a rotor therein, to either couple the pump 724 to the first conduit 720 and the reservoir 726 to the second conduit 722, or couple the pump 724 to the second conduit 722 and the reservoir 726 to the first conduit 720. The electric motor is used to actuate the valve 716 to alternate between these two positions, to create oscillating pressure waves within the conduits 720 and 722 that are phase shifted from one another by 180 degrees.

As the oscillating pressure waves travel through the conduits 720 and 722, they encounter a first piston 728 and a second piston 730, respectively, within the hydraulic cylinder 714, as well as a third piston 734 and a fourth piston 736, respectively, within the hydraulic accumulator 732. The first and second pistons 728 and 730 are rigidly coupled to one another and form a single hollow cylindrical structure 744, or a hollow shaft with closed ends, such that they move back and forth in unison within the hydraulic cylinder 714. The hollow cylindrical structure 744 includes two opposed longitudinal grooves or slots 738 hydraulically coupled to respective orifices 740 and 742 in the hydraulic cylinder 714, which allow hydraulic fluid or hydraulic oil to be pumped into or out of the hollow cylindrical structure 744, to change the overall or total mass of the hollow cylindrical structure 744. Hydraulic fluid is provided to the orifices 740 and/or 742 by a hydraulic pump 756, a flow control valve 758, and a connection port 760.

As the oscillating pressure waves encounter the first and second pistons 728, 730, they cause the hollow cylindrical structure 744, including the pistons 728 and 730, to oscillate back and forth within the hydraulic cylinder 714. The amplitude of this oscillation is limited by a set of elastomeric stops 746 positioned near the ends of the hydraulic cylinder 714. In this way, the hydraulic cylinder 714 provides the hydraulic system 712 with hydraulic inertia, the magnitude of which is controlled by pumping hydraulic fluid into or out of the hollow cylindrical structure 744.

The hydraulic accumulator 732 includes a first spring 748, coupled at a first end thereof to the third piston 734 and at a second end thereof opposite to the first end to a fifth piston 752. The hydraulic accumulator 732 also includes a second spring 750, coupled at a first end thereof to the fourth piston 736 and at a second end thereof opposite to the first end to a sixth piston 754. The fifth and sixth pistons 752 and 754 are hydraulically linked to one another by a secondary hydraulic cylinder 762. The positions of the fifth and sixth pistons 752 and 754 is controlled, such as to control the energy storage capacity of the springs 748 and 750, by pumping hydraulic fluid into or out of the secondary hydraulic cylinder 762, such as by the hydraulic pump 756 and a flow control valve 764.

As the oscillating pressure waves encounter the third and fourth pistons 734 and 736, they cause the springs 748 and 750 to oscillate back and forth within the hydraulic accumulator 732, such as between extended and compressed states. The amplitude of this oscillation is limited by a set of elastomeric stops 766 positioned near the ends of the hydraulic accumulator 732. In this way, the hydraulic accumulator 732 provides the hydraulic system 712 with hydraulic capacity or energy storage, in the form of the oscillating pistons 734 and 736 and springs 748 and 750, the maximum capacity of which is controlled by pumping hydraulic fluid into or out of the secondary hydraulic cylinder 762.

Figure 43:
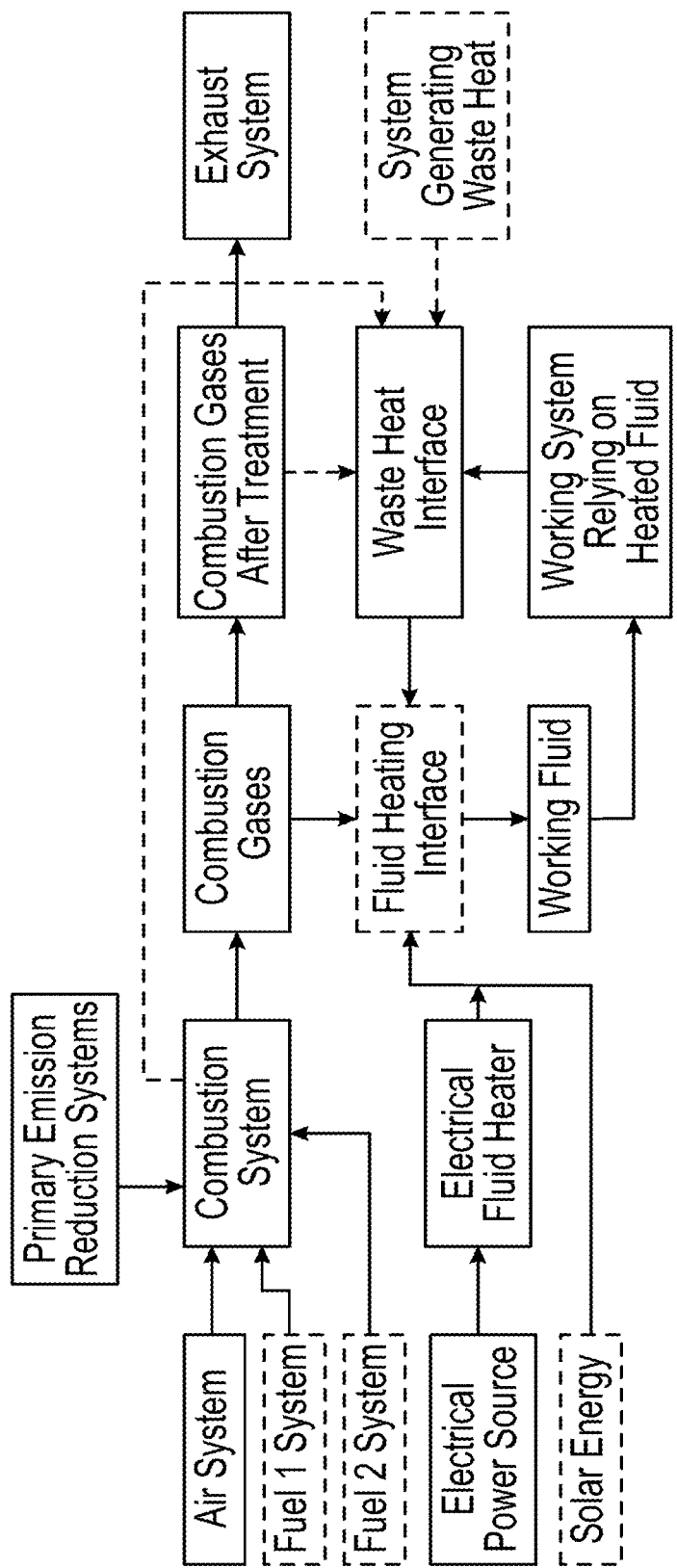
FIG. 43 is a block diagram illustrating a general structure of a fluid thermal unit, according to an embodiment as described herein.

Referring now to a fluid thermal unit component of the Integrated Energy Conversion, Transfer, and Storage System, FIG. 43 shows the general structure of a fluid thermal unit, according to one or more implementations of the present disclosure. In some implementations, the fluid thermal unit is capable of transferring thermal energy to a fluid via a fluid heating interface. Sources of thermal energy include for example, fuel embedded energy, solar energy, electrical energy, or a waste heat source. The heated fluid may be, for example, a hydraulic fluid having properties that cause the hydraulic fluid to expand when heated.

In at least one implementation, one or more fuels provided by a corresponding fuel system are mixed with air and generates, due to combustion, hot gases inside a combustion chamber. The hot gases may be used to heat a fluid inside a heat exchanger using heat transfer across a thermally conductive barrier that separates the hot gases from the fluid. Multiple fuels can be used simultaneously to heat the fluid, wherein the combustion gases produced by the different fuels are mixed.

Concurrently, within the combustion chamber, which is a separate working space dedicated to fuel combustion, primary emission reduction methods may be employed. Such emission reduction methods may include, for example, one or more of water/steam injection and ultrasound excitation of combustion air. In some implementations, after thermal energy is transferred to the fluid via a heat exchanger device (e.g., heating interface), the combustion gases may be further treated to reduce emissions, using for example, a catalytic converter. The treated combustion gases are then released to the environment through an exhaust system.

The system shown in FIG. 43 enables technological improvements that include: a low pressure combustion that is naturally a low-emission process; and a possibility of having a separate device dedicated to optimize the individual processes of combustion and heat transfer. Such a separate device may feature, for example, an ultrasound generator to enhance combustion inside an ultrasound field, or geometrical shapes that enhance convection and sound generation.

In some implementations of the Integrated Energy Conversion, Transfer, and Storage System, the fluid heating interface itself can be heated directly. Such methods for direct heating include, by way of example only, and not by way of limitation: electrical heating, heating by exposure to solar radiation, heating by exposure to waste heat from various sources (e.g., industrial waste heat, or combustion exhaust gases), or heating by exposure to other systems that generate heat during operation (e.g., power electronic devices, hydraulic motor, or electrical motors). According to the nature of the waste heat, heat transfer to the fluid interface may occur by conduction, radiation, or convection.

Figure 44:
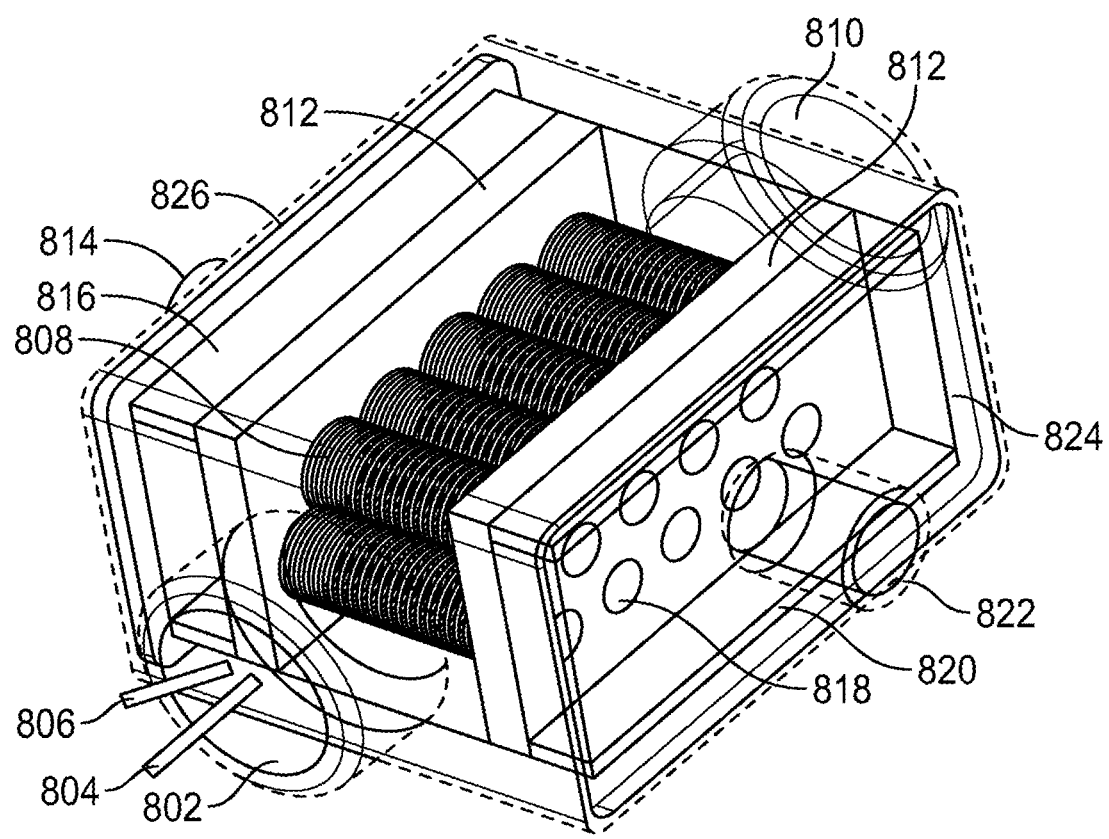
FIG. 44 is a transparent pictorial perspective view of a cross-flow heat exchanger subsystem having a rectangular shape, according to an embodiment as described herein.

FIG. 44 illustrates one implementation of a combustion chamber and cross-flow heat exchanger, for use with the fluid thermal unit of the Integrated Energy Conversion, Transfer, and Storage System. In some implementations, combustion air enters the cross-flow heat exchanger through an inlet port 802, while a fuel injector 804 directs fuel to the heat exchanger via the inlet port 802. Combustion is initiated by an igniter 806. Hot gases flow around one or more heat exchange tubes 808 so that, during combustion, heat is transferred from the hot gases to the heat exchange tubes 808. In at least one implementation, the structure of heat exchange tubes 808 includes a thermally conductive pipe having perpendicular fins. After heat exchange occurs, the combustion gases exit the heat exchange space through an exhaust outlet port 810. Along a combustion gas flow path between the inlet port 802 and the exhaust outlet port 810, the hot gas is bounded by thermally conductive plates 812 coupled to the heat exchange tubes 808 so that as the heat exchange tubes 808 are heated, heat is conducted to the thermally conductive plates 812.

Transverse to the general direction of gas flow, cold fluid is directed through the heat exchanger via a transverse fluid conduit. The cold fluid enters the heat exchange tubes 808 through a fluid inlet port 814 and a fluid inlet chamber 816. The fluid inlet chamber 816 contains the fluid to be heated. The fluid inlet chamber 816 is in direct thermal contact with the thermally conductive plates 812 to begin heating the cold fluid. In some implementations, one of the thermally conductive plates 812 forms a wall in the fluid inlet chamber 816. The cold fluid flows from the fluid inlet chamber through (and is in direct contact with) an inner face 818 of the heat exchange tube 808 so that the fluid absorbs heat of combustion via the heat exchange tubes 808. The heated fluid is then collected inside a fluid outlet chamber 820 and directed to a heat exchanger outlet port 822. The fluid outlet chambers 820 are bounded by thermally conductive panels 824 and 826.

Figure 45:
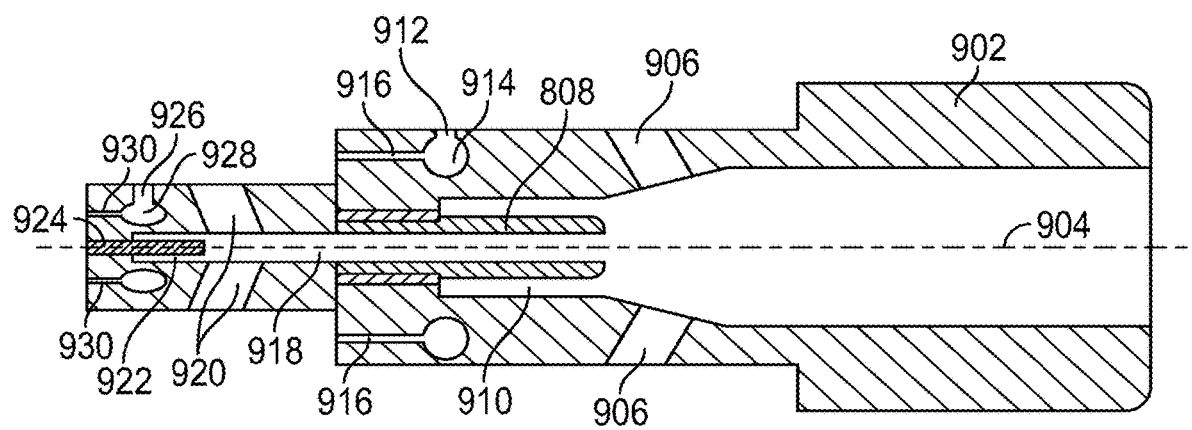
FIG. 45 is a schematic diagram of an ultrasound generator of combustion air, according to an embodiment as described herein.

Referring now to FIG. 45, an implementation of a fuel injector is shown. The fuel injector 902 is combined with an ultrasound generator in order to assure proximity of the fuel jets to an ultrasound field that fosters mixing and a low emission combustion process. Air enters the fuel injector 902 via an air inlet port 804. The air stream is reflected inside the cavity 910 due to the annular tube 908, generating ultrasound waves that exit the injector through air outlet ports 906. Fuel entering the injector at port 912 is guided through the circular pipe 914 toward the fuel outlet orifices 916. Part of the inlet air that has entered the injector through air inlet port 904, passes through channel 918 to the cavity 920, where the pin 924 defines the shape of the reflecting cavity. The reflecting cavity is where air pressure waves are generated that exit the injector through the orifice 920. In some implementations, fuel is directed inside the injector through orifice 926. The circular pipe 928 feeds the fuel injection orifices 930. Accordingly to the heat exchanger functionality displayed in FIG. 46, the injector device that is able to induce ultrasound waves in the combustion field, as shown in FIG. 45.

Figure 46:
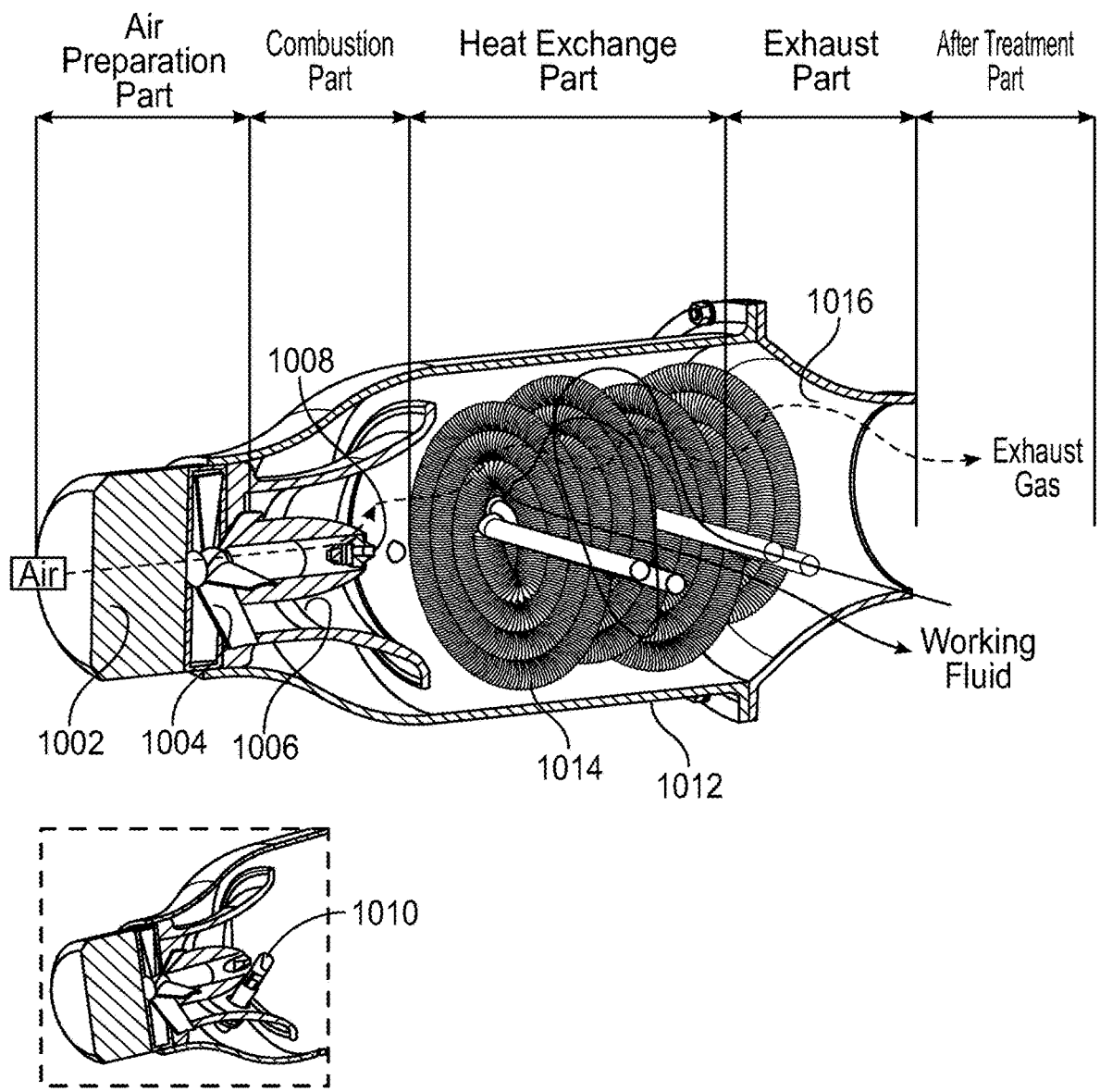
FIG. 46 is a cutaway view of the internal components of an integrated circular convection thermal unit, according to an embodiment as described herein.

Referring now to FIG. 46, in some implementations of the Integrated Energy Conversion, Transfer, and Storage System, a fluid thermal unit relies on the heating of the fluid using combustion gases. Air provided through an air filter 1002 is pushed by the fan 1004, through an air trumpet 1006 to generate an ultrasound field inside the combustion zone, in accordance with the implementation described in FIG. 45. Fuel is provided by a fuel injector 1008 and ignited by a spark igniter 1010. Inside the heat exchange portion of the fluid thermal unit, which is bounded by a housing 1012, is placed a coil 1014 that has fins on its outside surface to increase heat transfer from the hot gases to a fluid that is flowing through the coil 1014. The heat transfer functionality is employed using convection from the gases to the coil surface, conduction through the coil material, and convection from the coil material to fluid flowing within the coils 1014. Exhaust gases are directed through the exhaust system 1016 to the environment.

Figure 47A:
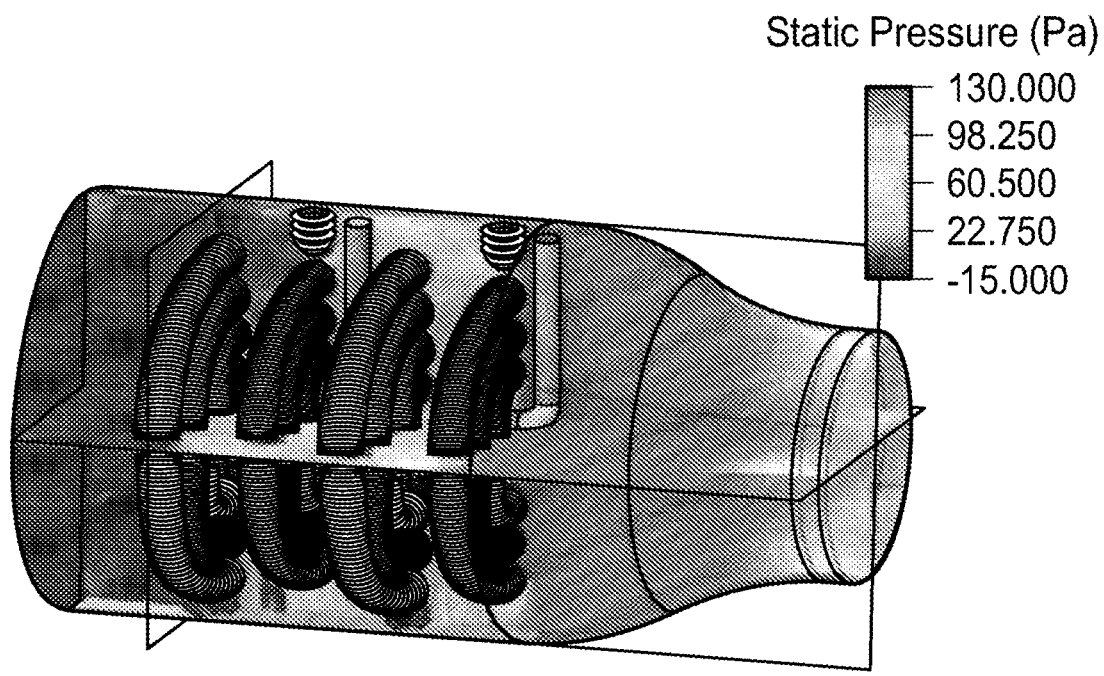
FIGS. 47A, 47B, 47C, 47D, 47E, and 47F illustrate results of a CFD simulation of fluid flow within the thermal unit shown in FIG. 46.
Figure 47B:
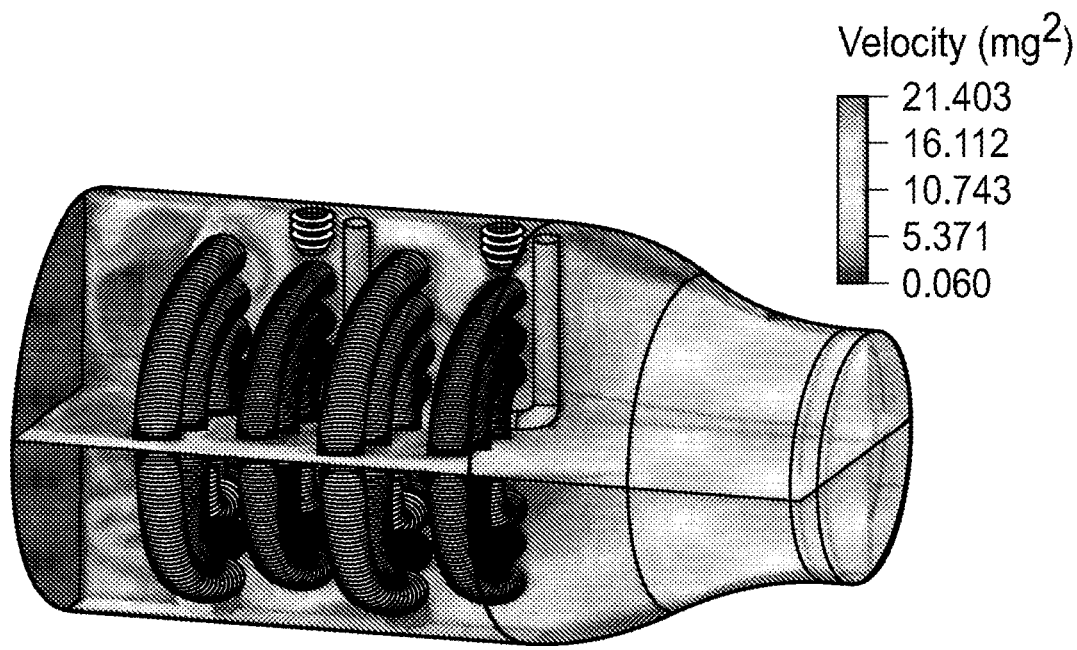
Figure 47C:
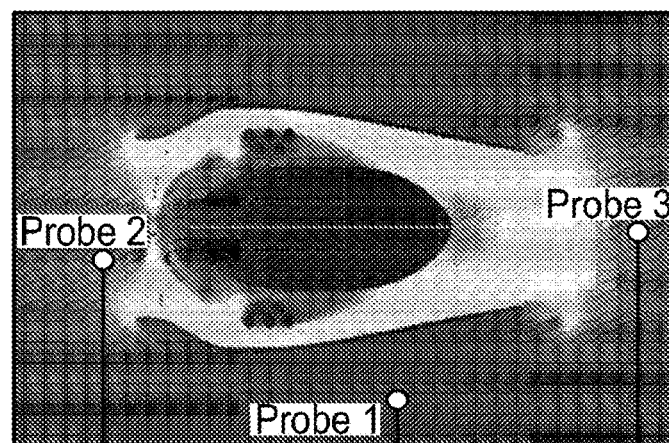
Figure 47D:
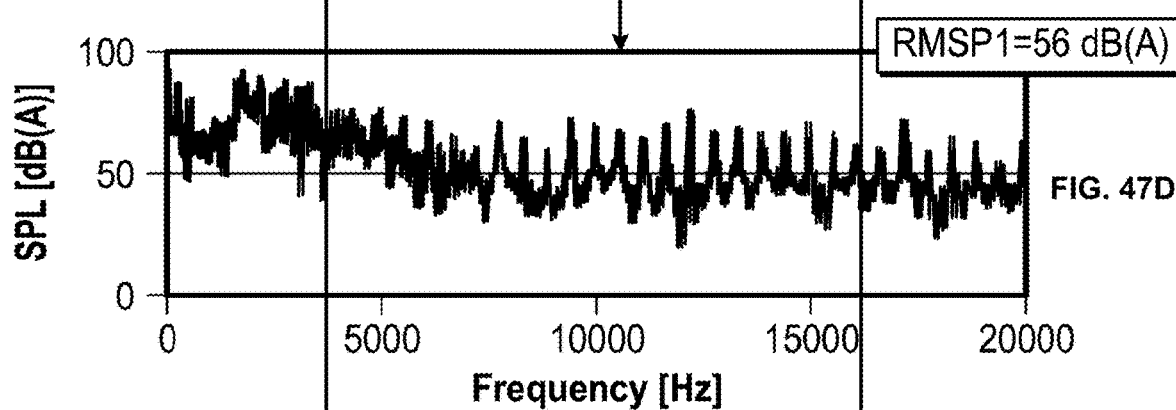
Figure 47E:
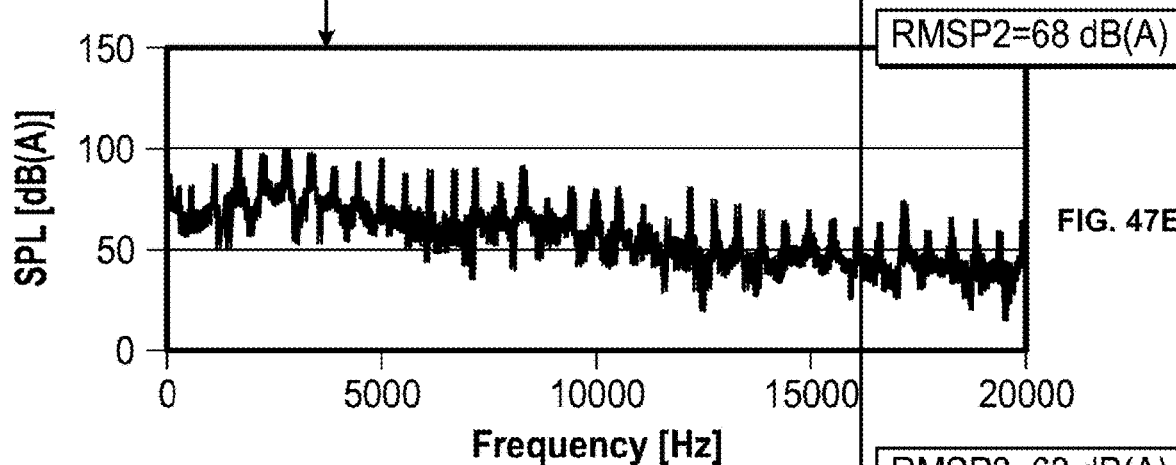
Figure 47F:
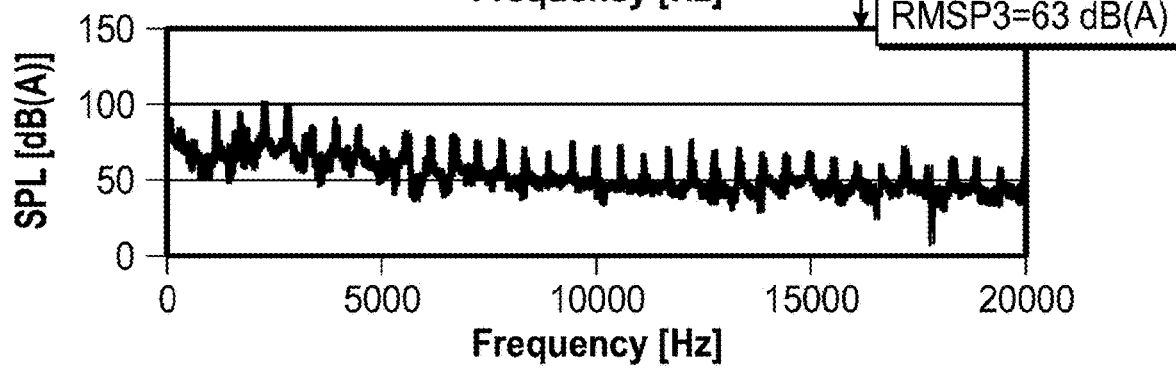

Referring now to FIG. 47A, the design of the gas flow inside the fluid unit thermal addresses pressure losses through the pipes, as identified by an exemplary simulation run. Referring now to FIG. 47B, a second design consideration is also based on fluid flow analysis, which is related to the turbulence and velocity field near the coils and fins, to increase the convection coefficient and consequently the heat transferred from the gas to the coil material. Referring now to FIG. 47C, a third design consideration is related to vibrations of the air, and consequently to sound generated by the gas as it changes flow direction and magnitude when flowing inside the housing of the fluid thermal unit and between the spaces of the coils. Notably, FIGS. 47D, 47E, and 47F shows that the pressure loss, turbulence, intensity, and noise levels, given in decibels (dB), are shown to be in an acceptable range for a technical application of 30 kW.

Figure 48:
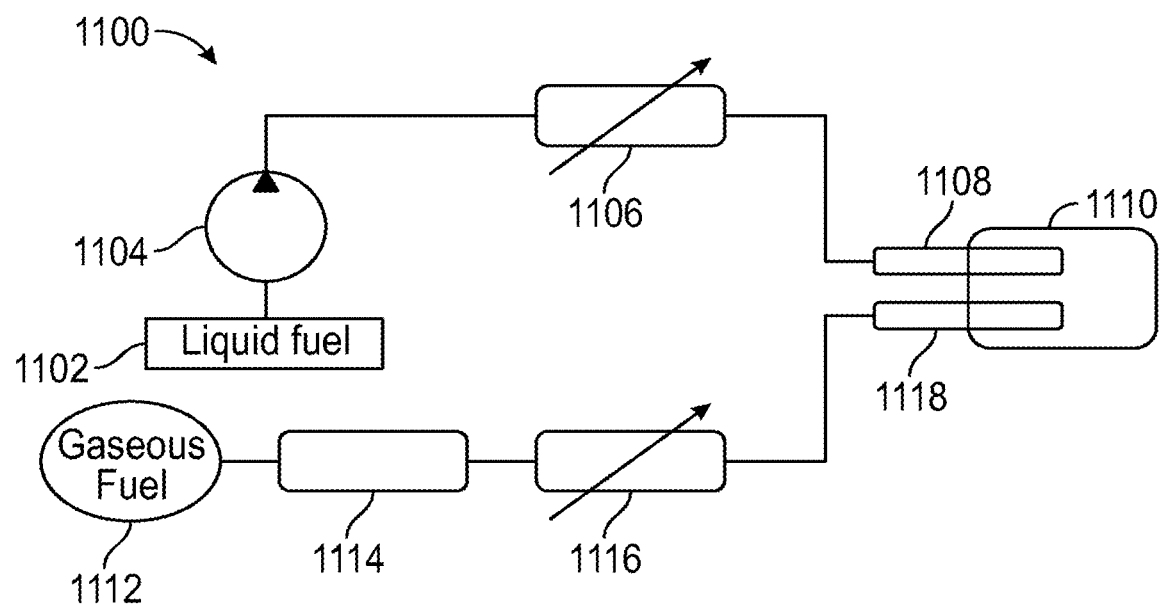
FIG. 48 is a block diagram showing a liquid thermal unit that can receive fuel from multiple sources, according to an embodiment as described herein.

Referring now to FIG. 48, a generic fuel system 1100 is shown that feeds fuel to a fluid thermal unit. The fuel system 1100 is designed to use multiple different fuels. The fuel system 1100 includes a liquid fuel tank 1102, a fuel pump 1104, and a liquid metering device 1106. The fuel pump 1104 drives fuel from the liquid fuel tank 1102, through the liquid metering device 1106, to a liquid fuel injector 1108 to prepare the liquid fuel for combustion inside a combustion chamber 1110. The combustion chamber 1110 may take the form of, for example, the cross-flow heat exchanger implementation shown in FIG. 44, or the heat exchanger implementation shown in FIG. 46. In at least one implementation, the fuel system 1100 may further include a gaseous fuel tank 1112, a pressure-reducing valve 1114, and a gas metering device 1116. A gaseous fuel stored under pressure in the gaseous fuel tank 1112 flows through the pressure-reducing valve 1114 and the gas metering device 1116, to a gas fuel injector 1118 placed inside the combustion chamber 1110.

Figure 49:
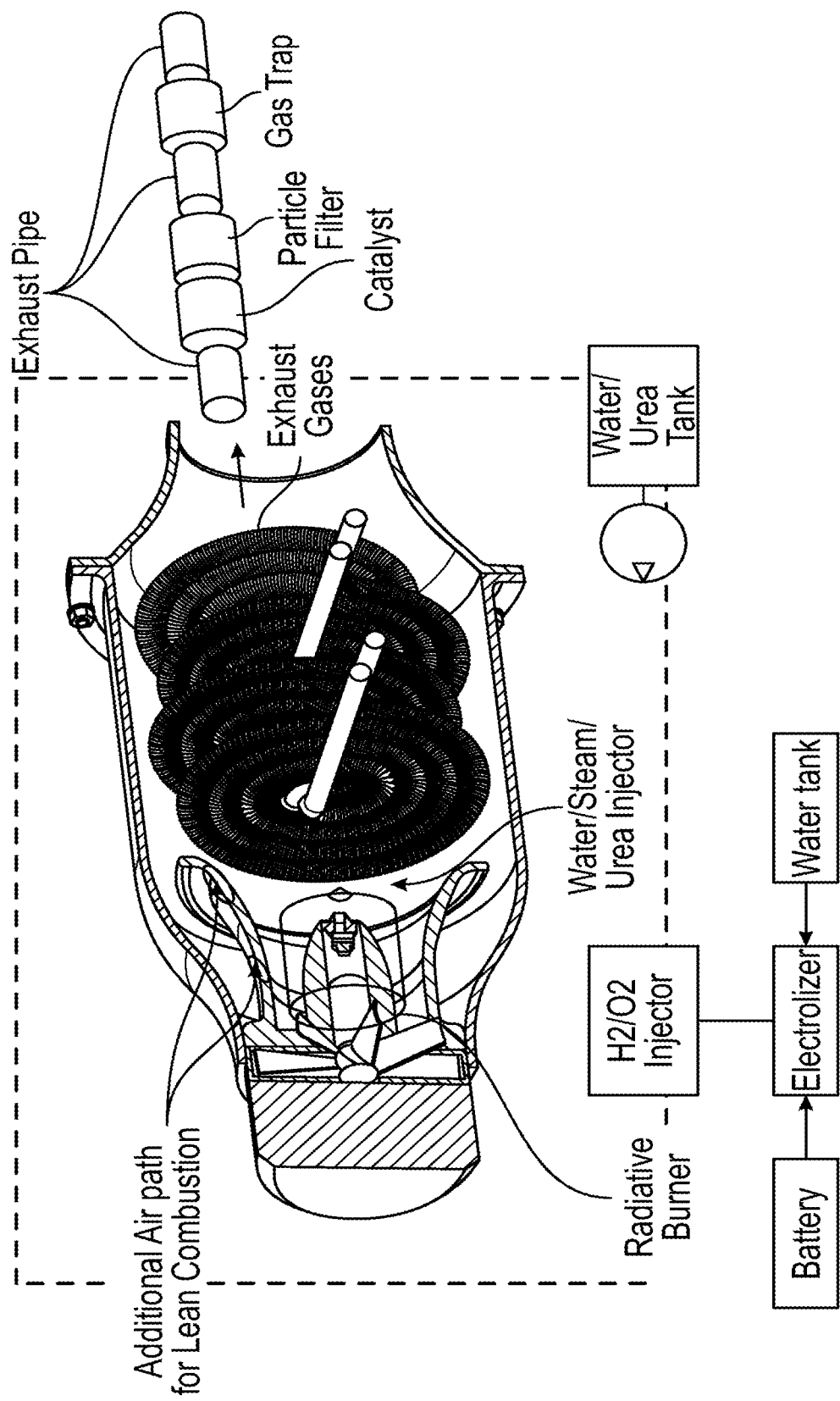
FIG. 49 is a schematic diagram of a liquid thermal unit equipped with emission reduction components, according to an embodiment as described herein.

As shown in FIG. 49, continuous combustion applies various emission reduction measures to the fluid thermal unit, according to some implementations. The emission reduction measures may be applied at an emission generation stage, at a combustion gas after-treatment stage, or at both stages. In some implementations, an ultrasound generator for the inlet air and combustion gases allows combustion to occur inside an ultrasound field, which stimulates reactivity at a molecular level that corresponds to the ultrasound wave length. Additional air is added to the combustion chamber to cool the combustion gases and reduce nitrogen emissions. Furthermore, injection of water or steam, as well as the use of a radiative burner, allows burning the fuel at lower combustion temperature than an open flame, which reduces emissions. The addition of a hydrogen-oxygen mixture from an external electrolyze may reduce general fuel consumption and emissions by generating heat of combustion without using atmospheric air. This is a method for short term, ultra-low emission operation of a combustion process.

Urea injection is an established oxides-of-nitrogen (NOx) reduction method applicable also to the fluid thermal unit together with state-of-the-art post-combustion gas treatment devices such as, for example, catalyzers, particle filters, and gas traps. An overview of the emission reduction effects of the arrangement shown in FIG. 49 is provided in tabular form in FIG. 50.

Figure 51A:
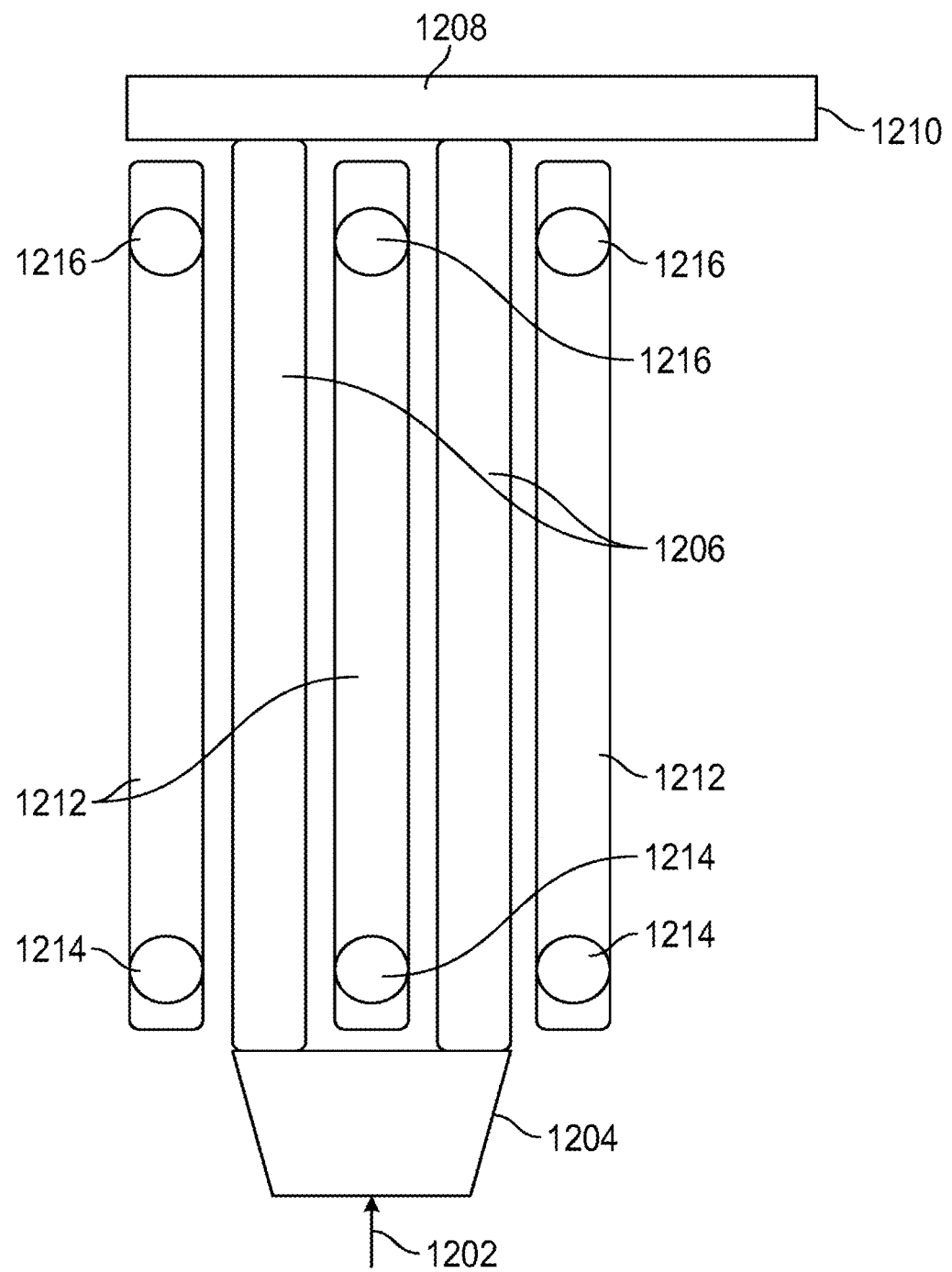
FIG. 51A is an end view of a fluid thermal unit implemented as a radiative burner, according to an embodiment as described herein.
Figure 51B:
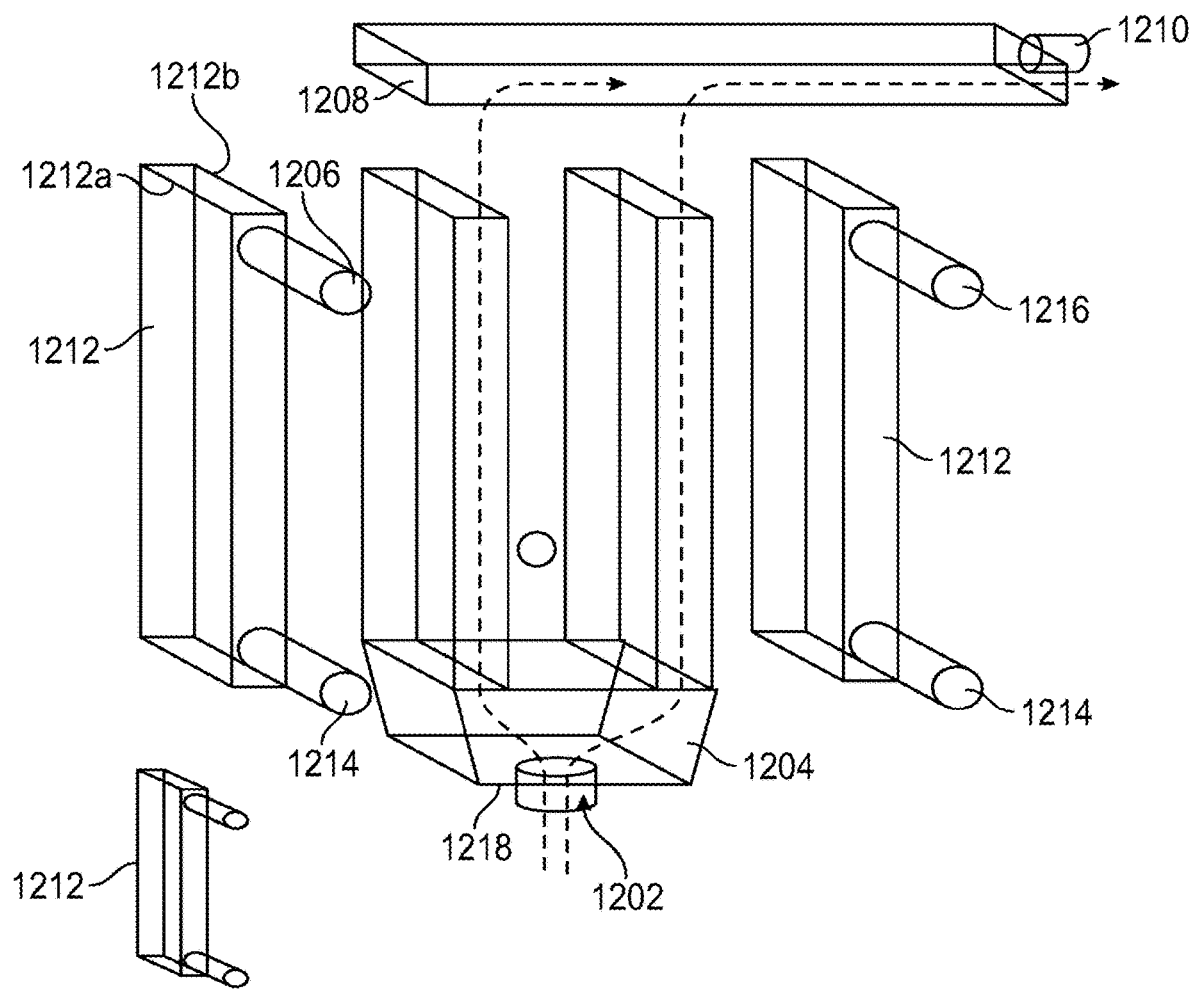
FIG. 51B is an exploded side view of the radiative burner shown in FIG. 51A.

Referring now to FIGS. 51A, 51B, a radiative burner is shown for incorporation into the fluid thermal unit, according to at least one implementation. In some implementations, a radiative burner provides a porous medium (e.g., a wire mesh) in which fuel may be burned at a lower combustion temperature, at about 900 C, than in a conventional open-flame burner, which typically operates at about 1200 C. Consequently, nitrogen oxide emissions are much lower.

The fluid thermal unit that is equipped with such a radiative burner provides an air inlet path 1202, a burner distribution channel 1204, one or more radiative burners 1206, an exhaust collector 1208, an exhaust pipe 1210, and fluid panels 1212. The distribution channel 1204 directs air and fuel into the radiative burners 1206, coupled thereto. In some implementations, the radiative burners 1206 have a planar shape that provides optimal exposure for radiative heat transfer to the fluid panels 1212 during combustion. Preferably, the fluid panels 1212 are substantially aligned with one another and are interdigitated with the radiative burners 1206 in order to capture radiation from both sides of the radiative burners 1206. Gaseous products of combustion are collected by an exhaust collector 1208 and exit the radiative burner through an exhaust pipe 1210. The fluid panels 1212 by design have a large surface and low thickness for the fluid volume, in order to have large exposure of fluid panel surfaces 1212a and 1212b, to heat radiation. Fluid to be heated enters the fluid panels 1212 through the inlet pipes 1214, 1216. Hot fluid exits the fluid panels 1212 via the outlet ports 1216.

Figure 52A:
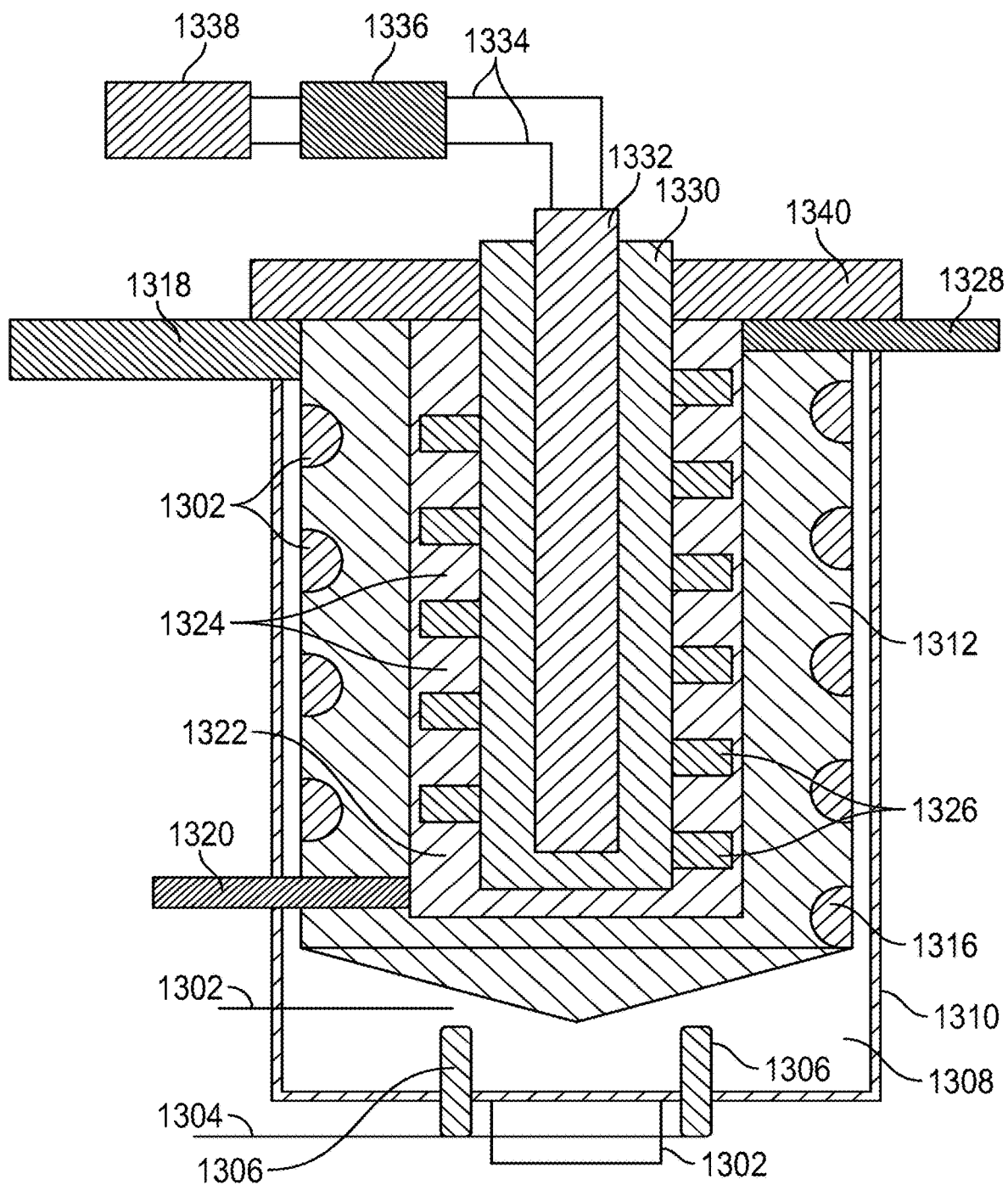
FIG. 52A is a schematic side view of a hybrid electrical and combustion-based fluid thermal unit, according to an embodiment as described herein.
Figure 52B:
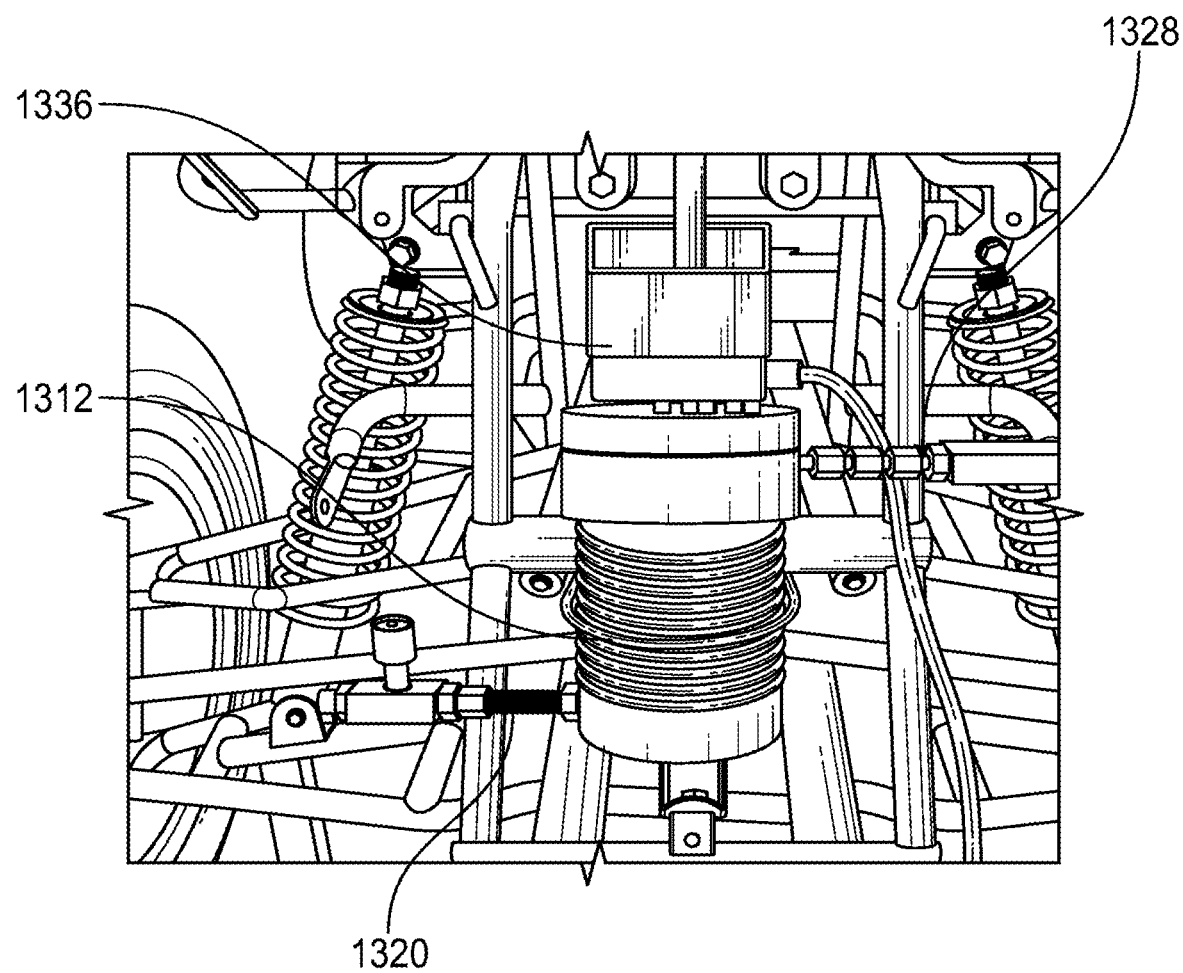
FIG. 52B is a pictorial view of a heater body into which fluid enters via an inlet pipe and leaves via an outlet pipe, according to an embodiment as described herein.

Referring now to FIGS. 52A, 52B, a hybrid design of a fluid thermal unit is shown in which a working fluid is heated using both the heat of combustion and an electrically-powered heat source, according to at least one implementation. As shown in FIG. 52A, the hybrid fluid thermal unit includes an air inlet path 1302 and a fuel supply pipe 1304 that feeds fuel injectors 1306. Gases produced by combustion within a combustion chamber 1308 placed inside a housing 1310 are directed to outlet pipe 1318. The hot gases transfer heat to a heater body 1312 that heats up the fluid in the fluid workspace 1322 and the helical flow path 1324, resulting by the helical fin 1326. The fluid enters the described heating path via an inlet pipe 1320 and leaves the heating path through the outlet pipe 1328. The workspace is closed by an end cap 1340 fixed to the housing 1310. The helical fin 1326 is fixed to the electrical heater housing 1330 which contains an electrical resistor 1332, coupled to an electrical power supply 1318 by electrical wires 1334. Electrical power to the hybrid thermal unit is regulated by an electrical controller 1336.

Figure 53:
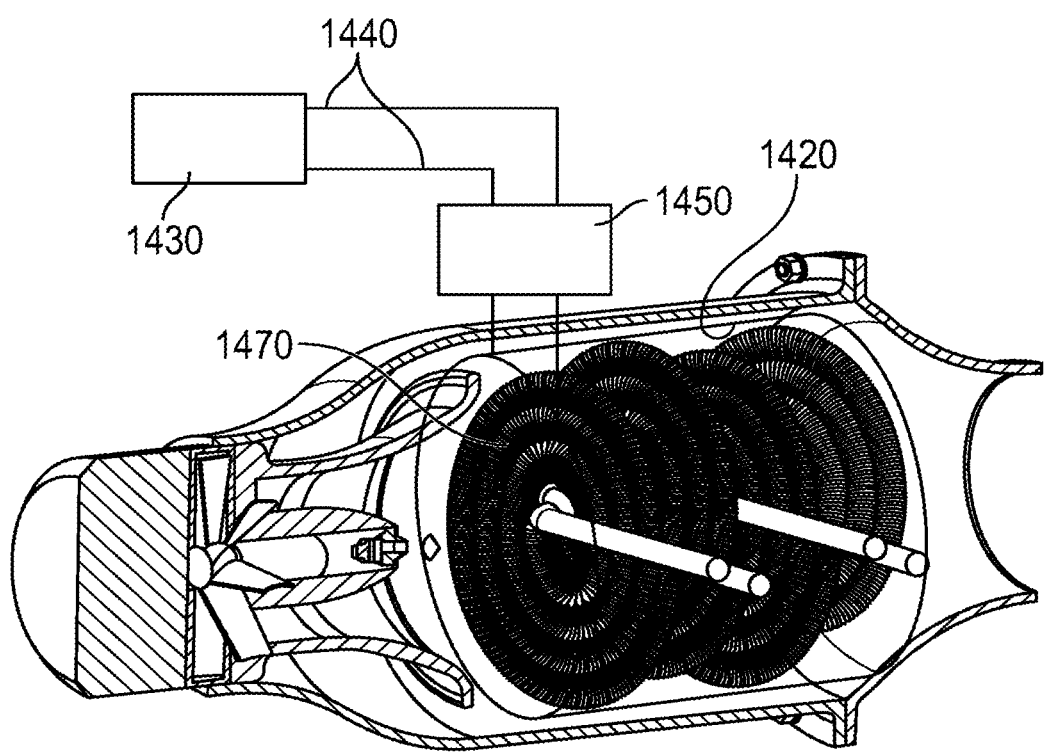
FIG. 53 is a cutaway view of components of the integrated circular convection thermal unit shown in FIG. 4, enhanced with an add-on electric heater.

As shown in FIG. 53, a hybrid combustion-based and electrical heater is shown that is implemented as an add-on to the fluid thermal unit described with respect to FIG. 46. The fluid coils 1470 are surrounded by an electrical radiative panel 1420 that has a cylindrical shape. The electrical radiative panel 1420 is coupled to an electrical power supply 1430 via wires 1440, and an electrical control system 1450.

Figure 54:
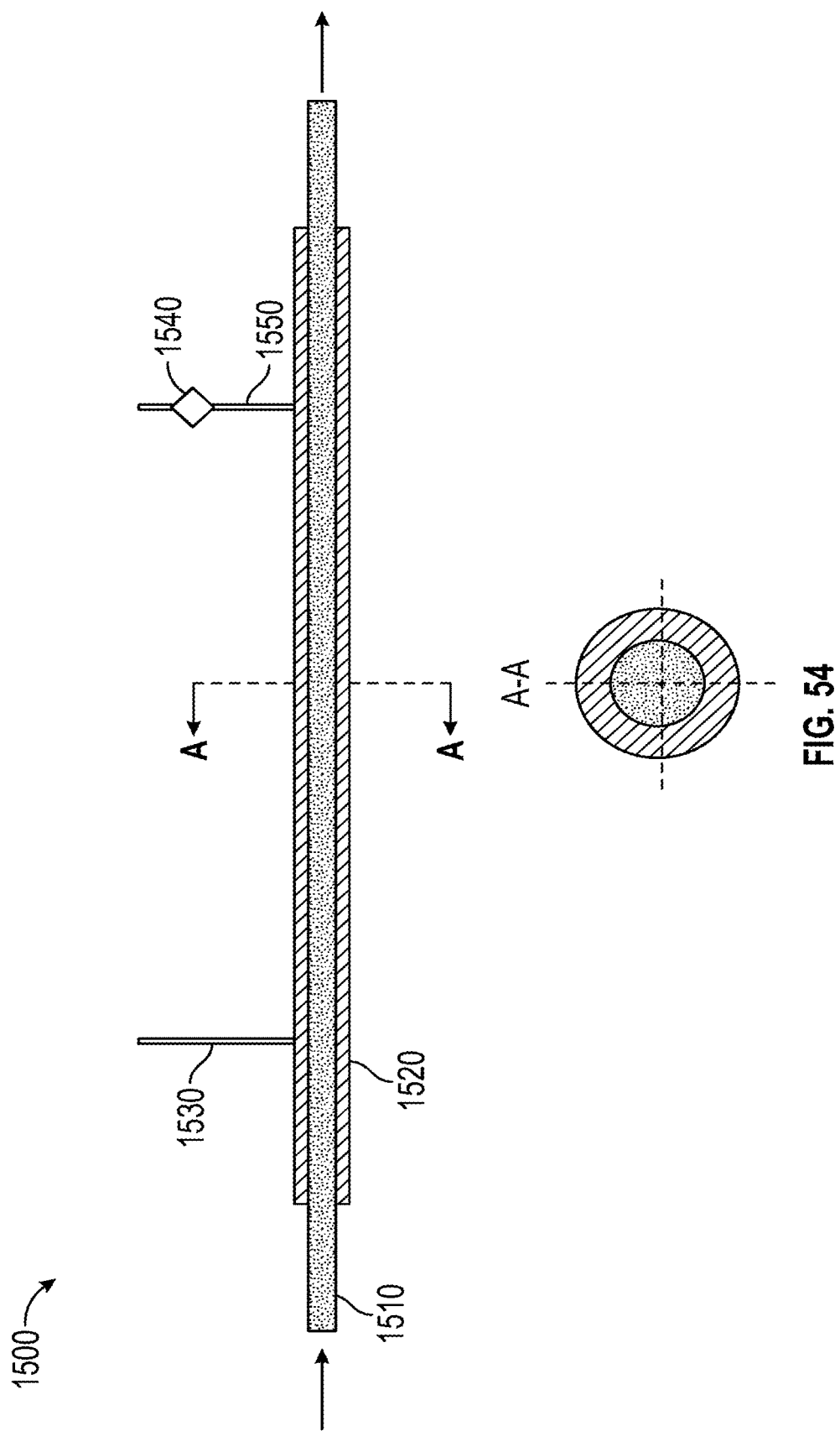
FIG. 54 is a schematic view of a pipe-based fluid heat transfer system, according to an embodiment as described herein.

Referring now to FIG. 54, an exemplary waste heat harvesting apparatus 1500 is shown for use in harvesting energy from a system that produces waste heat carried by a fluid. The waste heat harvesting apparatus 1500 includes a waste heat carrying fluid pipe 1510 and housing 1520. A heat transfer and flow path for a working fluid enters the housing 1520 through pipe 1540 and leaves the housing 1520 using a pipe 1530. A uni-directional circuit from inlet to outlet is assured by a control valve 1550.

Figure 55:
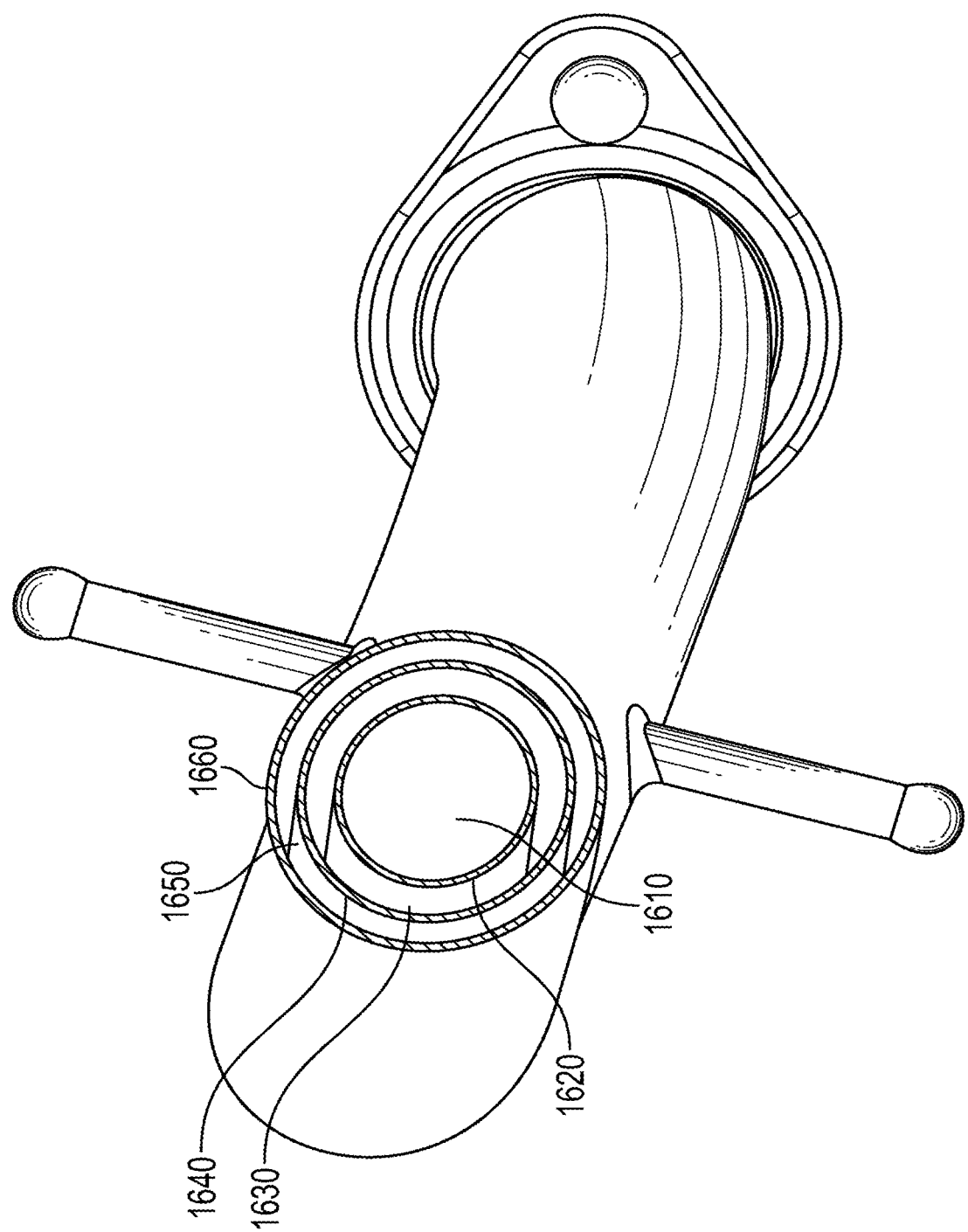
FIG. 55 is a pictorial view of the pipe-based fluid heat transfer system shown in FIG. 54, enhanced by an insulating layer.

Referring now to FIG. 55, an implementation of the insulation component is shown that improves heat transfer in the waste heat harvesting apparatus of FIG. 54. A gas flows through an internal space 1610 inside a thermally conductive pipe 1620. The thermally conductive pipe 1620 is in contact with a surrounding fluid 1630 flowing inside pipe 1640. Pipe 1640 and housing 1660 thus create a space for an insulation material 1650 to be inserted therebetween.

Figure 56:
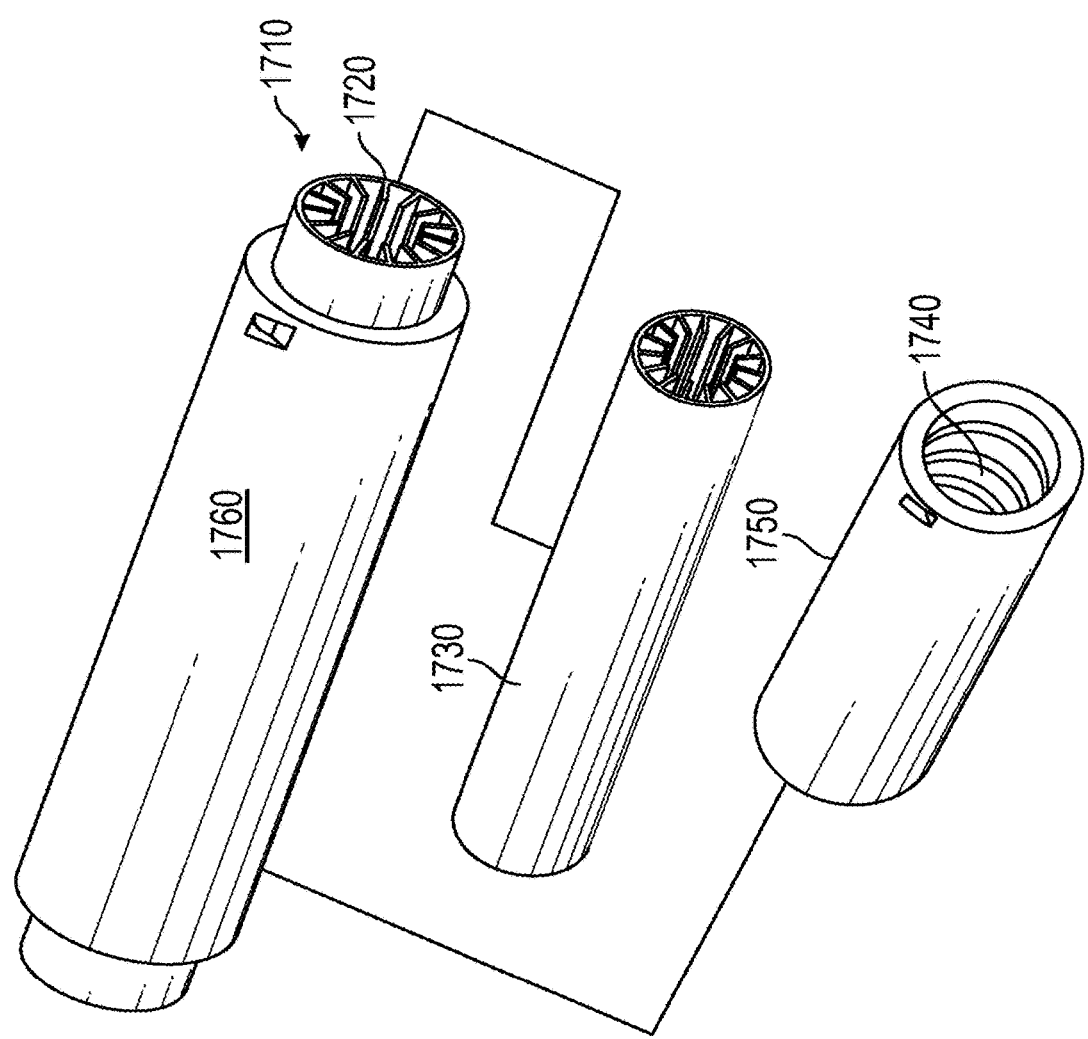
FIG. 56 is a perspective view of a pipe-based heat transfer system, according to an embodiment as described herein.

As shown in FIG. 56, in some implementations, an alternative heat transfer improvement device is incorporated into the system that includes heat transfer fins 1710 formed in, or attached to, a hot fluid side 1720 of a waste heat-carrying fluid pipe 1730. Additionally or alternatively, a helical channel 1740 can be formed or placed inside a housing 1750 that surrounds at least a portion of the fluid pipe 1730.

Figure 57:
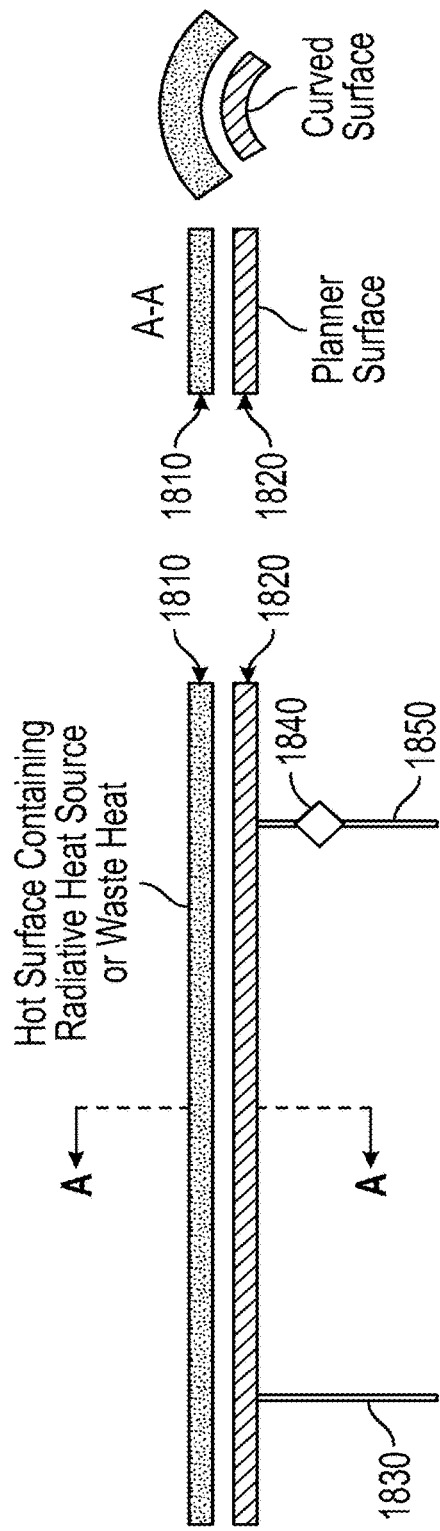
FIG. 57 is a schematic view of a radiative heat transfer system, according to an embodiment as described herein.

Referring now to FIG. 57 an implementation of an apparatus is shown that harvests thermal energy from a plane or curved surfaces. The thermal energy harvesting apparatus includes a hot surface 1810 that is heated by an external heat source via radiation or by an electrical source. Examples of external radiation heat sources include solar radiation, molten metals used in industrial processes, and surfaces of operational equipment (e.g., server computers that warehoused in server farms to provide cloud storage). Electrical sources may rely on the Joule effect, or inductive heating. The heating work space 1820 is a thin large surface that provides a large contact area for heat transfer. The inlet flow path uses inlet pipe 1850 and outlet pipe 1830, wherein the flow direction is assured by a flow control valve 1850.

Figure 58:
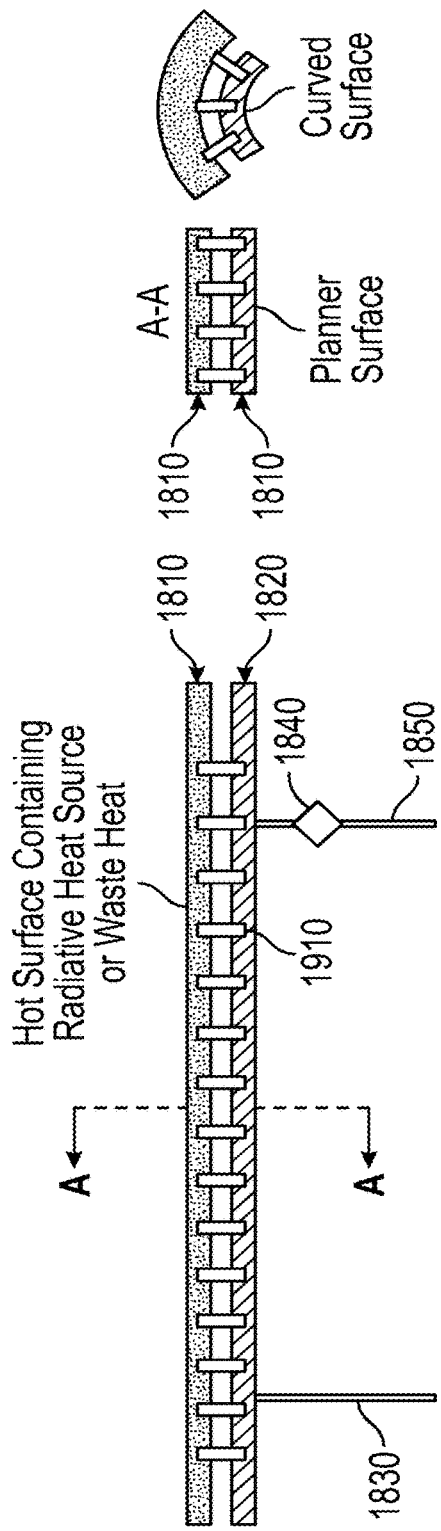
FIG. 58 is a schematic view of the radiative heat transfer system shown in FIG. 57, enhanced by a plurality of highly-conductive pins.

Additionally, FIG. 58 shows an implementation of an enhanced heat transfer apparatus shown in FIG. 57, but with a further heat transfer feature. This enhanced heat transfer apparatus further includes a plurality of pins 1910 made of a material having a high thermal conductivity. The plurality of pins 1910 are each coupled at one end to the hot surface 1810 while the other end of each pin is immersed in the fluid working space 1820. Thus, heat is conducted from the hot surface to the fluid via the pins 1910.

Figure 59B:
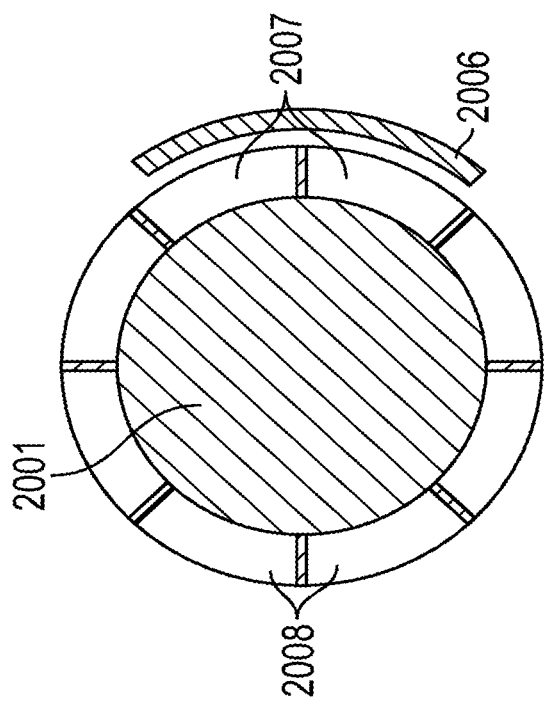
FIG. 59B is a cross-sectional view of a thermal unit using wax thermal expansion and phase change, along line A-A from FIG. 59A.
Figure 59A:
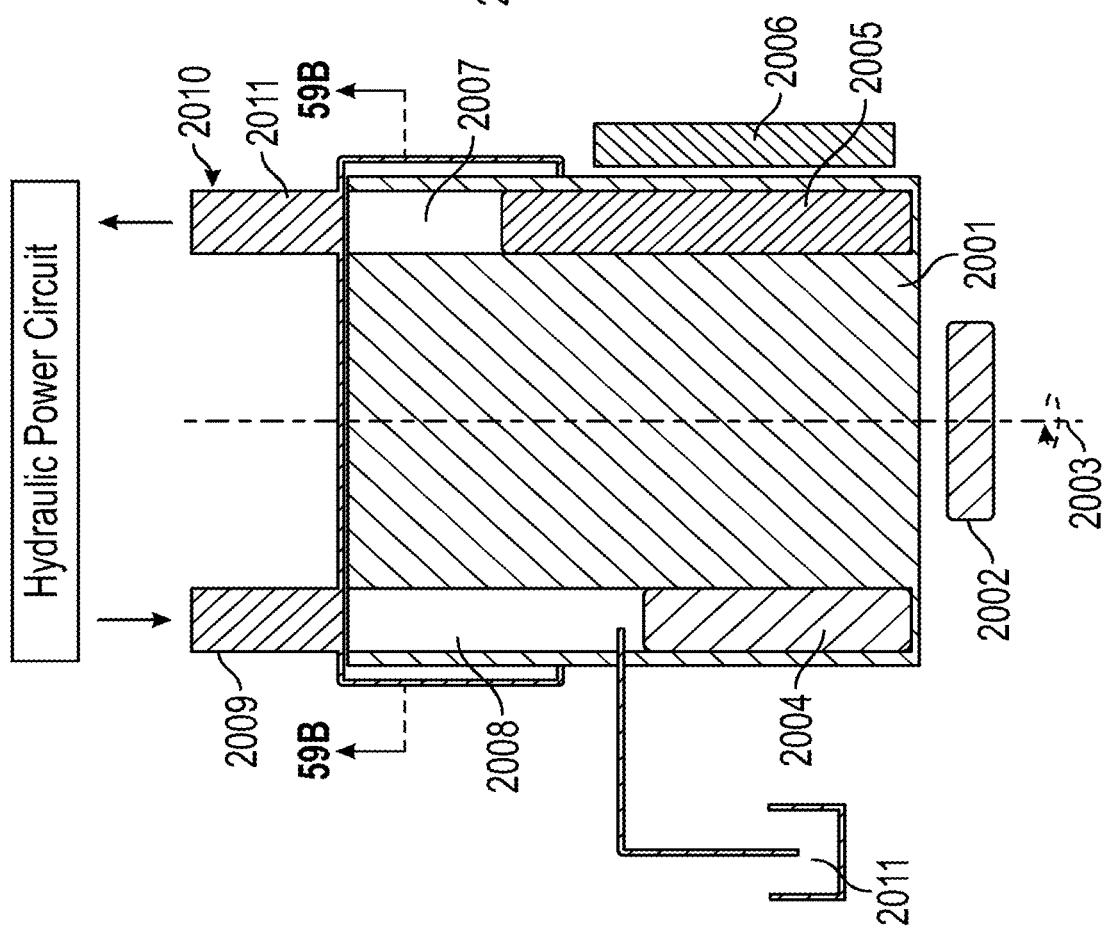
FIG. 59A is a schematic view of a thermal unit using wax thermal expansion and phase change.

Referring now to FIGS. 59A and 59B, in some implementations, thermal energy is converted directly to hydraulic energy by using wax dilatation and phase change. A rotational work space body 2001 powered by an external rotational unit 2002, is driven using the shaft 2003. The rotational body 2001 contains radial workspaces 2007 and 2008 that contain the wax. Due to rotation of the body 2001, the workspaces are exposed to the thermal radiative or convective heat surface 2006. The wax 2005 inside the workspace 2007 expands and converts into a liquid phase, thereby increasing its volume and pushing the hydraulic liquid inside the workspace 2007 through the hydraulic pipe 2010 attached to the housing 2011 to the hydraulic power circuit. The returning fluid enters the workspace 2008 through the hydraulic pipe 2009 and cools down the wax 2008. The workspace 2008 is in contact with the hydraulic tank 2211 to cool the hydraulic liquid.

The following related applications to which this application claims priority, are hereby incorporated herein by reference in their entireties: (1) Continuous Convection Heat Exchanger, U.S. Ser. No. 62/498,347, filed Dec. 21, 2016, (2) Hybrid Energy Recovery System for Vehicle Applications, U.S. Ser. No. 62/498,348, filed Dec. 21, 2016, (3) Integrated Hybrid Energy Conversion and Storage System, U.S. Ser. No. 62/606,511, filed Sep. 26, 2017, (4) Hydraulic Accumulator, U.S. Ser. No. 62/577,630, filed Oct. 26, 2017, and (5) Fluid Thermal Unit, U.S. Ser. No. 62/580,360 filed Nov. 1, 2017.

Additionally, U.S. provisional patent application No. 62/496,784, filed Oct. 28, 2016; 62/498,349, filed Dec. 21, 2016; 62/498,338, filed Dec. 21, 2016; 62/498,337, filed Dec. 21, 2016; 62/498,336, filed Dec. 21, 2016; 62/605,291, filed Aug. 7, 2017; 62/605,283, filed Aug. 7, 2017; 62/606,522, filed Sep. 26, 2017; 62/606,521, filed Sep. 26, 2017; 62/584,650, filed Nov. 10, 2017; 62/598,366, filed Dec. 13, 2017; and 62/598,364, filed Dec. 13, 2017; as well as U.S. non-provisional patent application Ser. No. 15/731,383, filed Jun. 5, 2017; Ser. No. 15/731,360, filed Jun. 1, 2017; Ser. No. 15/731,267, filed May 15, 2017; and Ser. No. 15/731,271, filed May 15, 2017; and PCT application no. PCT/US17/58883, filed Oct. 27, 2017, are hereby incorporated herein by reference in their entireties.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hydraulic accumulator system, comprising:
   an outer housing;
   a first open chamber within the outer housing;
   a second open chamber within the outer housing;
   an inner dividing wall that separates the first open chamber from the second open chamber;
   a conduit that extends through the inner dividing wall along a length of the hydraulic accumulator system;
   a first port allowing hydraulic access to the first open chamber;
   a second port allowing hydraulic access to the second open chamber;
   a third port allowing hydraulic access to the first open chamber; and
   a fourth port allowing hydraulic access to the second open chamber.

2. The hydraulic accumulator system of claim 1, further comprising:
   a hydraulic flow control valve coupled to the first open chamber and to the second open chamber; and
   a hydraulic motor coupled to the hydraulic flow control valve.

3. The hydraulic accumulator system of claim 2, further comprising:
   a wheel coupled to the hydraulic motor.

4. The hydraulic accumulator system of claim 3, further comprising:
   an axle extending through the conduit, the wheel coupled to an end of the axle.

5. The hydraulic accumulator system of claim 1, wherein the outer housing has a circular cross-sectional shape.

6. The hydraulic accumulator system of claim 1, wherein the outer housing has a elliptic cross-sectional shape.

7. A hydraulic accumulator system, comprising:
   an outer housing;
   a first open chamber within the outer housing;
   a second open chamber within the outer housing;
   an inner dividing wall that separates the first open chamber from the second open chamber; and
   a conduit that extends through the inner dividing wall along a length of the hydraulic accumulator system;
   wherein the inner dividing wall is elastomeric and deformable, and wherein the inner dividing wall stores energy by deforming when a first pressure within the first open chamber differs from a second pressure within the second open chamber.

8. The hydraulic accumulator system of claim 1, wherein the first open chamber includes a high-pressure accumulator and the second open chamber includes a low-pressure accumulator.

9. The hydraulic accumulator system of claim 1, further comprising:
   an elastic element positioned within the first open chamber.

10. The hydraulic accumulator system of claim 9, further comprising:
    a first piston that seals the elastic element within the first open chamber.

11. The hydraulic accumulator system of claim 10, further comprising:
    a second piston that seals the elastic element within the first open chamber.

12. The hydraulic accumulator system of claim 9, wherein the elastic element is a mechanical helical spring.

13. The hydraulic accumulator system of claim 9, wherein the elastic element is a mechanical disc spring.

14. The hydraulic accumulator system of claim 9, wherein the elastic element is an elastomeric hose.

15. The hydraulic accumulator system of claim 9, wherein the elastic element is a compressed gas.

16. The hydraulic accumulator system of claim 1, further comprising:
    two elastic elements positioned within the first open chamber.

17. The hydraulic accumulator system of claim 16, wherein the two elastic elements have different elasticities.

18. The hydraulic accumulator system of claim 1, further comprising:
    three elastic elements positioned within the first open chamber.

19. A hydraulic accumulator system, comprising:
    an outer housing;
    a first open chamber within the outer housing;
    a second open chamber within the outer housing;
    an inner dividing wall that separates the first open chamber from the second open chamber;
    a conduit that extends through the inner dividing wall along a length of the hydraulic accumulator system; and
    an elastic element positioned within the first open chamber, wherein the elastic element is one of a mechanical helical spring, a mechanical disc spring, an elastomeric hose, or a compressed gas.

20. The hydraulic accumulator system of claim 19, further comprising:
    a first piston configured to seal the elastic element within the first open chamber.

* * * * *